(12) United States Patent
Norden

(10) Patent No.: US 9,526,982 B2
(45) Date of Patent: Dec. 27, 2016

(54) METHOD FOR IMPLEMENTING A COMPUTER GAME

(71) Applicant: King.com Limited, St. Julians (MT)

(72) Inventor: Klas Norden, Stockholm (SE)

(73) Assignee: KING.COM LTD., St. Julians (MT)

(*) Notice: Subject to any disclaimer, the term of this patent is extended or adjusted under 35 U.S.C. 154(b) by 394 days.

(21) Appl. No.: 14/029,261

(22) Filed: Sep. 17, 2013

(65) Prior Publication Data

US 2014/0080556 A1    Mar. 20, 2014

Related U.S. Application Data

(60) Provisional application No. 61/701,907, filed on Sep. 17, 2012, provisional application No. 61/811,019, (Continued)

(30) Foreign Application Priority Data

Feb. 6, 2013  (GB) .................... 1302121.7
Feb. 19, 2013 (GB) .................... 1302910.3
(Continued)

(51) Int. Cl.
*A63F 13/00* (2014.01)
*A63F 13/25* (2014.01)
(Continued)

(52) U.S. Cl.
CPC ............. *A63F 13/25* (2014.09); *A63B 71/06* (2013.01); *A63F 13/00* (2013.01); *A63F 13/005* (2013.01);
(Continued)

(58) Field of Classification Search
CPC .................. A63F 13/573; A63F 2300/646
(Continued)

(56) References Cited

U.S. PATENT DOCUMENTS 5,488,496 A   1/1996  Pine
6,068,552 A   5/2000  Walker et al.
(Continued)

FOREIGN PATENT DOCUMENTS

DE    10304725 A1   9/2004
EP    1564698 A2    8/2005
(Continued)

OTHER PUBLICATIONS

Anonymous, "Amazon Survival YouTube video, Uploaded to YouTube on Mar. 13, 2009, video length 6:06", https://www.youtube.com/watch?v=8S2gM5POUUk, Mar. 13, 2009, 1.
(Continued)

*Primary Examiner* — James S McClellan
(74) *Attorney, Agent, or Firm* — Saul Ewing LLP

(57) ABSTRACT

A method, implemented as computer code being executed by one or more processors, in which a computing device displays computer game graphics showing a shooter which a player can control to shoot out elements, such as balls, and which bounce against objects, such as pins, following a trajectory determined by the processor and then fall into scoring containers, with the processor causing a record of the score achieved to be stored; and in which the processor draws the scoring containers with dynamic faces that are animated in a specific way when an element falls into them.

43 Claims, 52 Drawing Sheets

Related U.S. Application Data filed on Apr. 11, 2013, provisional application No. 61/818,702, filed on May 2, 2013, provisional application No. 61/827,298, filed on May 24, 2013, provisional application No. 61/832,348, filed on Jun. 7, 2013, provisional application No. 61/832,355, filed on Jun. 7, 2013, provisional application No. 61/832,359, filed on Jun. 7, 2013, provisional application No. 61/832,362, filed on Jun. 7, 2013, provisional application No. 61/832,364, filed on Jun. 7, 2013, provisional application No. 61/832,369, filed on Jun. 7, 2013.

(30) Foreign Application Priority Data

| Mar. 12, 2013 | (GB) | .................................. | 1304442.5 |
| Mar. 12, 2013 | (GB) | .................................. | 1304444.1 |
| Mar. 13, 2013 | (GB) | .................................. | 1304545.5 |
| Apr. 4, 2013 | (GB) | .................................. | 1306117.1 |
| Apr. 4, 2013 | (GB) | .................................. | 1306118.9 |
| Jun. 13, 2013 | (GB) | .................................. | 1310589.5 |
| Jun. 13, 2013 | (GB) | .................................. | 1310592.9 |
| Jun. 21, 2013 | (GB) | .................................. | 1311119.0 |
| Aug. 7, 2013 | (GB) | .................................. | 1314147.8 |
| Sep. 10, 2013 | (GB) | .................................. | 1316045.2 |

(51) Int. Cl.
```
G07F 17/32      (2006.01)
A63B 71/06      (2006.01)
A63F 13/30      (2014.01)
A63F 13/40      (2014.01)
G06F 9/44       (2006.01)
A63F 13/428     (2014.01)
A63F 13/75      (2014.01)
```

(52) U.S. Cl.
CPC ............... *A63F 13/10* (2013.01); *A63F 13/12* (2013.01); *A63F 13/30* (2014.09); *A63F 13/428* (2014.09); *A63F 13/75* (2014.09); *G06F 9/44* (2013.01); *G07F 17/32* (2013.01); *G07F 17/3274* (2013.01)

(58) Field of Classification Search
USPC ..................................................... 463/20, 31
See application file for complete search history.

(56) References Cited

U.S. PATENT DOCUMENTS

| 6,117,013 | A | 9/2000 | Eiba |
| 7,073,792 | B2 | 7/2006 | Esposito et al. |
| 7,749,060 | B1 | 7/2010 | Olmes et al. |
| 8,002,633 | B2 | 8/2011 | Shimizu et al. |
| 8,075,404 | B2 | 12/2011 | Stamper et al. |
| 8,088,010 | B1 | 1/2012 | Hill et al. |
| 8,237,743 | B2 | 8/2012 | Csurka et al. |
| 8,277,320 | B1 | 10/2012 | Hart et al. |
| 8,369,873 | B2 | 2/2013 | Krasner et al. |
| 8,388,446 | B1 | 3/2013 | Craine et al. |
| 8,526,490 | B2 | 9/2013 | Buckley et al. |
| 8,672,744 | B1 | 3/2014 | Steere et al. |
| 8,711,923 | B2 | 4/2014 | Buckley et al. |
| 8,727,893 | B2 | 5/2014 | Otremba et al. |
| 8,784,181 | B2 | 7/2014 | Frank et al. |
| 8,964,830 | B2 | 2/2015 | Perlman et al. |
| 9,033,803 | B1 | 5/2015 | Etter et al. |
| 2002/0068632 | A1 | 6/2002 | Dunlap et al. |
| 2002/0082068 | A1 | 6/2002 | Singhal et al. |
| 2002/0094870 | A1 | 7/2002 | Murray et al. |
| 2003/0049592 | A1 | 3/2003 | Park et al. |
| 2003/0074416 | A1 | 4/2003 | Bates et al. |
| 2003/0119581 | A1 | 6/2003 | Cannon et al. |
| 2004/0053688 | A1 | 3/2004 | Hosaka et al. |
| 2004/0137987 | A1 | 7/2004 | Nguyen et al. |
| 2004/0224772 | A1 | 11/2004 | Canessa et al. |
| 2005/0256985 | A1 | 11/2005 | Shea et al. |
| 2006/0068876 | A1 | 3/2006 | Kane et al. |
| 2006/0160620 | A1 | 7/2006 | Matthews et al. |
| 2006/0223635 | A1 | 10/2006 | Rosenberg et al. |
| 2006/0277474 | A1 | 12/2006 | Robarts et al. |
| 2006/0281541 | A1 | 12/2006 | Nguyen et al. |
| 2006/0287098 | A1 | 12/2006 | Morrow et al. |
| 2007/0077993 | A1 | 4/2007 | Midgley et al. |
| 2007/0259709 | A1 | 11/2007 | Kelly et al. |
| 2008/0005353 | A1 | 1/2008 | Panabaker et al. |
| 2009/0170608 | A1 | 7/2009 | Herrmann et al. |
| 2009/0203415 | A1 | 8/2009 | Falciglia et al. |
| 2009/0209311 | A1* | 8/2009 | Bennett .................. G07F 17/34 463/16 |
| 2010/0144426 | A1 | 6/2010 | Winner et al. |
| 2010/0151934 | A1 | 6/2010 | Kniberg et al. |
| 2010/0218135 | A1 | 8/2010 | Brugler et al. |
| 2010/0227675 | A1 | 9/2010 | Luxton et al. |
| 2010/0271367 | A1 | 10/2010 | Vaden et al. |
| 2010/0317437 | A1 | 12/2010 | Berry et al. |
| 2011/0014977 | A1 | 1/2011 | Yamazaki et al. |
| 2011/0053681 | A1 | 3/2011 | Goldman et al. |
| 2011/0111835 | A1 | 5/2011 | Cohen et al. |
| 2011/0136561 | A1 | 6/2011 | Acres et al. |
| 2011/0136572 | A1 | 6/2011 | Karn et al. |
| 2011/0269532 | A1 | 11/2011 | Shuster et al. |
| 2012/0030094 | A1 | 2/2012 | Khalil et al. |
| 2012/0040752 | A1 | 2/2012 | Koo et al. |
| 2012/0077580 | A1 | 3/2012 | Mahajan et al. |
| 2012/0079126 | A1* | 3/2012 | Evans ................... G06F 9/4443 709/230 |
| 2012/0122552 | A1 | 5/2012 | Youm et al. |
| 2012/0191606 | A1 | 7/2012 | Milne et al. |
| 2012/0198417 | A1 | 8/2012 | Haviv et al. |
| 2013/0035164 | A1 | 2/2013 | Osvald et al. |
| 2013/0109469 | A1 | 5/2013 | Hill et al. |
| 2013/0172061 | A1 | 7/2013 | Iosilevsky et al. |
| 2013/0267285 | A1 | 10/2013 | Kelley et al. |
| 2013/0316832 | A1 | 11/2013 | Olofsson et al. |
| 2013/0323697 | A1* | 12/2013 | Shadduck ............. G09B 19/22 434/222 |
| 2013/0331162 | A1 | 12/2013 | Krivicich et al. |
| 2014/0024450 | A1 | 1/2014 | Ramachandran et al. |
| 2014/0080600 | A1 | 3/2014 | Knutsson et al. |
| 2014/0235338 | A1 | 8/2014 | Hansson et al. |
| 2014/0252987 | A1 | 9/2014 | Hinrichs et al. |
| 2014/0342791 | A1 | 11/2014 | Valeriano et al. |
| 2014/0357367 | A1 | 12/2014 | Lee |
| 2014/0370950 | A1 | 12/2014 | Jaksch et al. |
| 2015/0050997 | A1 | 2/2015 | Suzman et al. |
| 2015/0174489 | A1 | 6/2015 | Evald et al. |

FOREIGN PATENT DOCUMENTS

| EP | 1870143 A1 | 12/2007 |
| EP | 2211299 A2 | 7/2010 |
| JP | 2005-228086 | 8/2005 |
| WO | WO01/46790 | 6/2001 |
| WO | 2006/052212 A1 | 5/2006 |
| WO | 2007/078533 A2 | 7/2007 |
| WO | WO 2007/078533 | 7/2007 |
| WO | WO 2008/109685 A2 | 9/2008 |
| WO | 2009/029108 A1 | 3/2009 |
| WO | 2010/002897 | 1/2010 |
| WO | WO 2010/045716 A1 | 4/2010 |
| WO | 2010/083346 A1 | 7/2010 |
| WO | WO 2010/096784 A1 | 8/2010 |
| WO | 2011/011466 | 1/2011 |

(56) References Cited

FOREIGN PATENT DOCUMENTS

| WO | WO 2011/041467 A2 | 4/2011 |
|---|---|---|
| WO | WO 2012/013198 A1 | 2/2012 |
| WO | WO 2013/174933 | 11/2013 |

OTHER PUBLICATIONS

Anonymous, "Bejeweled 2 Wikipedia Article", Sep. 30, 2015, 1-3.
Anonymous, "Bejeweled article", Wikipedia, Sep. 30, 2015.
Anonymous, "Best iOS/Androoid cross-platform mobiledevelopment SDKs", retrieved from the Internet: URL:http://webification.com/best-iosandroid-cross-platform-mobile-development-sdks [retrieved on Jul. 2, 2013] XP055069062, Sep. 26, 2011, p. 1.
Anonymous, "Bubble Witch Saga—GameSpot", Retrieved from the Internet: URL:http://www.gamespot.co/bubble-witch-saga/ [retrieved on Mar. 21, 2014] XP055109245, pp. 1-2.
Anonymous, "Buck Rodgers Turn Based Strategy Game Design and Planning Document", https://cs.nyu.edu/courses/spring07/V22.0474.001/groups/tbsgame/tbsgame_des.pdf, Feb. 21, 2007.
Anonymous, "Candy Crush Saga Facebook Game levels 1-10 video on YouTube, YouTube screen shorts figures 1-7", https://www.youtube.com/watch?v=8TIeNDnJiN8, Apr. 15, 2012.
Anonymous, "Candy Crush Saga for Facebook, YouTube video demonstrating levels 1-10, video length 15:23", https://www.youtube.com/watch?v=cfqHVkWX5yE, Apr. 12, 2012, 1 page.
Anonymous, "Candy Crush Saga on Facebook Review on YouTube video, Screen shots of YouTube video, figures 1-13", https://www.youtube.com/watch?v=AbH8Givg6XM, Sep. 7, 2012.
Anonymous, "Cross-platform", retrieved from the Internet: URL:http://en.widipedia.org/w/index.php?title=Cross-platform &oldid=487867404 [retrieved on Jul. 7, 2013] XP055068984, Apr. 17, 2012, pp. 1-16.
Anonymous, "Daily Bonus Level Oct. 17, 2012: Bubble Witch Saga Fan Site", retrieved from the Internet:URL:http://bubble-witch-saga.se/daily-bonus-level-17-oct-2012/ [retrieved on Mar. 21, 2014] XP055109244, Oct. 17, 2012, pp. 1-2.
Anonymous, "Dig Dug article", Wikipedia, Sep. 30, 2015.
Anonymous, "Facebook Platform—Wikipedia, the free encyclopedia", Retrieved from the Internet: URL:http://en.wikipedia.org/w/index/php?title=Facebook_Platofrm&oldid=533105338 [retrieved on Mar. 21, 2014] XP055109249, pp. 1-2.
Anonymous, "Facebook Spiel Candy Crush Saga: Cheats, Tipps, News and Videos BILDspielt", URL: http://www.bildspielt.de/social-games/3-gewinnt/candy-crush-saga-180643/ [retrieved on Oct. 25, 2013] XP055085339, Apr. 12, 2012, pp. 1-10.
Anonymous, "Game Architecture: Model-View-Controller", retrieved from the Internet: URL:http://www.koonsolo.com/news/model-view-controller-for-games/ [retrieved on Oct. 8, 2013] XP055083073, Jul. 13, 2009, pp. 1-2.
Anonymous, "Guide to Bubble Witch Saga—Facebook Hints & Tips—How to level guide", retrieved from the Internet: URL:http://reindeerz.hubpags.com/hub/Bubblewitch [retrieved on Dec. 12, 2012] XP055092347, Apr. 10, 2012, pp. 1-2.
Anonymous, "iPhone Game 'Trism' break $250,000. Review.—[Updated] razorianflyofficial", retrieved from the Internet: URL: https://razorianflyofficial.wordpress.com/2008/09/25/iphone-game-trism-breaks-25000-review/, [retrieved on Apr. 15, 2015] XP055183153, Sep. 26, 2008.
Anonymous, "King.com expands to Google+ with Bubble Witch Saga", Retrieved from the Internet: URL:http://www.insidesocialgames.com/2012/01/24/king-com-expands-to-google-with-bubble-witch-saga/ [retrieved on Mar. 21, 2014] XP055109246, Jan. 24, 2012, pp. 1-2.
Anonymous, "King.com Skill Games for iPhone and Facebook: http://www.ubergizmo.com/2009/07/king-com-skill-games-for-iphone-and-facebook/", retrieved from the Internet: URL:http://www.google.de/imgres?client=firefox-a&hs=0gJ&sa=X&rls=org.mozilla:en-GB:official&biw=1680&bih=858&tbm=isch &tbnid=Dp0hnHVKMxtoUM:&imgrefurl=http://www.ubergizmo.com/2009/07/king-com-skill-games-for-iphone-and-faceboo, Jul. 13, 2009, pp. 1-2.
Anonymous, "Minecraft", retrieved from the Internet: URL:http://en.widipedia.org/w/index?title=Minecraft&oldid=409326251 [retrieved on Jul. 7, 2013] XP055068987, May 2, 2014.
Anonymous, "Model-view-controller", retrieved from the Internet: URL:http://en.widipedia.org/w/index/php?title=Model%E2%80%93view%E2%80%93controller &oldid=511810952 'retrieved on Oct. 8, 2013] XP055083072, Sep. 11, 2012, pp. 1-2.
Anonymous, "OpenOffice, Creating Charts and Graphs", Dec. 2004, 1-17.
Anonymous, "Pygame", retrieved from the Internet: URL:http://web.archive/org/web/20120413123244/http://www.pygame.org/wiki/tut_design [retrieved on Oct. 8, 2013 XP055083074, Apr. 13, 2012, pp. 1-5.
Anonymous, "Search for Play Free Online Games on GamesGames.com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point", retrieved from the Internet: URL:http://web.archive.org/web/20120621061714/http://www.gamesgames.com/games/social-games/social-games.html [retrieved on Oct. 15, 2013] XP055084089, Jun. 21, 2012, pp. 4-6.
Anonymous, "Why King.com's Candy Crush is crushing it on Facebook", retrieved from the Internet: URL: http://blog.games.com/2012/05/01/why-king-coms-candy-crush-is-crushing-it-on-facebook/ [retrieved on Oct. 25, 2013] XP055085338, May 1, 2012, pp. 1-4.
Collins, "Will Collins Game Spotlight: Candy Crush Saga", retrieved from the Internet: URL:https//developers.facebook.com/blog/post/2012/06/15/game-spotlight-candy-crush-saga/ [retrieved on Oct. 25, 2013] XP055085345, Jun. 15, 2012, pp. 1-2.
Demeter, "Trism: Upcoming iPhone Game by Demiforce", retrieved from the Internet: URL: https://www.youtube.com/watch?v=hy0ptZisr70, [retrieved on Apr. 16, 2015] XP054975820, Feb. 26, 2008.
Dotson, "Bubble Witch Saga Pops Bubbles o iOS and Facebook >148Apps> iPhone, iPad, and iPod touch App Reviews and News", retrieved from the Internet: URL:http://www.148apps.com/news/bubble-witch-saga-pops-bubbles-ios-facebook/ [retrieved on Dec. 9, 2013] XP055092342, Jul. 27, 2012, pp. 1-2.
Duffy, "Home Product Guies Software Internet 7 Great Google+ Games You Might Also Like", retrieved from the Internet: URL:http://www.pcmag.com/article2/0,2817,2391136,00.asp [retrieved on Oct. 15, 2013] XP055084091, Aug. 16, 2011, p. 1.
Josef, "Bloxley Tutorial #1—Sokoban", http://bloxley.net/2010/10/tutorial-1-sokoban, Oct. 13, 2010.
Murphy, "Bejeweled 2 Strategy Guide", www.bigfishgames.com, Aug. 15, 2010.
Namco, "Dig Dug Video Game (copy unavailable)", 1982.
Popcap, "Bejeweled Video Game (copy unavailable)", 2001.
Rua, "Candy Crush Saga Gameplay First Look (Episode 1-10 levels)", retrieved from the Internet: URL: https://www.youtube.com/watch?v=8TIeNDnJiN8 [retrieved on Apr. 16, 2015] XP054975821, Apr. 15, 2012.
Schoenau-Fog, "The Player Engagement Process—An Exploration of Continuation Desire in Digital Games", http://www.digra.org/wp-content/uploads/digital-library/11307.06025.pdf, 2011.
Squires, "Bubble Witch Saga is going mobile—Gamezebo", retrieved from the Internet: URL:http://www.gamezebo.com/news/2012/06/27/bubble-witch-saga-going-mobile [retrieved on Dec. 9, 2013] XP055092339, Jun. 27, 2012, pp. 1-2.
Anonymous, "Salesforce Tutorial—Model View Controller (MVC)", [online] Retrieves from the Internet: <https://web.archive.org/web/20130814042919/http://www.salesforcetutorial.com/model-view-controller-mvc/> [retrieved Jul. 1, 2016], Apr. 10, 2013.

* cited by examiner

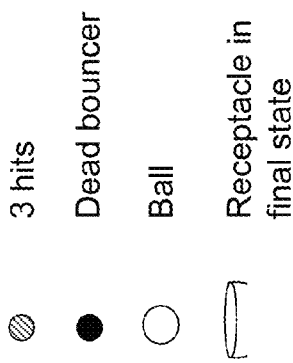
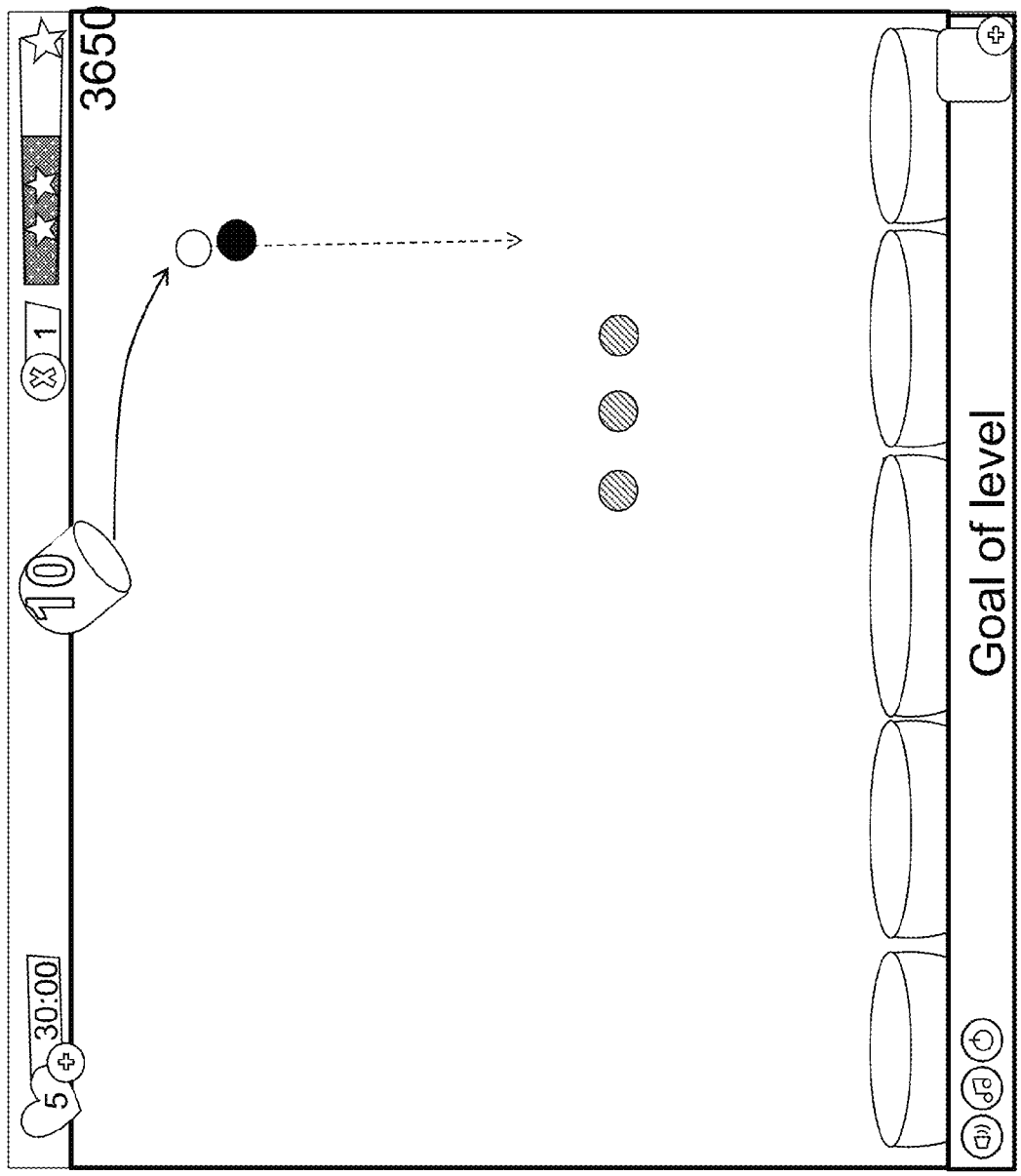
Figure 9

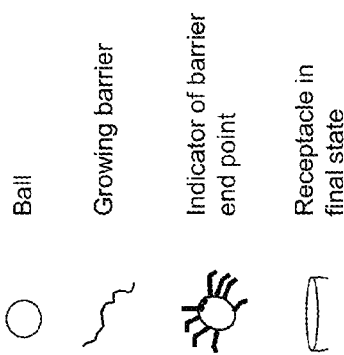
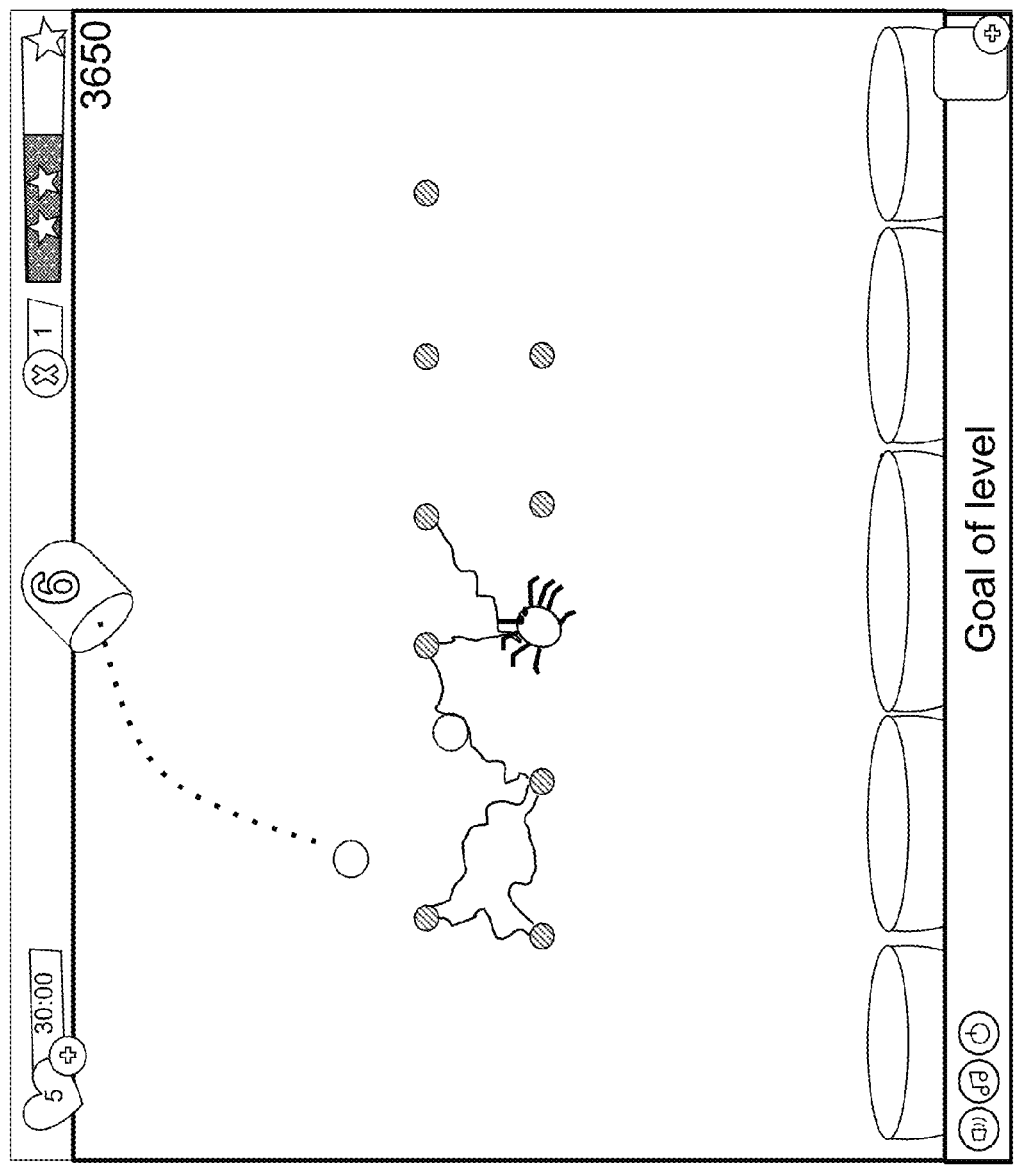
Figure 16

More PapaGrande combinations
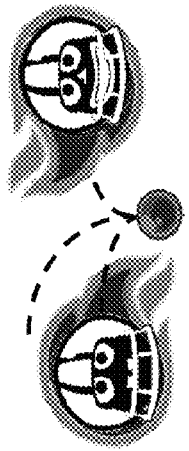
Extra Ball also Fuerte double Fire
- Works as PapaFuerte fire
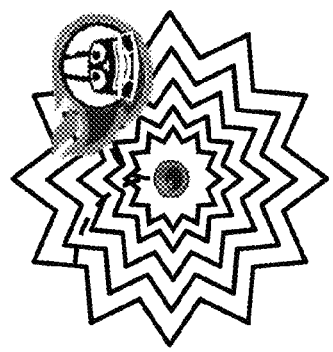
PapaFuerte double fire Blast
- 1,5 bigger blast
- Extra radius animation
- Destroy items in 1 blast
- Destroy with a double fire impact radius
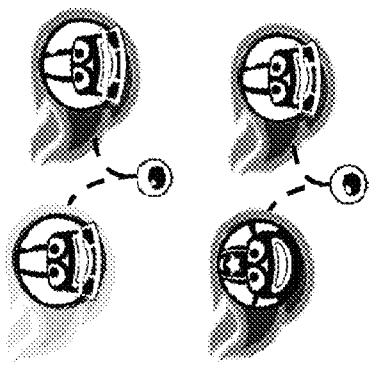
PapaFuerte double fire
- Grande physics
- Destroy like Fire
- Destroy items with 1 bounce
- Impact radius like double fire
Figure 26

METHOD FOR IMPLEMENTING A COMPUTER GAME

CROSS-REFERENCE TO RELATED APPLICATIONS

This application is based on, and claims priority to U.S. Provisional Application No. 61/701,907, filed Sep. 17, 2012; UK Application No. 1302121.7, filed Feb. 6, 2013; UK Application No. 1302910.3, filed Feb. 19, 2013; UK Application No. 1304442.5, filed Mar. 12, 2013; UK Application No. 1304444.1, filed Mar. 12, 2013; UK Application No. 1304545.5, filed Mar. 13, 2013; UK Application No. 1306117.1, filed Apr. 4, 2013; UK Application No. 1306118.9, filed Apr. 4, 2013; U.S. Provisional Application No. 61/811,019, filed Apr. 11, 2013; U.S. Provisional Application No. 61/818,702, filed May 2, 2013; U.S. Provisional Application No. 61/827,298, filed May 24, 2013; U.S. Provisional Application No. 61/832,348, filed Jun. 7, 2013; U.S. Provisional Application No. 61/832,355, filed Jun. 7, 2013; U.S. Provisional Application No. 61/832,359, filed Jun. 7, 2013; U.S. Provisional Application No. 61/832,362, filed Jun. 7, 2013; U.S. Provisional Application No. 61/832,364, filed Jun. 7, 2013; U.S. Provisional Application No. 61/832,369, filed Jun. 7, 2013; UK Application No. 1310589.5, filed Jun. 13, 2013; UK Application No. 1310592.9, filed Jun. 13, 2013; UK Application No. 1311119.0, filed Jun. 21, 2013; UK Application No. 1314147.8, filed Aug. 7, 2013; and UK Application No. 1316045.2, filed Sep. 10, 2013, the entire contents of each of which being fully incorporated herein by reference.

BACKGROUND OF THE INVENTION

Field of the Invention
This invention relates to casual social games.
Technical Background
There are multiple technical challenges facing the designer of computer-implemented games to create a fun and compelling game. Three of these challenges can be broadly categorised into the following areas: 'engagement'; 'viralisation' and 'monetisation'.

We will look first at 'engagement', which involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills Effective engagement requires various forms of feedback to reinforce players' sense of success and accomplishment. Effective engagement can be greatly magnified if the game has as social aspect—for example if it is linked to a social network so that game players can interact with their friends in the social network. The game can then transform into something that goes far beyond a solo game experience and become more like a shared journey.

'Viralisation' requires a game to include various techniques that encourage players to share the game with others, encouraging them to play the game. It is a key technique in enabling mass-scale distribution or penetration of games. Viralisation can be especially effective when the game is integrated into or connected to a social network environment in some manner, so that the game can then propagate through the network of player's friends, and their friends and so on.

'Monetisation' covers those techniques that enable revenue to be generated from a game; this involves many challenges, because the monetisation techniques need to be acceptable to players and in no way undermine engagement.

A successful and original game will require a team of game designers to solve complex problems of engagement, viralisation and monetisation; this can take many months of skilled work and, not infrequently, a great deal of trial-and-error testing of new ideas, functions and game mechanics before a game successfully combines all these elements into a new experience.

A 'match-3 game' is a type of casual puzzle game where the player is required to find patterns on a seemingly chaotic board. The player then has to match three or more of the same type of game element on the game board and those matched elements will then disappear.

One variant of casual games are the so called 'clicker' games where the player can click on a group of adjacent game elements of a certain type and those will then be removed. Some clicker games only require two adjacent objects to remove those elements if clicked by the user.

Another type of match-3 games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game objects from the top of the board with the physics of the game board being that the game pieces are falling downwards on the board.

Another type of match-3 game are the so called 'shooter' games where the player launches for instance a ball or bubble on to the game board tying to aim at groups of similar game elements already on the game board. If the launched ball hits or forms a group of more than 3 similar game elements then that group of game elements are removed from the game board. In a typical shooter game the physics of the game board being that the game pieces are falling downwards on the board.

There are also other types of games where groups of certain game elements are combined together and removed when they have reached a certain size. The user can connect the groups with a swiping movement touching each of the connecting elements in one implementation and in another implementation the groups are formed to one group when the elements of the same type are adjacent, the player then removes the group for instance by clicking on that group.

This patent specification describes not only various ideas and functions, but also their creative expression. A portion of the disclosure of this patent document therefore contains material to which a claim for copyright is made and notice is hereby given: Copyright King.com Limited 2012 and 2013 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

DISCUSSION OF RELATED ART

The pachinko game is a classical Japanese type of games where a ball is released in to a game board and generates points or events based on what objects the ball bounces on. If the balls go into certain locations, they may be captured and sequences of events may be triggered that result in more balls being released. Pachinko machines were originally strictly mechanical, but modern ones have incorporated extensive electronics, becoming similar to video slot machines. There are also virtual pachinko machines played on a computer.

Computer games have developed alongside with the development of computers and the games sometimes mimic real world games such as poker or pool. There are several computer games that share the main elements with the classical pachinko games. One such computer game is 'Peggle' by PopCap where the player shoots a ball from a ball launcher and the object of the game is to clear a defined number of a certain type of pins from the game board by bouncing the ball on the pins.

Other games that also derive ideas from the classical pachinko games are for example 'HotShot' by PlayQ and 'Coin Drop' by Full Fat.

There is a need for a new game that offers further benefits to players and provides a fun and engaging gaming experience with viral elements and that allows the game developer to monetise from the gaming experience.

SUMMARY OF THE INVENTION

A first aspect is:

A method, implemented as computer code being executed by one or more processors, in which a computing device displays computer game graphics showing a shooter which a player can control to shoot out elements, such as balls, and which bounce against objects, such as pins, following a trajectory determined by the processor and then fall into scoring containers, with the processor causing a record of the score achieved to be stored;

and in which the processor draws the scoring containers with dynamic faces that are animated in a specific way when an element falls into them.

Any one or more of the following optional features may be included, resulting in a method:

in which at least one container includes animated arms which are animated under the control of the processor in which at least one container alters colour under the control of the processor when an element falls into it in which all containers have to alter colour for a player to pass a level in which at least one container is drawn by the processor with a blocking lid that only disappears once one or more elements land in that lid in which special items, such as fruit with animated faces, must land on a lid for that lid to disappear in which the processor shows all elements, such as balls, remaining after the player has completed a level as being automatically shot out over a short time interval and in random directions, providing a bonus sequence in which the processor creates a sound effect when an element falls into a container in which the processor creates a sound effect when an element bounces against an object, and one or more, or each, object is associated with a unique sound effect in which the processor shows objects the elements bounce against as pins with animated faces in which the processor shows stars earned on a level with animated with faces, such as a happy face if the star is earned by the player and sad if not earned by the player in which the processor shows progress of the player through the levels of the game on a path that winds through a virtual landscape in which the processor shows the virtual landscape including fruits that the processor animates to appear as though dancing to music in which the processor shows some levels as having goals to bring down specific types of game elements, such as fruits to the containers in order to pass a level.

in which the processor shows these specific game elements as being placed in various positions amongst the pins in the game area, and by removing pins these game elements will change their position and eventually fall down.

in which the processor shows another goal to complete a level is being to remove X amount of pins of a certain type of pin, where the type of pin and number may vary between levels.

in which some or all game levels are untimed, eliminating any time pressure in which the game is a casual, social game and some or all levels have a true fail, to enable monetization through purchasing extra moves;

in which there is a continuous musical soundtrack plays during gameplay in which the game generates and displays congratulatory messages when the player scores more than a predefined amount, or matches more than a predefined number of game elements, in a single move in which there is an algorithm for automatically detecting when there are no possible moves left in which there is an algorithm for re-shuffling the elements on the game board.

in which a processor generates, if no move has been made for a while, help or hints by brightening and enlarging game elements used in a possible move on the board with a flashing animation, such as an animation that occurs once, or repeats twice or thrice in which a processor is programmed to require a player to reach a target score before running out of moves in order to complete a level successfully, but completing the level is not timed in which a processor is programmed to automatically replenish a life for a player in 30 minutes in which a processor is programmed so that, if a player finishes a level in under the target number of moves, then random game elements on the game board are triggered and give the player bonus points in which a processor is programmed so that, if a level is finished with moves left, those moves are converted to special game elements that trigger for extra bonus points in which a processor is programmed so that the game generates and displays congratulatory messages when the player scores more than a predefined amount, or matches more than a predefined number of game elements, in a single move in which a processor is programmed so that the player can ask his friends for lives in which a processor is programmed so that the player can ask his friends for other help in which social network friends are prompted to assist another player if that other player has played, but not completed, a level meeting a certain criteria in which a processor is programmed so that the player can send gifts to friends in which a processor is programmed so that the game can be synchronized between different devices in which a processor is programmed so that a player can seamlessly stop and re-start playing the game at any time since game state information is stored, e.g. remotely and/or on the playing device in which every change in the game state, such as every move of a game piece by the user, and every consequential change in every game piece on the game board, is accompanied by sound and visual feedback to provide immediate, positive gratification to the player in which game state information is preserved, enabling a remote server system to identify a player and all aspects of the state of the game they are playing, so that the player can end game play on one device and resume from a different device at a later time at exactly the same state in which the different device can be a different type of device, so that the player can move seamlessly between playing the game on a smartphone and on a tablet in which a remote server system can identify a player because that player has accessed the game through a social network in which the game is a casual, social game, namely a game that can be downloaded as an app to a smartphone and/or tablet computer and which can be accessed or played using a social network application or environment in which the processor is programmed to show a virtual path or other virtual world that indicates the level reached by the player and that player's social network friends A second aspect is:

A computing device adapted to play a computer game, the device including a processor, a memory, a display, a touch screen or a cursor based input device, and computer code stored in device memory or on a remote server and executable by the device processor or a remote processor, and in which the computer code generates computer game graphics for the display on the device, showing:
  (a) a shooter which a player can control to shoot out elements, such as balls, and which bounce against objects following a trajectory determined by a processor and then fall into scoring containers, with a processor causing a record of the score achieved to be stored; and
  (b) scoring containers with dynamic faces that are animated in a specific way when an element falls into them.

A third aspect is:

A non-transitory computer readable medium encoded with instructions for controlling a computer system to display a game on a display, the instructions including instructions for enabling the display to show:
  (a) a shooter which a player can control to shoot out elements, such as balls, and which bounce against objects following a trajectory determined by a processor and then fall into scoring containers, with a processor causing a record of the score achieved to be stored; and
  (b) scoring containers with dynamic faces that are animated in a specific way when an element falls into them.

BRIEF DESCRIPTION OF THE DRAWINGS

FIG. 9 shows an exemplary game board with a blocker element.
FIG. 16 shows an exemplary game board with a 'spider' mechanic.
FIG. 26 shows exemplary special balls.

DETAILED DESCRIPTION

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

Figure 1:
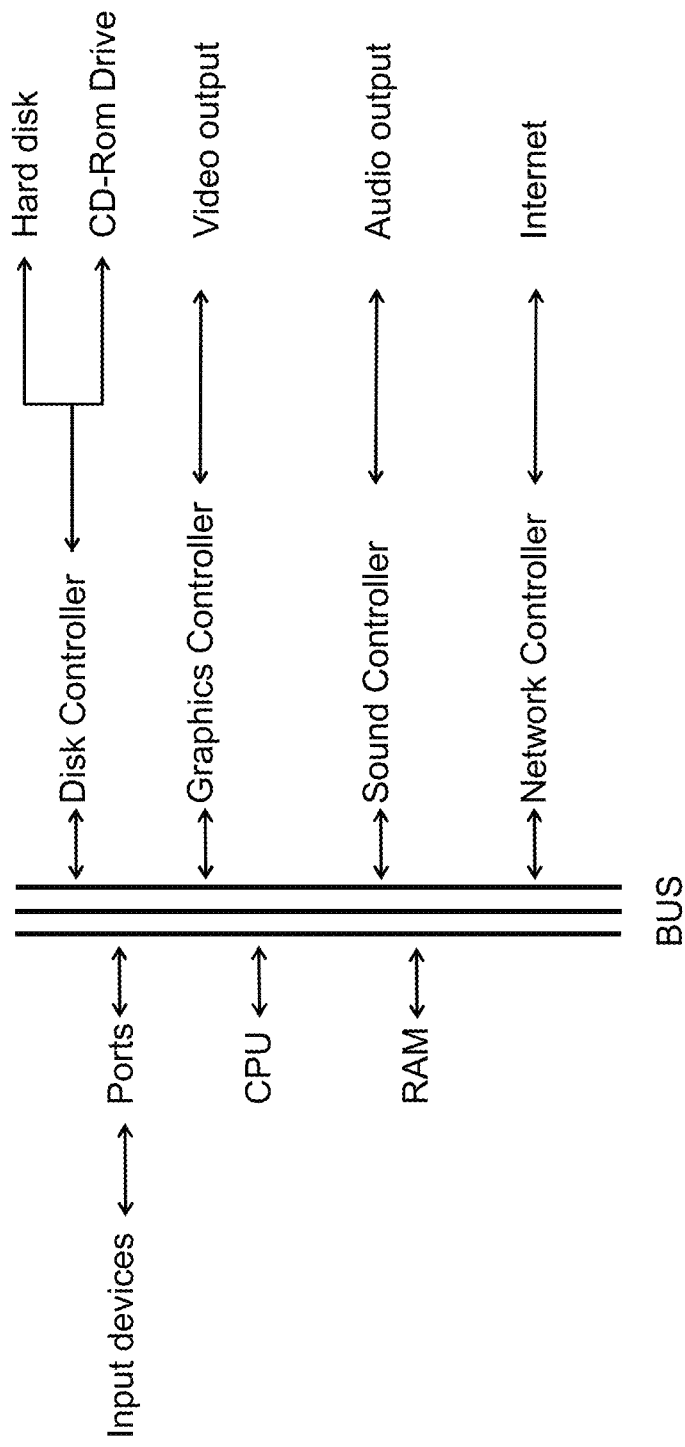
FIG. 1 Shows a schematic illustration of a computing device.

FIG. 1 shows a schematic picture of a computing device, containing a Central Processing Unit and Random Access Memory. The CPU acts according to input given from input devices, such as a keyboard, mouse or touchscreen. Computer BUSes are used to communicate, both between input devices and the CPU, but also between different controllers within the computer device, such as the graphics controller and the network controller. These controllers in turn communicate with external devices, such as a monitor for video output with which the graphics controller communicates, and the network controller communicates with for instance the internet, through wireless or wired connections. A user can interact with the computing device through input devices, such as a pointing device (e.g. a mouse) and a keyboard.

Figure 2:
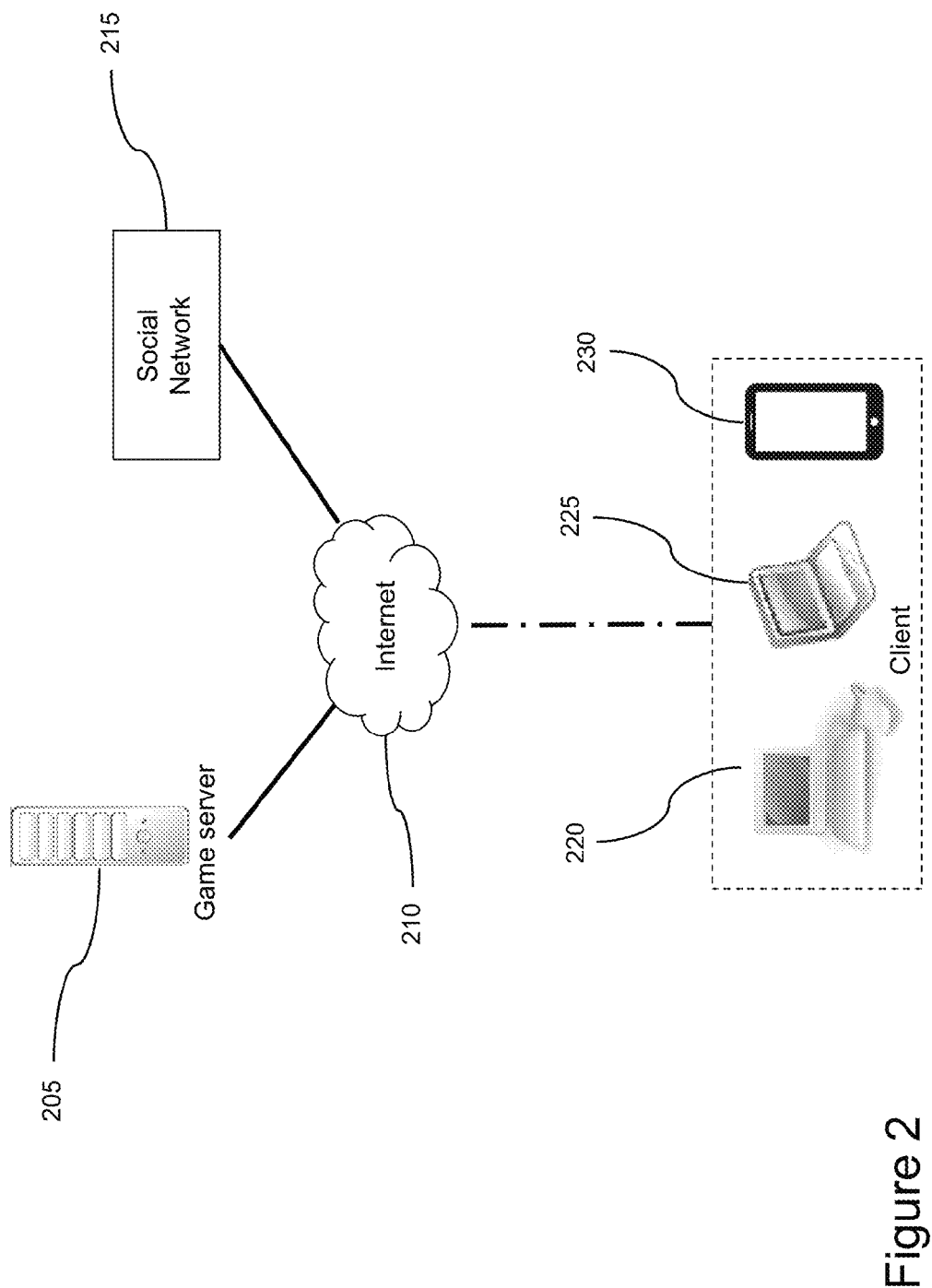
FIG. 2 shows an exemplary environment.

FIG. 2 portrays an exemplary overall environment in which the present invention can be utilized. A virtual game is stored on for instance a game server 210. The virtual game is to be played on a client device, such as a computer 240, 250 or a smartphone or other handheld device 260. The client device can also be a kiosk, arcade gaming station, smart TV or other device with computing capabilities, input devices and a screen that can present the game to a user. The client device communicates with a game server 210 and a social network server 230, for instance through the Internet 220 or other network. It should be understood that the social network 230 and the game server 210 does not have to be located in different places, they could be on the same server or on a plurality of servers located in different locations. An environment where the invention may be implemented is described in PCT/EP2013/060641 which is hereby incorporated by reference. People skilled in the art will understand that other devices than the exemplary ones listed can be also be used without departing from the spirit and scope of the invention.

Different Implementations

The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game may be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction key that for instance allows the user to move a pointer or cursor or highlighted area on the screen.

Over the course of players playing the game, data will be produced. This data can for instance be related to a player's game performance or to game information related to a social network to which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game is not exhaustive, what is described herein are certain preferred embodiments. It is possible to implement the way in a number of variations without departing from the spirit or scope of the invention.

Game Overview

The techniques described in this patent are to a great extent embodied in King.com's game Papa Pear Saga™, it is however understood that the inventions described can be implemented in many different ways and it is not intended to be limited to only one game.

The techniques described in this patent will be referenced to a virtual 2d game with a game board that has a power of gravity that will pull the launched ball downwards on the game board. A person skilled in the art will understand that the game can be implemented also with other physical properties and directions of the game board. The specification is not intended to be limited to a 2d game only and the ideas herein can be implemented also in a 3d game as will be understood by a person skilled in the art.

The terms 'user' and 'player' are used interchangeably throughout this document and no specific meaning is intended using one or the other term unless the context suggests otherwise.

Figure 3:
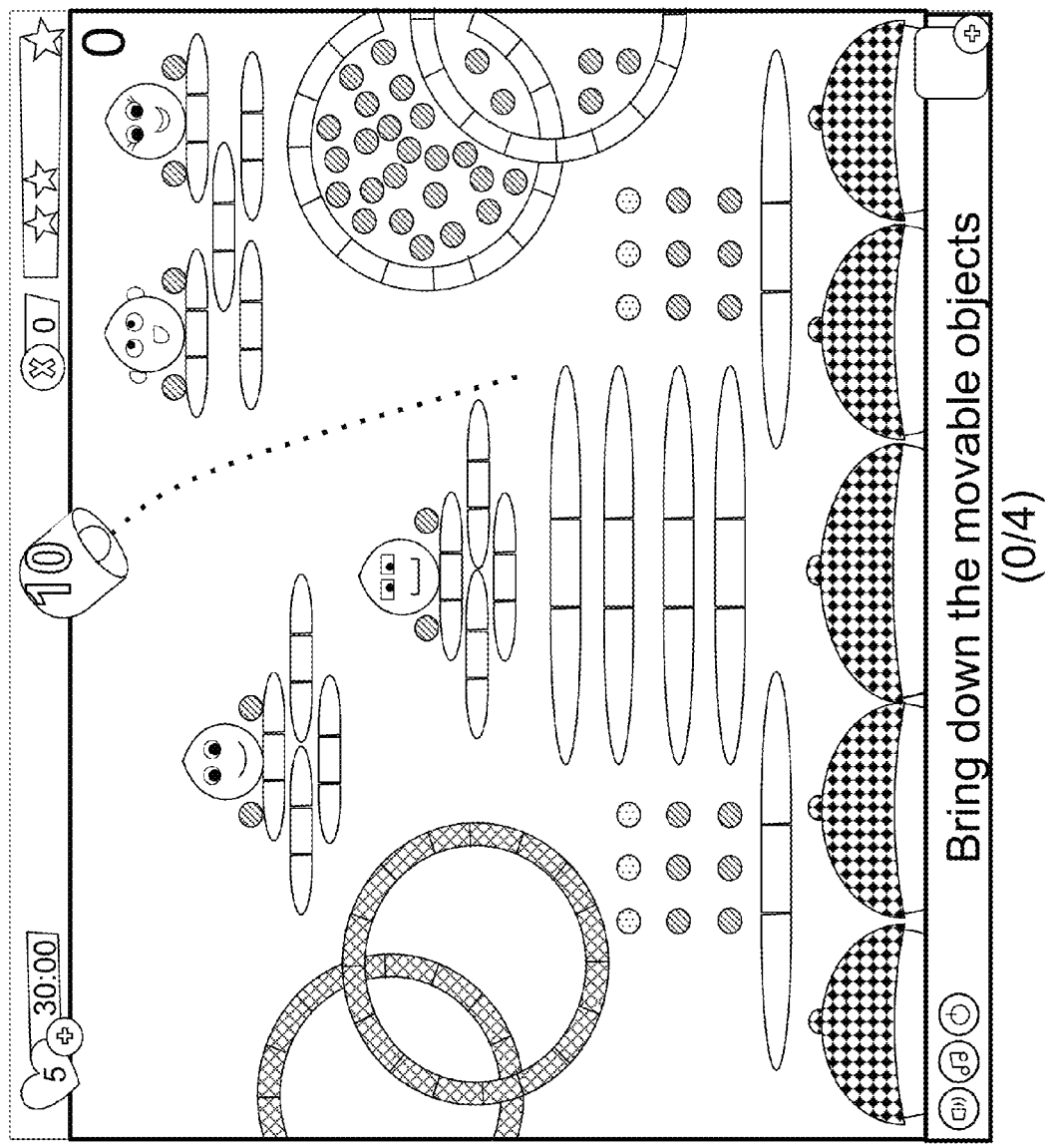
FIG. 3 shows an exemplary game board.

A main game mode is to shoot balls out of a ball launcher at the top end of the game board and try to make the balls bounce on game objects fixated on to the game board or moving on the game board to collect points before the balls land in one of the receptacles at the lower end of the game board as can be seen in FIG. 3.

The game can be played in different game modes, which will be described in further detail below. In one game mode, the player has a limited number of balls to shoot at the start of the game. The player can aim by moving the mouse around or by pointing with his finger if the games played on a device with a touch screen.

Figure 4:
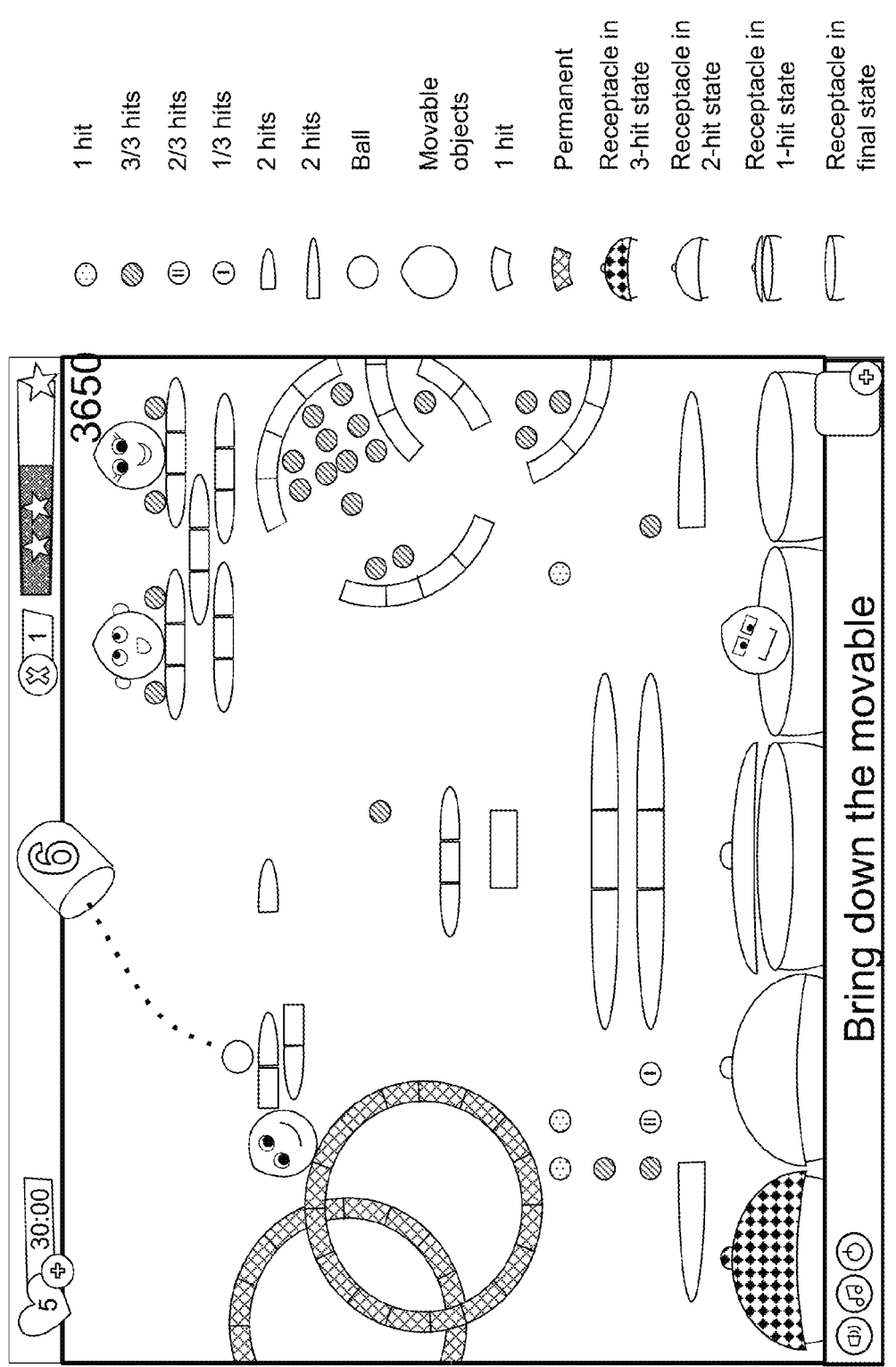
FIG. 4 shows an exemplary game board.

In some embodiments a level is completed when the player has had at least one ball land in each of the plurality of receptacles as shown in FIG. 3 and FIG. 4.

In some embodiments a level is completed when the player has hit a certain number of a specific object type on the game board. The number of hits may be for all of the game elements of that type to be removed or for only some of them to be removed. This is exemplified in FIG. 5.

In some embodiments, the user can control the power or speed of the ball being shot out. The power of the shot is built up as you press the virtual button and the ball is shot when the player releases the virtual button. The power of the shot can be presented visually or audibly to the user with for instance a colour code or sound that changes as the shot is energised. The power of the shot can also be presented in a number of other ways such as a dial, a meter that grows with power or by an arrow pointing in the shot's direction which gets longer or shorter depending on how hard the shot will be.

The game will typically use a physics engine to simulate the how the ball will bounce on the game board. Different implementations of the game can use different physics engines or simulate the physical properties of the objects in the game in other ways recognisable to the person skilled in the art. One such 2D physics engine is the Box2D engine developed by Erin Catto.

In some embodiments of the game the physics engine simulates a curved trajectory of the ball when it is being shot out from the ball launcher to simulate a downward force of gravity as well as the power received from the ball launcher.

To assist the player the game can be implemented with an aim line that illustrates the trajectory of the ball from the ball launcher. In some embodiments the aim line will stretch out to the first game object the ball will bounce on and in other implementations the aim line will only stretch out to a set distance on the game board. The aim line may in some embodiments show one or several of the bounces the ball will make if the ball would be shot in that angle. This can in some embodiments be a power-up that the player can buy or earn.

The gameplay allows different implementations of the number of balls that the player can launch in to the game board and then be active on the game board at the same time. In a typical implementation the game allows for three balls to be active on the game board at the same time. If one of the balls would hit a special game object that causes the ball to split in two then there would typically be four balls active on the game board or more if one of the balls were split again. However, several different implementations are possible to the person skilled in the art.

The player can shoot out a new ball as soon as one of the active balls lands in a receptacle or disappears from the game board by for instance hitting a certain type of special game object.

The game can in some implementations have objects on the game board that are non-removable and are not affected by the ball. The ball can in certain game board layouts be trapped after having lost its velocity and there are different ways to allow the ball to continue in the gameplay. In some embodiments the ball will bounce by itself after that the game has determined that the ball has been 'trapped' with the purpose of that the ball will move from its trapped position. The bouncing can be hard or less hard depending on various implementations.

The player is in some embodiments offered the option to re-launch the ball when it has been 'trapped' or to place or move the ball to another location in the game board. In one exemplary implementation, the ball is returned to the launcher after the game has determined that the ball has not moved within a threshold for a predetermined time. This time can be long or short and for instance 3 seconds. The player will then be allowed to re-launch the ball but still keep the score the ball had collected on its first release on to the game board.

In a typical implementation, there are five receptacles at the bottom of the game board. The number of receptacles can vary between levels in the game or in different implementations of the game. The change in the number of receptacles will change the gameplay and can be used as a way to adjust the difficulty of a level.

Figure 6:
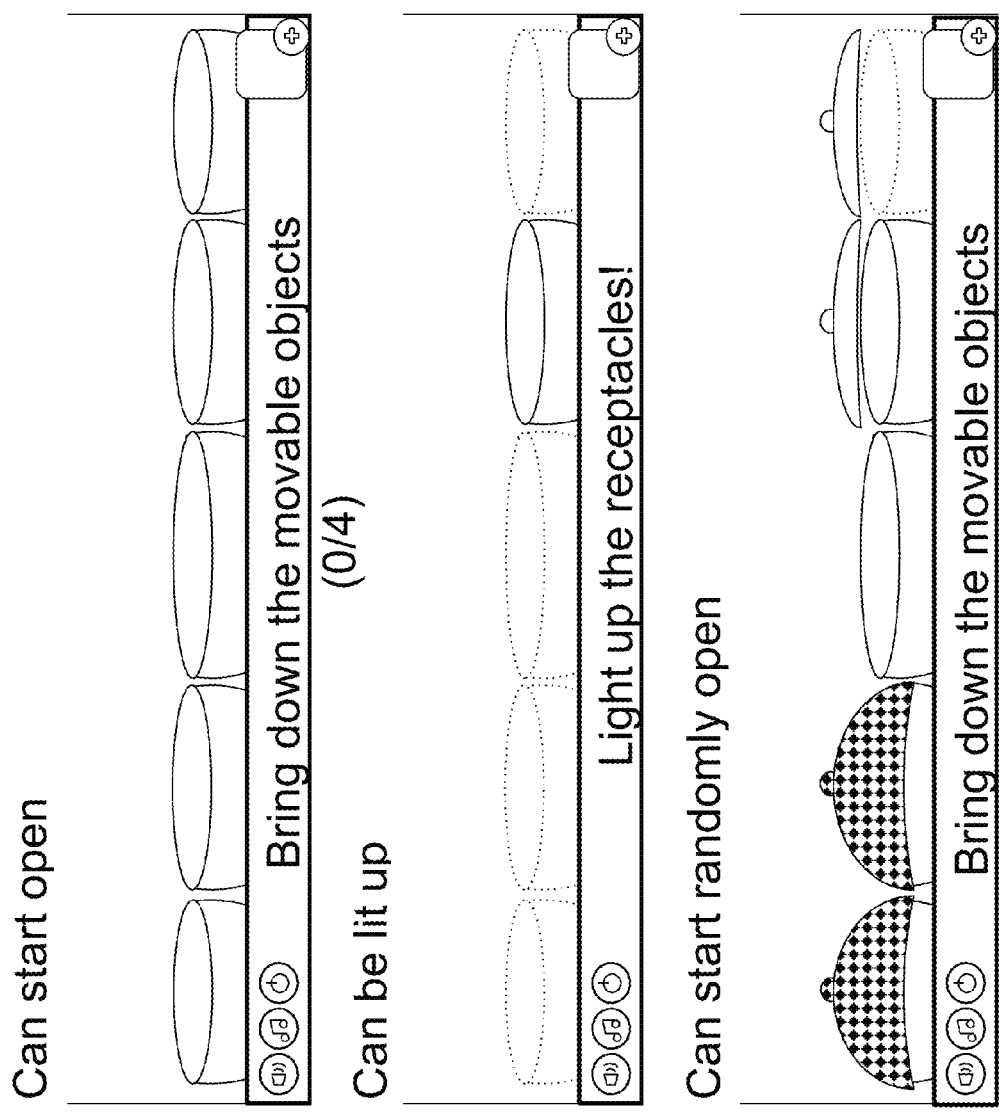
FIG. 6 shows an exemplary implementation of the states of the receptacles.

The receptacles can have different states as shown in FIG. 6. In one of the game modes the goal is to 'light up' all the receptacles; i.e. to get each receptacle to its final 'lit' state by landing one or more balls in that receptacle. The number of times the player has to land a ball in or on the 'lid' of the receptacle in order to get the receptacle to the final state can vary between different implementations. For instance, in some implementations the player needs to land a ball three times in a receptacle to get the receptacle to the final state.

The receptacles can start a level at different states and not all receptacles need to have the same state at the start of the level. As an example, at the start of a level one receptacle can be in the final state already, one receptacle can require only one ball to land in it to get the receptacle to the final state, one receptacle needs two balls to land in it and two receptacles need three balls to land in them to get those receptacles to the final state.

In some implementations there can be certain events in the game that takes one or several of the receptacles back one or several states so that the ball needs to land in the receptacle again to get the receptacle to or closer to the final state. Those certain events can for instance be that a ball has hit a specific game object, that the ball has bounced on certain game objects in a certain combination or that the player has shot the ball straight in to the receptacle without that the ball has hit any other game object on the way.

The different states of the receptacles can be implemented in several different ways. One implementation is that the receptacle is colourful and/or lit when it has reached the final state. The states before the final state can be illustrated with that the receptacle is grey or uncoloured. The states that are not the final state can also be shown as if the receptacle has a lid, web or some other object covering the opening to the receptacle. If the ball hits that cover the cover can be removed or adjusted to represent that the receptacle has changed state and is one state closer to the final state.

Game Goals

The game can be implemented with different goals, which the player is required to reach in order to complete the level. Goals can be implemented with a single goal for a level or as a combination of goals to reach and that the level is not completed until all of the set goals have been reached.

The game can be implemented with a limited number of balls for the player to use to achieve a goal. The number of available balls typically decreases as the balls are used by the player to shoot out on to the game board. The player may be awarded additional balls during the game as a reward for good gameplay. The number of balls may also be decreased as a result of certain events in the player's gameplay. The game is ended if the player has used up all balls without having reached the goal for that game or level in the game. The player may be offered to add balls to continue the game, such offer can be that the player may buy more balls or may perform another action in return for additional balls. The player may in some implementations add more balls to the available balls in the level by using a power-up that is available to the player. Such power up or the balls themselves may be or have been bought or received as a gift. Another goal that can be implemented is for the player to reach a certain score on a certain level in the game. The player can collect points in a number of different ways, some of which are described in this document. Reaching a higher score than the lowest score target can be rewarded in certain implementations.

The game can also be implemented with a time limit for the player to reach a certain goal or plurality of goals. The player can for instance be required to collect 10,000 points within one minute or land one ball in each receptacle within 2 minutes. The player can in some implementations extend the available time by good gameplay such as reaching a certain score or getting the ball to bounce on certain objects or in a certain sequence. The player can in some implementations add more time to the available time on the level by using a power-up that is available to the player. Such power up can be or have been bought or received as a gift.

One goal that can be implemented is that the player has to get at least one ball to land in each of the receptacles for the receptacle to reach the final state and the goal to be reached. The receptacles can, as described above, have different states and some states require more than one ball to land in the receptacle for it to reach the final state. The player can in some implementations be offered to buy or to receive a power-up that will change the state of one or a plurality of the receptacles when activated by the player. Such power up can be or have been bought or received as a gift.

One game goal can be to get the receptacles to the final state in a predefined or set order. The order can for instance be from right to left or from left to right. Any number of alternative orders to bring the receptacles to the final state can be implemented.

A further goal that can be implemented is that the player is required to get all the receptacles to the final state but is only allowed to shoot the ball to land in one specific receptacle. Some of the receptacles are active and accept balls while others are inactive and reject the balls that land in them. When a ball hits an inactive receptacle, the receptacle rejects the ball and the player loses that ball. When a ball enters one of the active receptacles that receptacle gets to the final state and one of the inactive receptacles turns to an active receptacle.

A further goal that can be implemented is to bring certain 'movable objects' on the game board to fall in to the receptacles as exemplified in FIG. 3 and FIG. 4. These objects are loose objects that can be hit by the balls and will move on the game board in response to being hit by a ball. The player can then aim at these movable objects and try to get them to move in to one of the receptacles. Other game objects can hinder the movable objects so that the movable objects do not fall in to the receptacles. The player can then shoot the balls at the game objects and if the game objects are such that they disappear after one or several hits by a ball they disappear and the way for the movable object is cleared. The goal is reached when all or a certain number of the available movable objects have fallen in to the receptacles.

In on implementation the movable objects are different from each other and the player is invited or required to get a movable object to fall in to the corresponding receptacle. This can be implemented in such a way that the player gets a reward if a movable object lands in the corresponding receptacle. If the movable object does not end up in the corresponding receptacle there is no reward or only a smaller reward for the player. In one implementation the game level ends if the movable game object falls in to a receptacle that does not correspond to the movable object.

Figure 7:
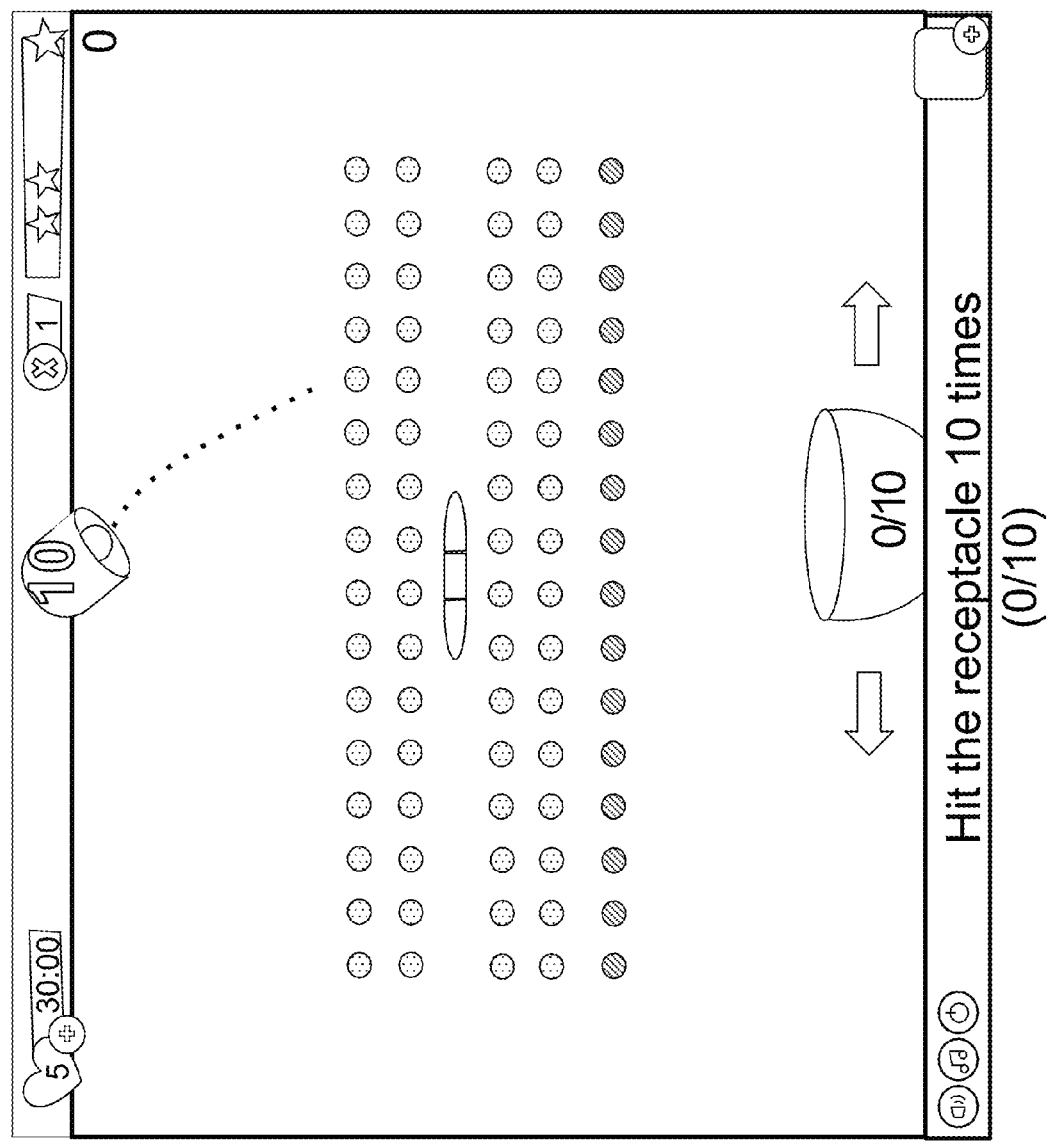
FIG. 7 shows an exemplary game board.

Another game goal that may be implemented is for the player to land a certain number of balls in a single receptacle or a plurality of receptacles. The receptacles can be moving to increase the difficulty to reach the goal as exemplified in FIG. 7. The movement can be along the bottom line of the screen. The receptacles may move in only one direction and move out on one side and reappear on the other side. The receptacles may alternatively move back and forth along the bottom. The number of receptacles may vary.

Another goal that can be implemented is for the player to play one or more levels in the game better than another player or players. The goal may be to reach a higher score or to complete the level using fewer balls than the other player or some other goal or combination of goals. That other player can be a friend of the playing player or a player that has been matched to the playing player. The matching can be because the two players have a similar way of playing the game or that they players are within the same geographic area. Other matching criteria can also be used.

Figure 5:
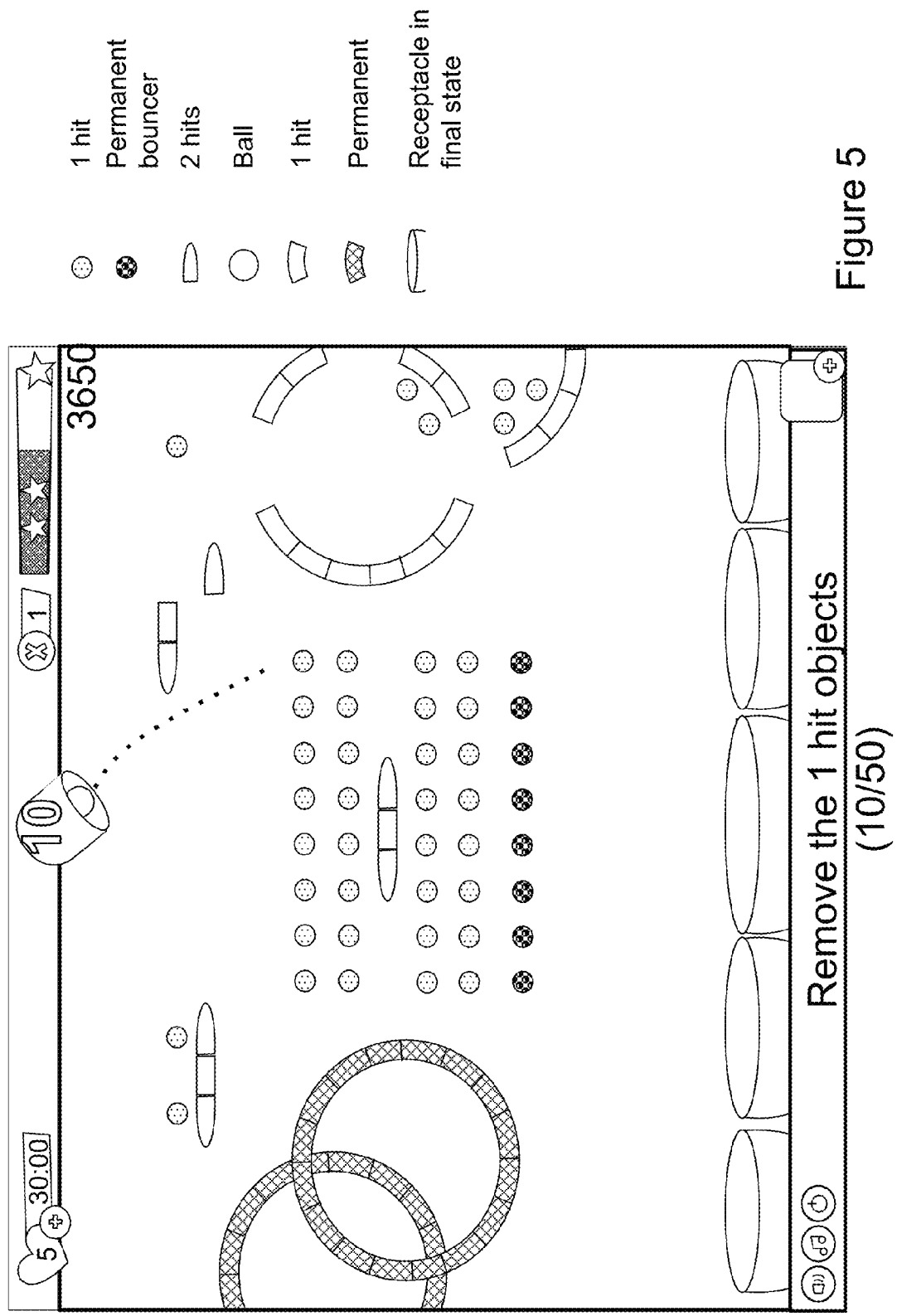
FIG. 5 shows an exemplary game board.

Another goal that can be implemented is to require the player to remove all or a minimum number of a defined type of game objects as exemplified in FIG. 5 where the player has already removed 10 out of the 50 required elements. The number can be all instances of that game object that are on the game board or the player can be required to only remove some of the available instances of that game object on the game board. The objects to be removed may require one or several hits with a ball to be removed from the game board. The removable object may change the appearance after having been hit to reflect the number of hits that still are required for it to be removed from the game board.

The game board typically has several different kinds of game objects present. Another goal is that the player is required to remove a number of game objects from two or more different types of game objects. The different game objects to be removed can be removed from one of the more than one group of game objects. The goal can be implemented so that it is a set number of game objects from each of a plurality of groups of game objects that the player is required to remove to reach the goal.

In some implementations an alternative game mode is used where the level is returned to its initial state when the player has achieved a specified goal such as that all receptacles have reached the final state. The points in the game can be altered and the gameplay continues until another goal has been reached such as that a number of points have been reached or that all receptacles have reached the final state again. This game mode can go for several 'rounds' until a final goal has been reached.

Figure 8:
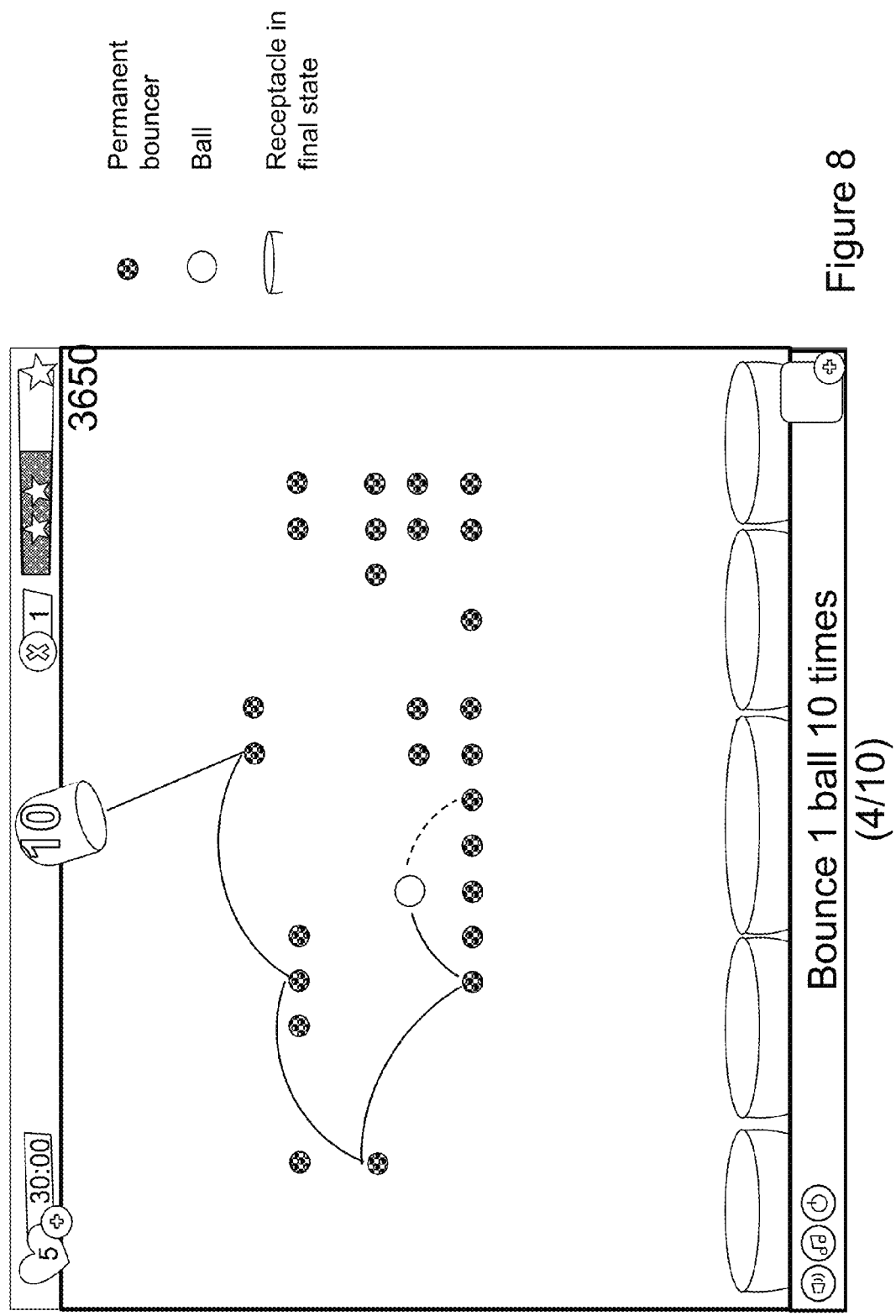
FIG. 8 shows an exemplary game board.

Another goal that may be implemented for the player to reach is to require the ball to perform a certain action or certain set of actions. This can for instance be to get the ball to bounce in a certain pattern or bounce on game objects a certain number of times, creating a chain of bounces. FIG. 8 exemplifies a game goal where the player has to bounce the ball several times to reach the game goal.

The balls can in one embodiment of the game have different colours or other signifiers. The receptacles can in this implementation have colours corresponding to the balls' colours in the game. The player is to reach the goal required to get a certain number of balls of a specific colour to land in a corresponding receptacle.

Lives

The game can be implemented to be played over a number of different levels. The player typically looses a life if the goal for a level is not reached, for example if the time is up or all the available balls have been used. In one implementation of the game the player can play the level again to try to reach the goal. The player will lose another life if the goal for the level is not reached this time either.

In one implementation the player plays once level and advances to the next level when the goal for the level played is reached. When the player does not reach the target goal the game ends and the player has to start playing from the first level again. The sequence of levels can be different for each time the game is played. If the player plays the game in a tournament mode against other players it is in one implementation the same level sequence for all the players of that tournament.

Some implementations provides for the option to buy more lives at certain points in the game. The player can for instance be presented with the option to buy more lives before or after a level or when all lives are used. Different implementations provide different methods for buying in the game.

Lives can in some implementations be bought using soft currency or points from the game or the player can use real-world money, for instance by using a card or an account in either the game or in a social network connected to the game.

In some implementations the lives are replenished at certain time intervals. The player can for instance receive one or several new lives every 30 minutes. There can be a cap of how many lives the player can keep in the game at any one point.

In some implementations if the player has received a life from a friend in the game or for instance through a social network, the number of lives can be more than the cap that is set for when lives are replenished over time.

Game Objects

The game can be implemented with several different objects to appear on the game board. Some objects are placed on the game board at the start of the game and some objects are placed on the game board during the gameplay, in some implementations game objects can appear in response to how the game is played by the user. The game objects on the game board can be of different size and shape.

The objects on the game board can have different properties. In general, the following classes of objects can be implemented; 1) objects that can not be removed from the game board, 2) objects that are removed from the game board after a ball has hit the object once, 3) objects that require a ball to hit it more than one time for the object to be removed from the game board and 4) special game objects that provide a special function in the gameplay. The game board layout can be adjusted so that all or some of the game objects can be used in any particular level. Also other game objects can be implemented in some embodiments.

Some game objects disappear when a ball has hit the object one or several times. There can be implementations where the game objects that have disappeared will reappear on the game board. The game objects can for instance reappear after a certain number of balls have been shot or after a certain time has passed. This can provide a helpful addition for the player to be able to collect a higher score but the reappearing game objects can also block a recently cleared path.

The objects that disappear after a certain number of bounces by a ball can change properties after each or some of the bounces by a ball. This way the gameplay will change as the player plays a level in the game and it is a way of increasing the length and depth of level play without adding too many objects on the screen. The game objects will in some embodiments signal to the player that a ball has hit them so that the player can use that information to adjust his gameplay to reach the goal for the level. The signalling of how many times the game object has been hit by a ball can for instance be with a counter on the game object or the game object can shift in colour to be more faint for each hit or change to a different colour.

The game elements can take any number of shapes and the person skilled in the art will understand what shapes will enhance the gameplay. Some elements can be laid out on the game board so that they form another larger element for the ball to 'roll' on for instance.

There can in some implementations be game objects that change the velocity of the ball when it hits the game object. One game object can function similarly to a pinball bumper. The game object will when hit push the ball away, giving the ball more speed than it had prior to hitting the bumper.

There can also be game elements that when hit by the ball absorbs all or some of the ball's velocity. The ball will typically slow down when it hits that object. The ball can then continue to bounce on other objects in the game.

Some embodiments allow the game objects to appear on the game board during the gameplay. The game objects that appear on the game board can be new game objects that have not previously appeared on the game board in that level or for that gameplay. The new game objects can be placed randomly on the game board or in a pattern, such pattern can be indicated on the game board with for instance signs or shadows showing that there may be new game objects appearing there. The new game objects can for instance be obstructing the path for the ball so that the player has to clear the way for the ball again. The new game objects can for instance appear after a certain number of balls have been launched on to the game board or after a certain time has passed.

The game objects can be static on the game board or move around. The moving game objects can move on the game board in a predefined pattern or move in a perceivably random pattern.

There can in some implementations be game elements that perform a certain function when hit by the ball. There can for instance be one game element that when hit activates movement of some other game element. This can be some that another game element or receptacle starts or stops to move. It can also be so that one or a plurality of game objects move to for instance open up a path that has not been available for the ball to travel.

Special Game Objects

In some implementations, there are special game objects that have a certain effect when they are hit by a ball. The effect can for example be to increase the size of the ball or changing other properties in the game.

A special game object can in some implementations appear because the player has reached an achievement, such as having cleared all of a certain category of game objects from the game board or had the ball bounce a certain number of times on the game board objects. In some embodiments special game objects can be added to the game prior to starting to play a level. The player can in some embodiments buy special game objects before the game and in some embodiments use special game objects that are already part of the player's inventory of such objects.

Bouncing a ball on a special game object activates the special function of that special game object. The special game objects will in some embodiments disappear from the game board when a ball has hit it. In some embodiments certain special game objects can be used more than once and will stay on the game board or shift place on the game board when hit.

In some embodiments a special game objects will replace some other game object when it appears. The special game object can also appear anywhere on the game board.

A special game object that can be implemented increases the score multiplier when a ball has hit the object. The increase in the multiplier can vary in different implementations. The multiplier affects all points the remainder of the level. The multiplier special game object typically disappears from the game board when hit.

A special object that can be implemented multiplies the ball when hit. A new ball will appear at the special game object and the ball that has hit the special game object will bounce off the object and continue on the game board. The split ball special game object typically disappears from the game board when hit.

A special game object that can be implemented changes the state of one of the receptacles when the special game object is activated. The receptacle can, in some implementations, be in any state prior to the ball hits this special game object and will still be brought to its final state. In some implementations the special game object will appear if the player shoots three balls in a row without changing the state of any of the receptacles. The special game object typically disappears from the game board when hit.

Blocker Objects

In some embodiments, a type of special game objects that can be implemented is a blocker object. The blocker objects can create an obstacle for the player to overcome. The special game object can create the obstacle in the gameplay or the blocker object can be the obstacle. The blocker objects can in some implementations be present at the game board at the start of the game. The blocker objects can in some implementations instead appear during the gameplay. The blocker objects can in different implementations remain on the game board for the whole game or disappear after one or a plurality of activations.

A blocker object that can be implemented is an object that interrupts the ball's trajectory and makes the special game object to be the last bounce the ball will make on the game board is shown in FIG. 9. The ball will fall down without bouncing or hitting any of the game objects. The ball can in some implementations land in one of the receptacles.

Figure 10:
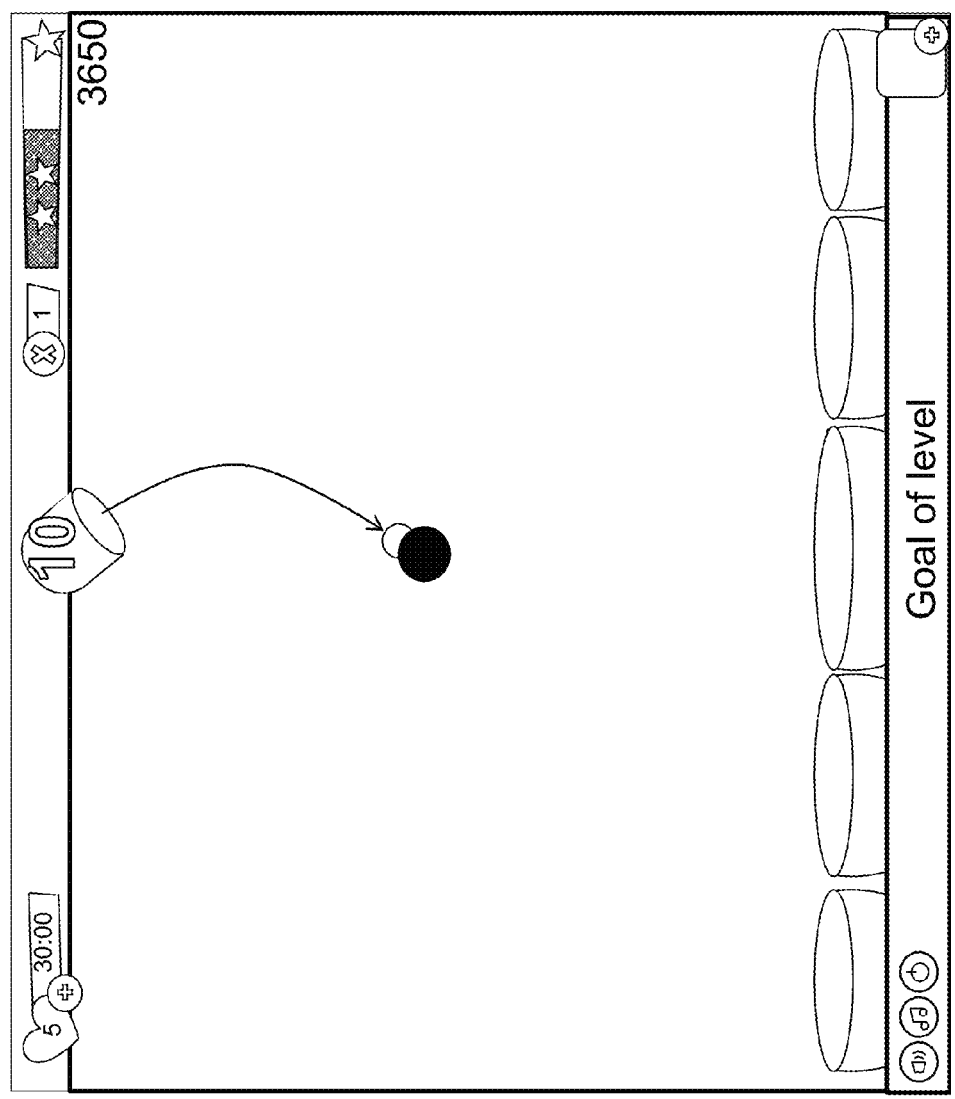
FIG. 10 shows an exemplary game board with a blocker element.

A blocker object that can be implemented is an object that fully removes the ball from the game board as shown in FIG. 10. The ball that hits the blocker object will be taken out of play and the player has lost that ball.

Figure 11:
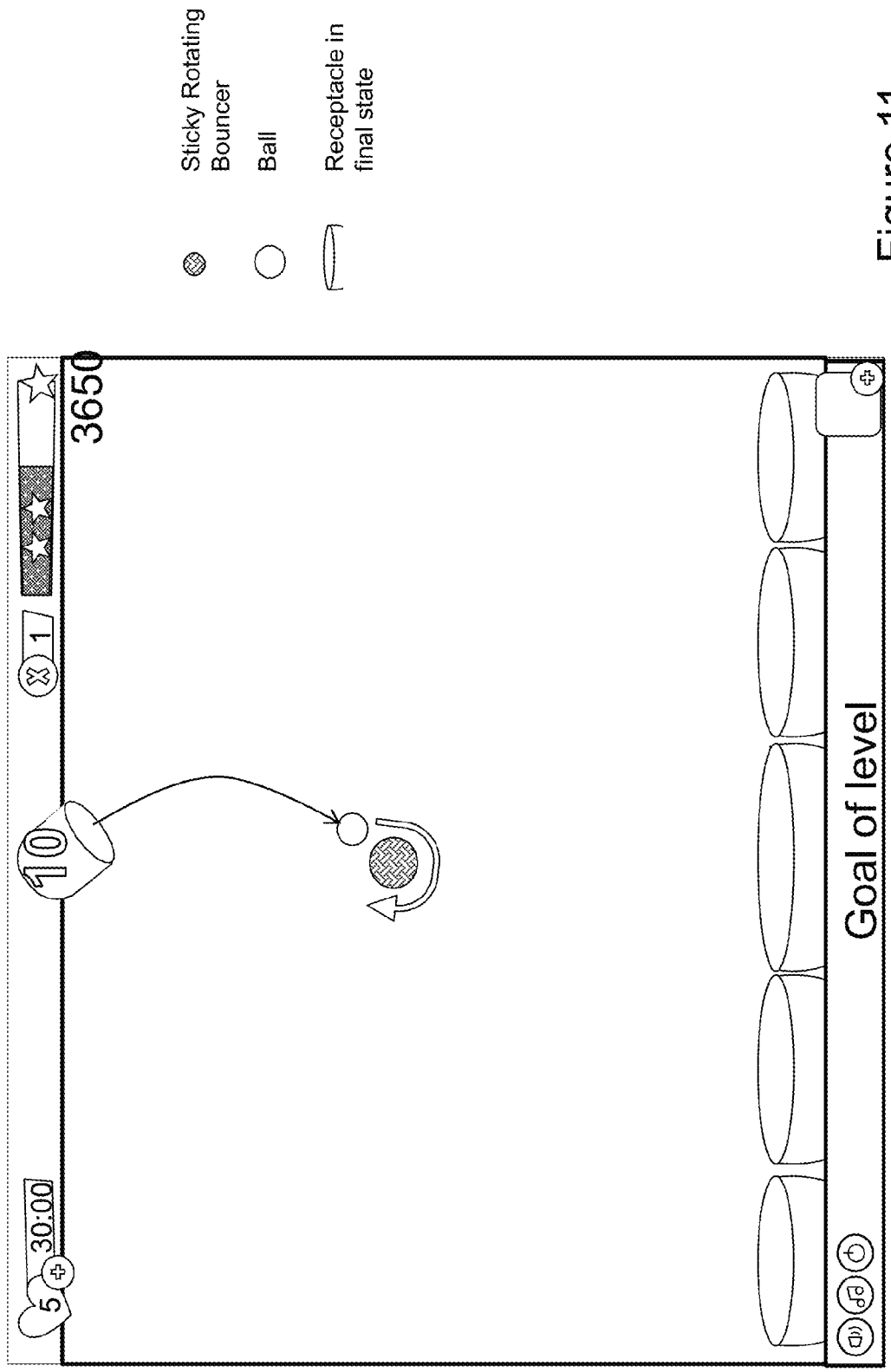
FIG. 11 shows an exemplary game board with a blocker element.

A blocker object that can be implemented is an object to which the ball will stick if the ball hits the special game object as shown in FIG. 11. The special game object can rotate or cause the ball to rotate around the special game object. The player can in some embodiments activate the release of the ball from the special game object so that the ball continues in the tangent from the point when the ball was released. The ball can alternatively be released by for instance a time trigger. This special game element can help the player to reach locations on the game board that are hard to otherwise reach.

Figure 12:
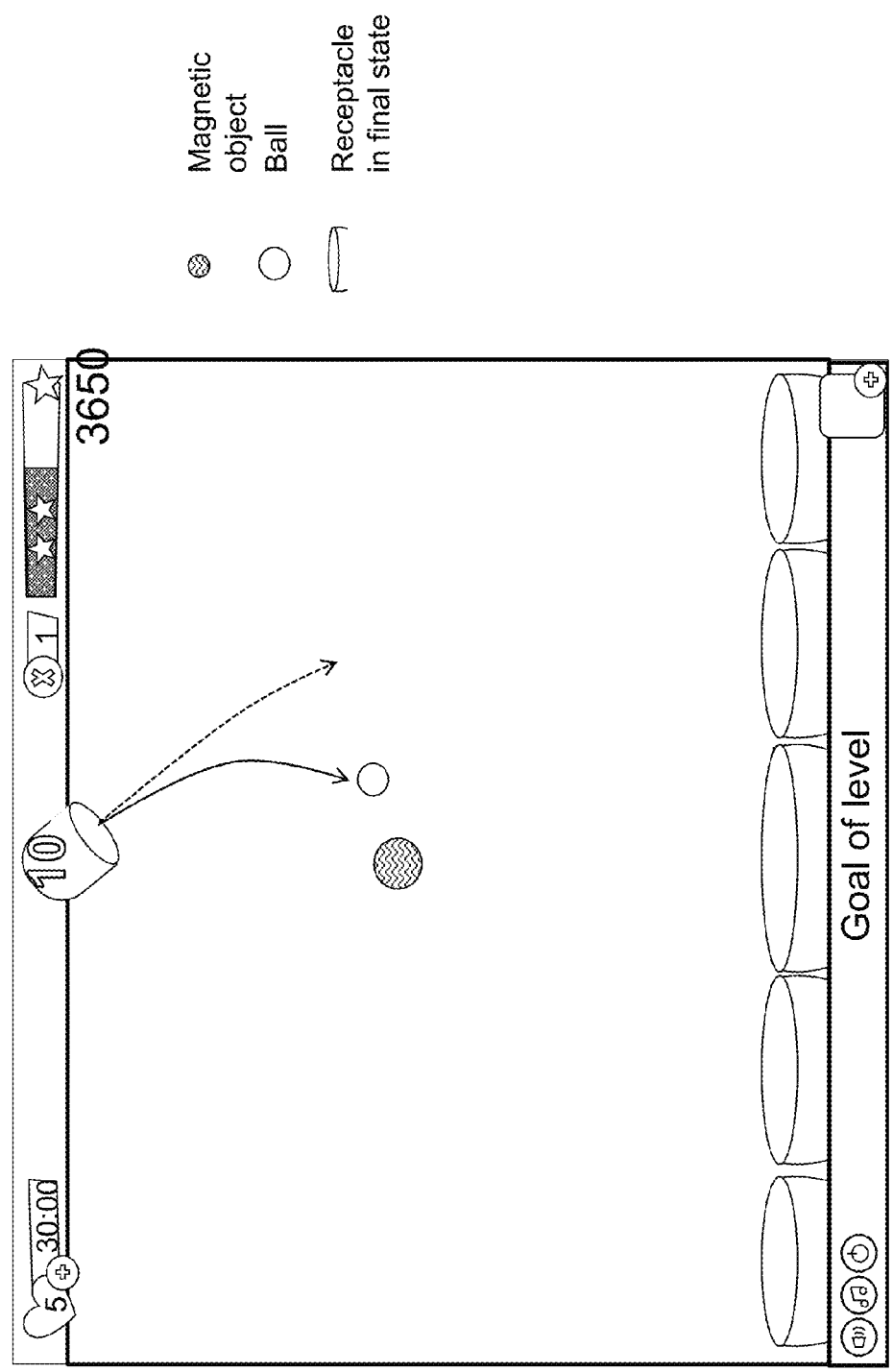
FIG. 12 shows an exemplary game board with a blocker element.

A blocker object that can be implemented is an object that affects the trajectory of a ball but do not stop or block the ball. The special game element can have a similar effect as a magnet and will draw the ball closer to or push away the special game object as shown in FIG. 12.

A blocker object that can be implemented is an object that if hit by a ball will reduce a score multiplier. The special game object typically disappears from the game board when hit by a ball.

Figure 13:
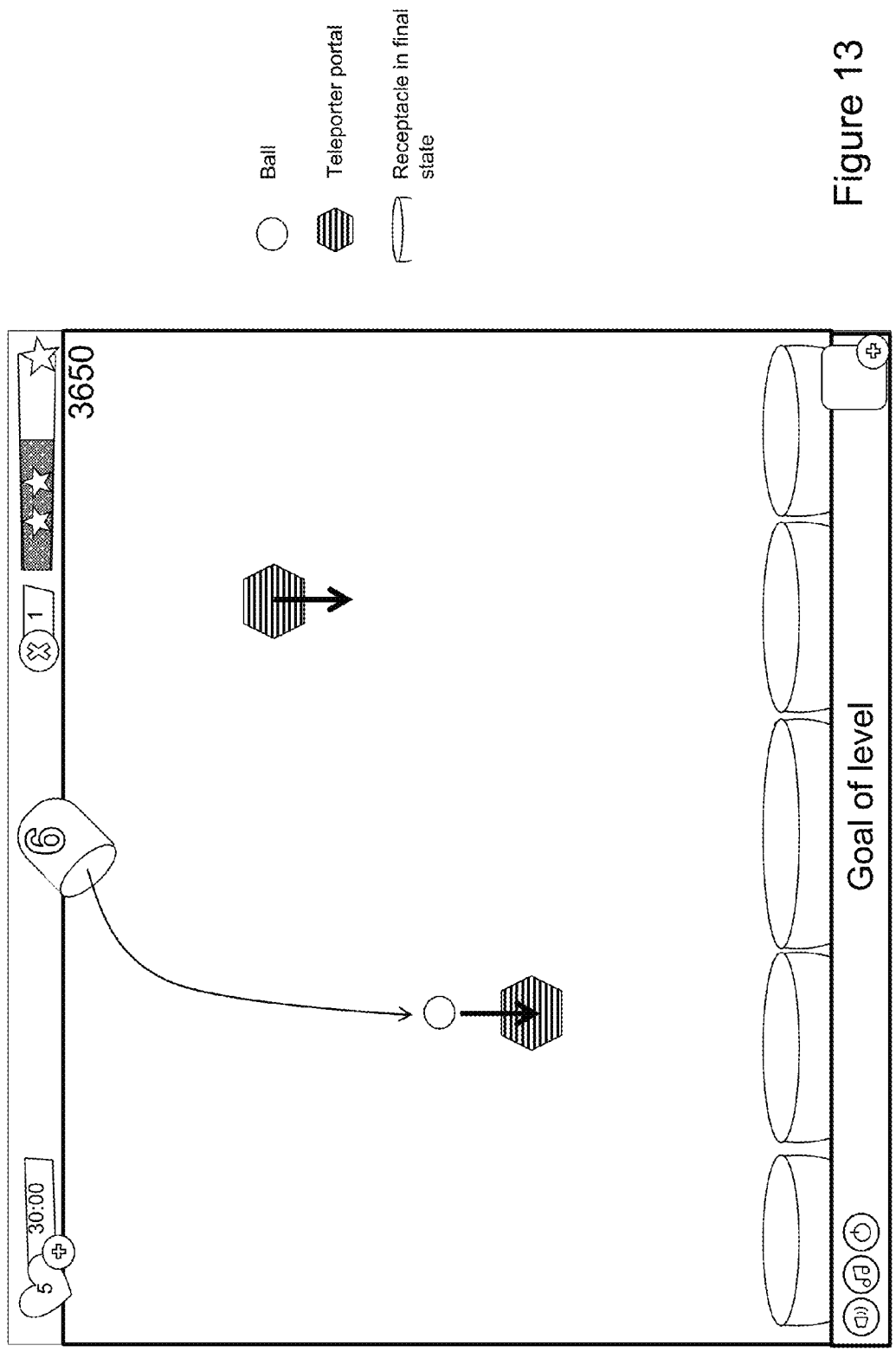
FIG. 13 shows an exemplary game board with a blocker element.

A blocker object that can be implemented is a 'teleporter' special game object that will move the ball from a first location on the game board to another location on the game board as shown in FIG. 13. The ball can continue from the second special game object with the same speed and trajectory as it entered in to the first special game object. The locations are typically represented by similar game objects, which give the player the feeling that the ball disappears in a hole and reappears in another hole.

Figure 14:
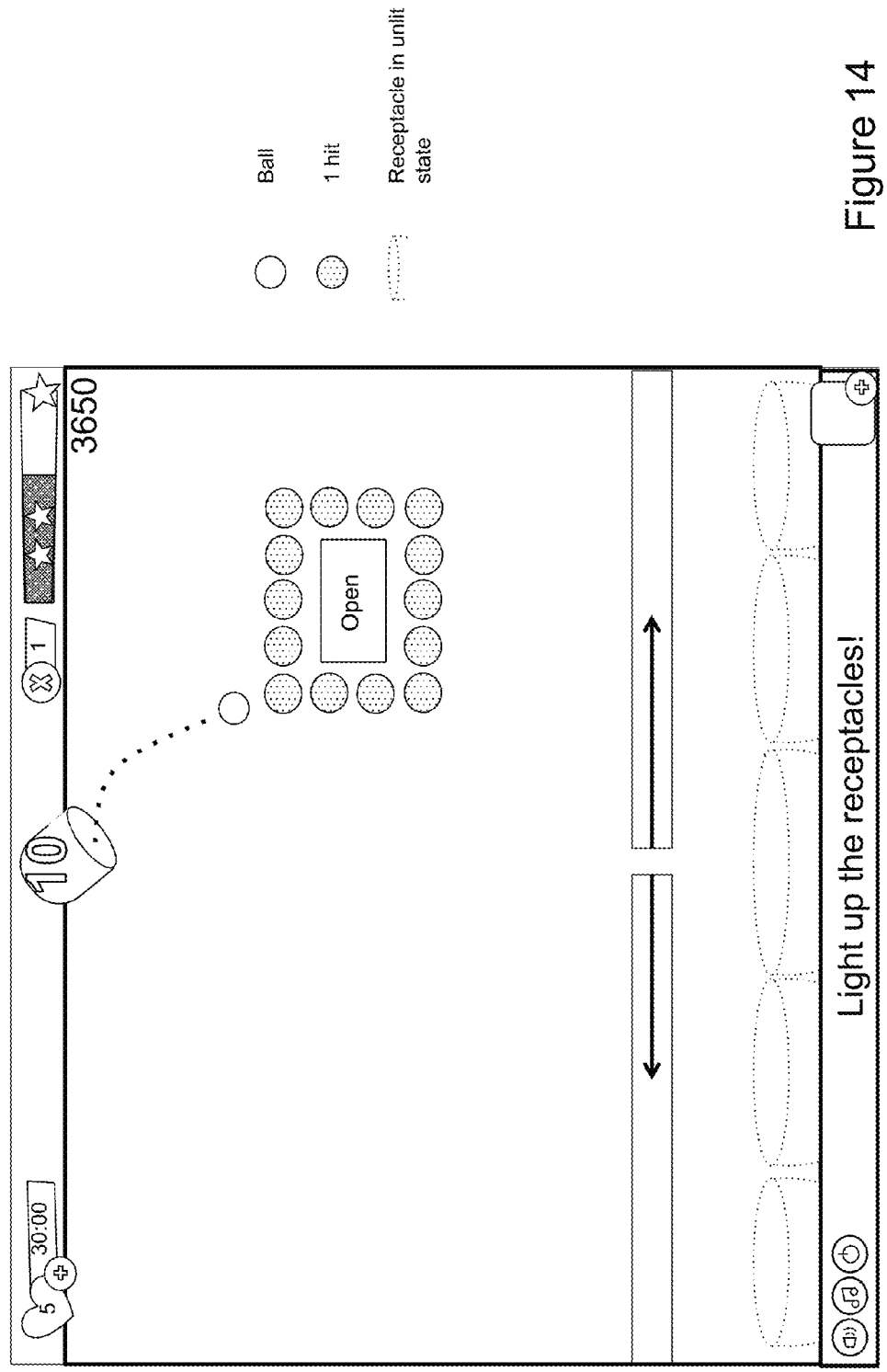
FIG. 14 shows an exemplary game board with a blocker element.

A blocker object that may be implemented is an object that may change the state or position of other objects on the game board if the first object is hit with the ball. The exemplary implementation in FIG. 14 shows one such object that is surrounded by other objects that may be removed by a ball hitting them. When the ball hits the object labelled 'open' the two other objects in the lower part of the screen will change position. In the exemplified implementation in FIG. 14 the moving objects will reveal the receptacles for the player to land the ball in. If the player hits the button again there may be another action happening or the moving objects may move back in to the 'closed' position. The button may also be surrounded by growing elements that will close off the button again after the player has hit it with a ball.

A blocker object that can be implemented is an object that will bring one or a plurality of the receptacles' state away from the final state. For example if one of the receptacles is in the final state and the ball hits the special game object then that receptacle can be demoted to the state before the final state. There are different ways the special game element can be implemented to determine which receptacle that is to be demoted. One way is to implement that the receptacle that more recently was brought to the final state is demoted.

Figure 15:
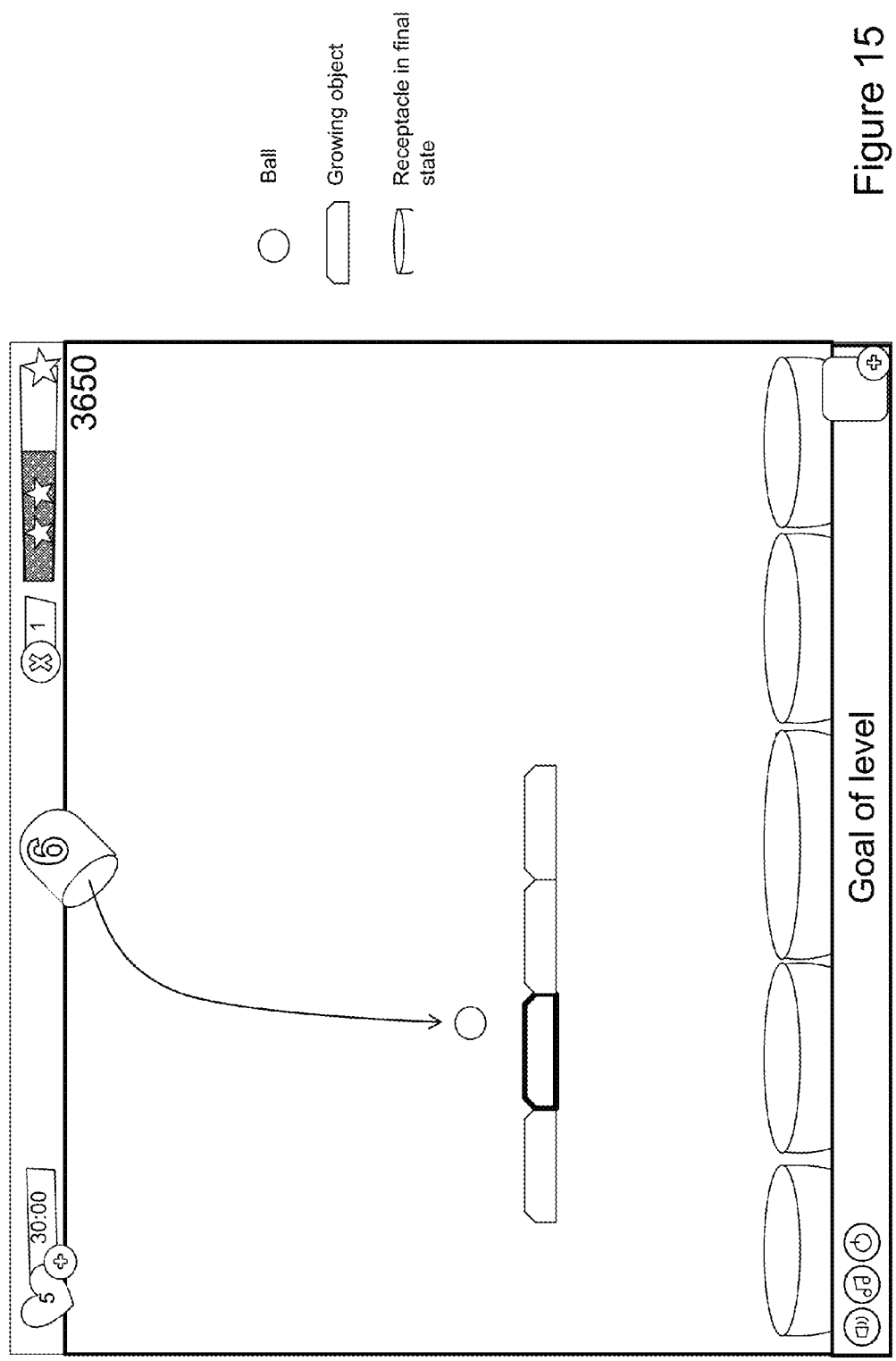
FIG. 15 shows an exemplary game board with blocker element.

Another blocker object that can be implemented is a growing barrier that can extend between the game objects on the game board. This may be implemented as shown in FIG. 15 where a game object appears on the game screen to create an obstacle for the player. The new game objects may appear randomly or they may appear at places on the game board where there have been similar game objects that have been removed.

Another growing game object is exemplified with a spider that may move around on the game board spinning a web between the game objects as shown in FIG. 16. A ball that will hit the growing barrier will get stuck. One way to release the balls that are stuck in the growing barrier and clear the path for further balls is to remove one of the game elements that the growing barrier is attached to. In one implementation removing the parts of the web that is attached to the pin that is removed.

Other Game Effects

Figure 17:
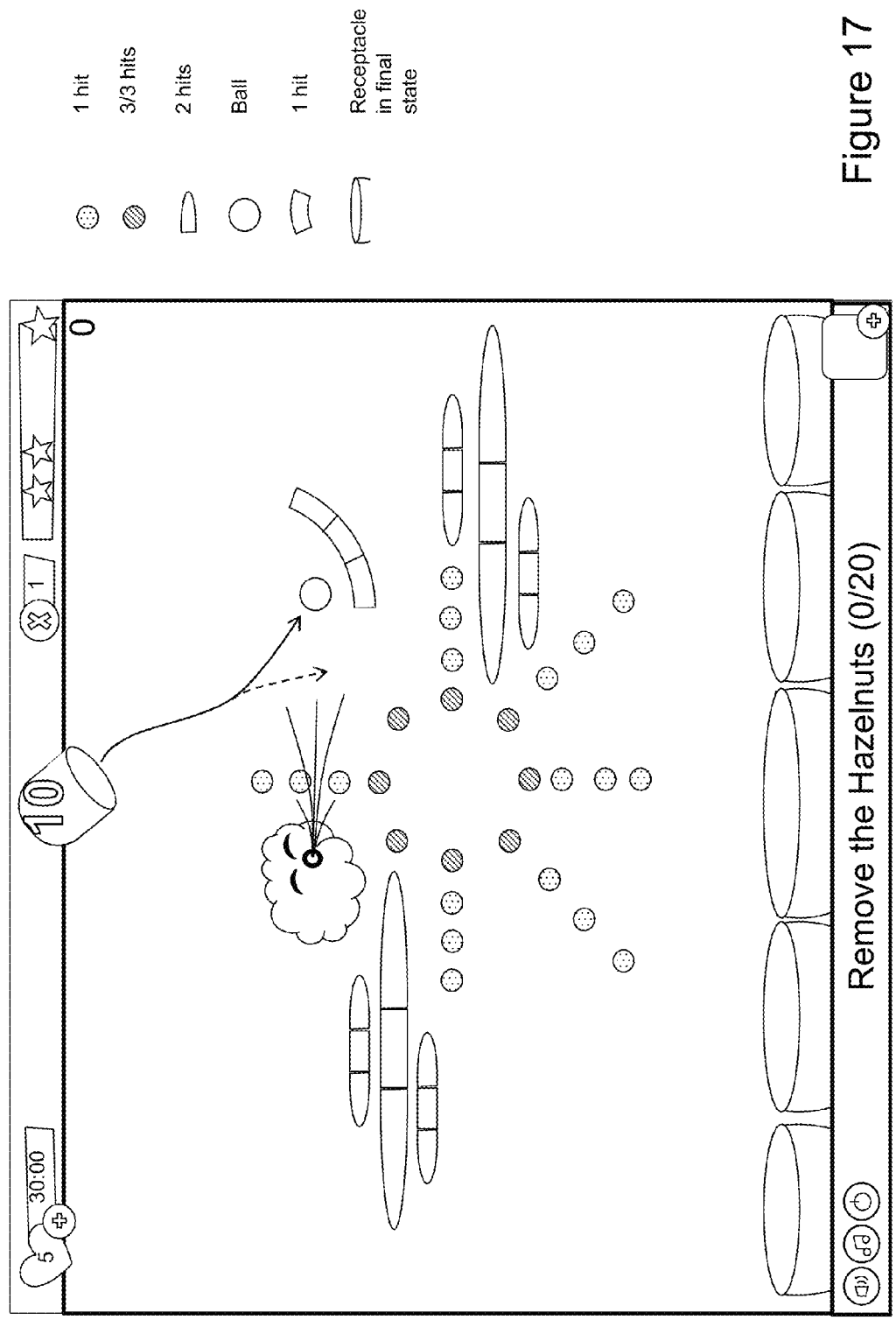
FIG. 17 shows an exemplary game board with a 'wind' mechanic.

The game can be implemented with a variety of features that affect the physics of the game and how the ball travels on the game board. In some implementations there can be permanent or temporary physical effects such as a directional wind that moves the ball left or right or for instance a water stream or conveyor belt that moves the ball from one point to another as exemplified in FIG. 17.

The game will typically be implemented with the gravity force puffing the ball downwards in the game board. One implementation may change the direction of gravity. This can for instance be implemented through a switch or a special game object that is triggered when the ball hits the object. The direction of gravity can be changed back after a certain time has passed or a certain event has occurred.

Figure 18:
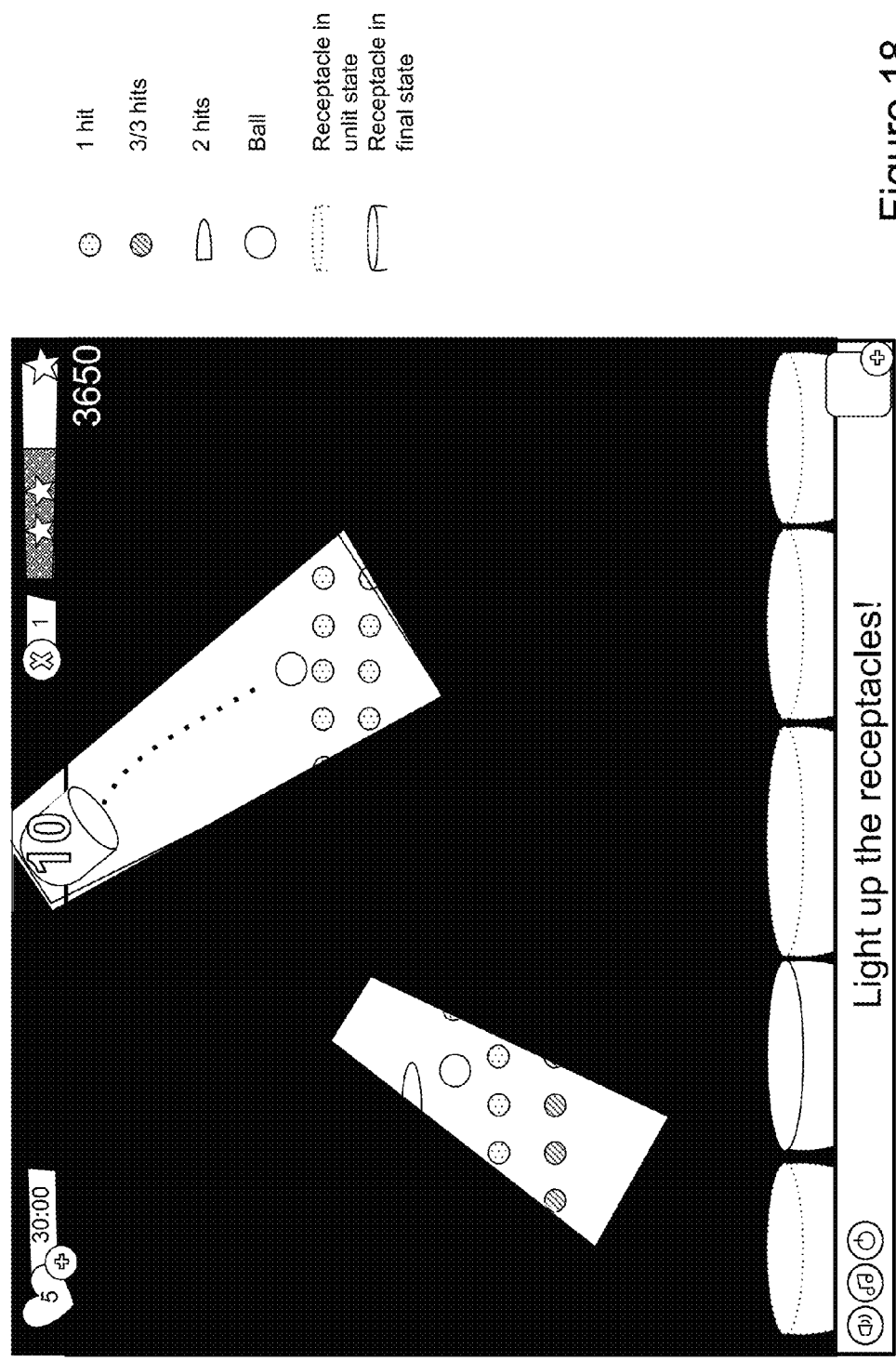
FIG. 18 shows a 'dark' game board.

The game can be implemented so that a level game board is 'dark' and the game objects on the game board are not visible to the player at the start of the level. Some objects may be visible, for example the receptacles or certain other game objects. The ball may have a 'light trail' and a 'halo' of light so that when the ball is launched it light up the game board along the path it takes as shown in FIG. 18. The lit-up area can get darker again after some seconds or only move together with the ball. This will require the player to learn the game layout and remember it step by step as the level is played. There can in some implementations be a special game object that can light up the whole level for a certain time or can act as a light switch. This game object can be a power-up that the player has purchased or received prior to playing the level or during the level is played.

The game may be implemented to take advantage of the input options available on the devices the game is being played. For example a handheld device may have a gyroscope or another device that registers the movement of the device. The player may be given the option to tilt or move the device around to move the direction or force the ball moves on the game board. The player may in some embodiments be allowed to unlock or buy the feature to use the device to tilt or angle the game board.

Special Balls

The balls in the game can take different shapes and have different properties as a result of good gameplay or some other action has been triggered in the game. In some implementations the ball will become the special ball directly upon activation or a game object will appear on the game board that will take the same or another ball to bounce on it to activate the special ball. The special ball can in some implementations be for the whole time the ball is active in the game board or have a time limit for the special effect.

A ball may in some implementations take a different shape after a certain number of bounces, for example 20 bounces. The ball can then become stronger and each time it bounces creates and expansive effect that destroys a larger radius of game objects.

A whole row of split pegs can be created with a 5 second timer before they deactivate again.

Figure 19:
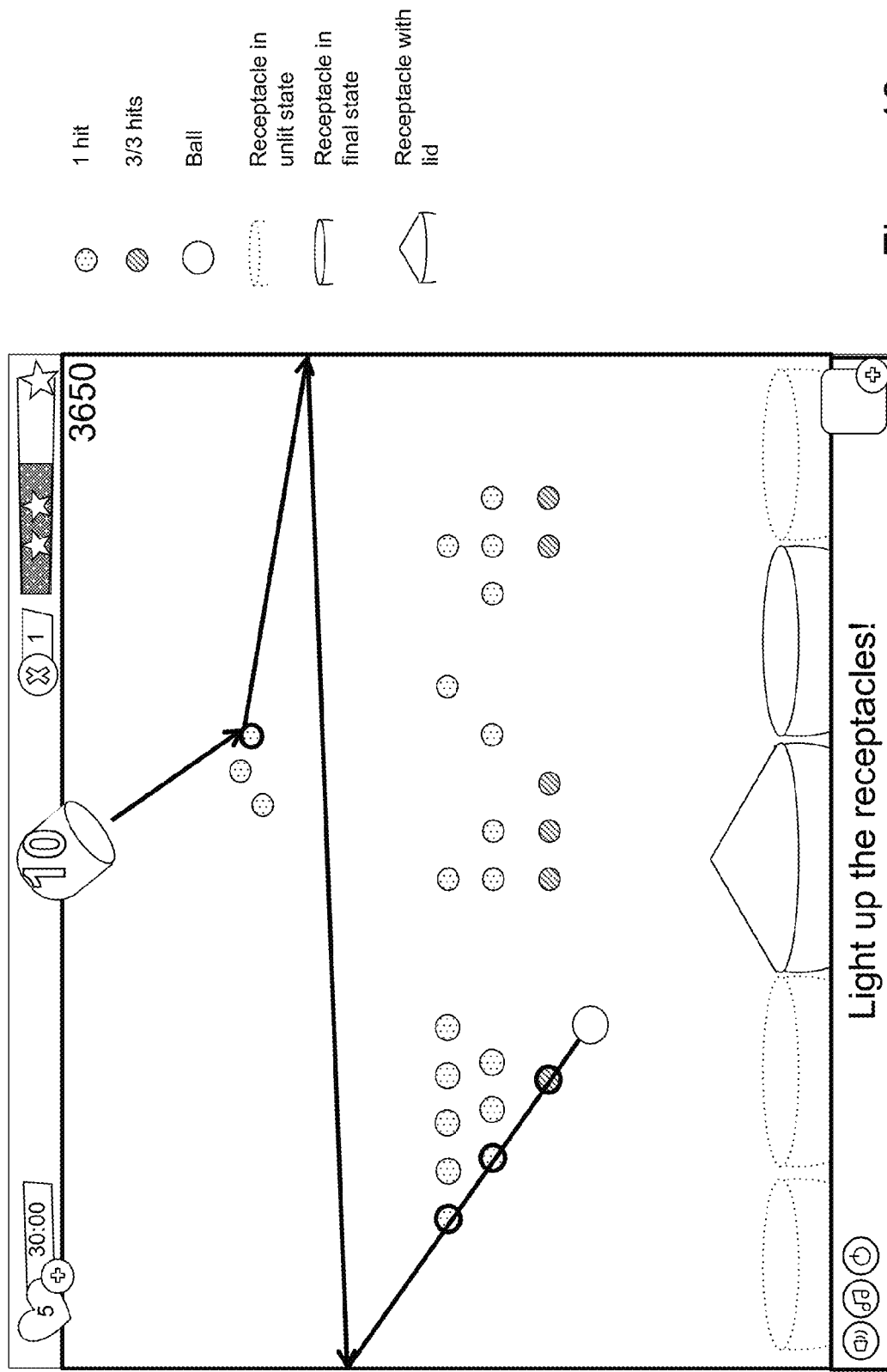
FIG. 19 shows an exemplary implementation with a special ball.
Figure 20:
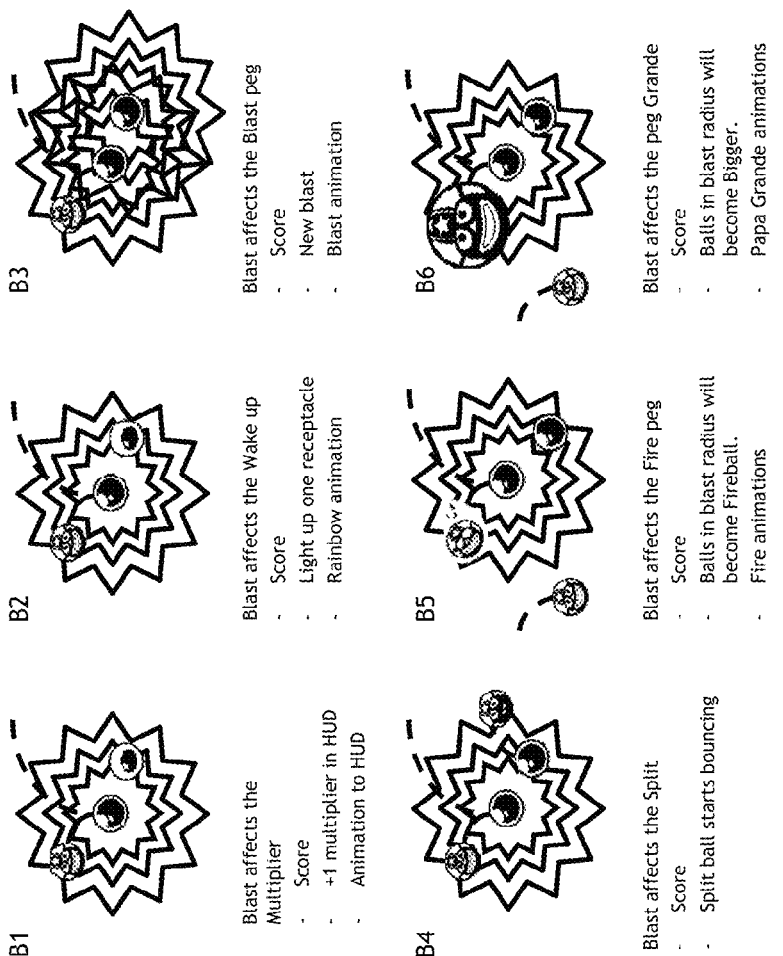
FIG. 20 shows exemplary special balls.
Figure 21:
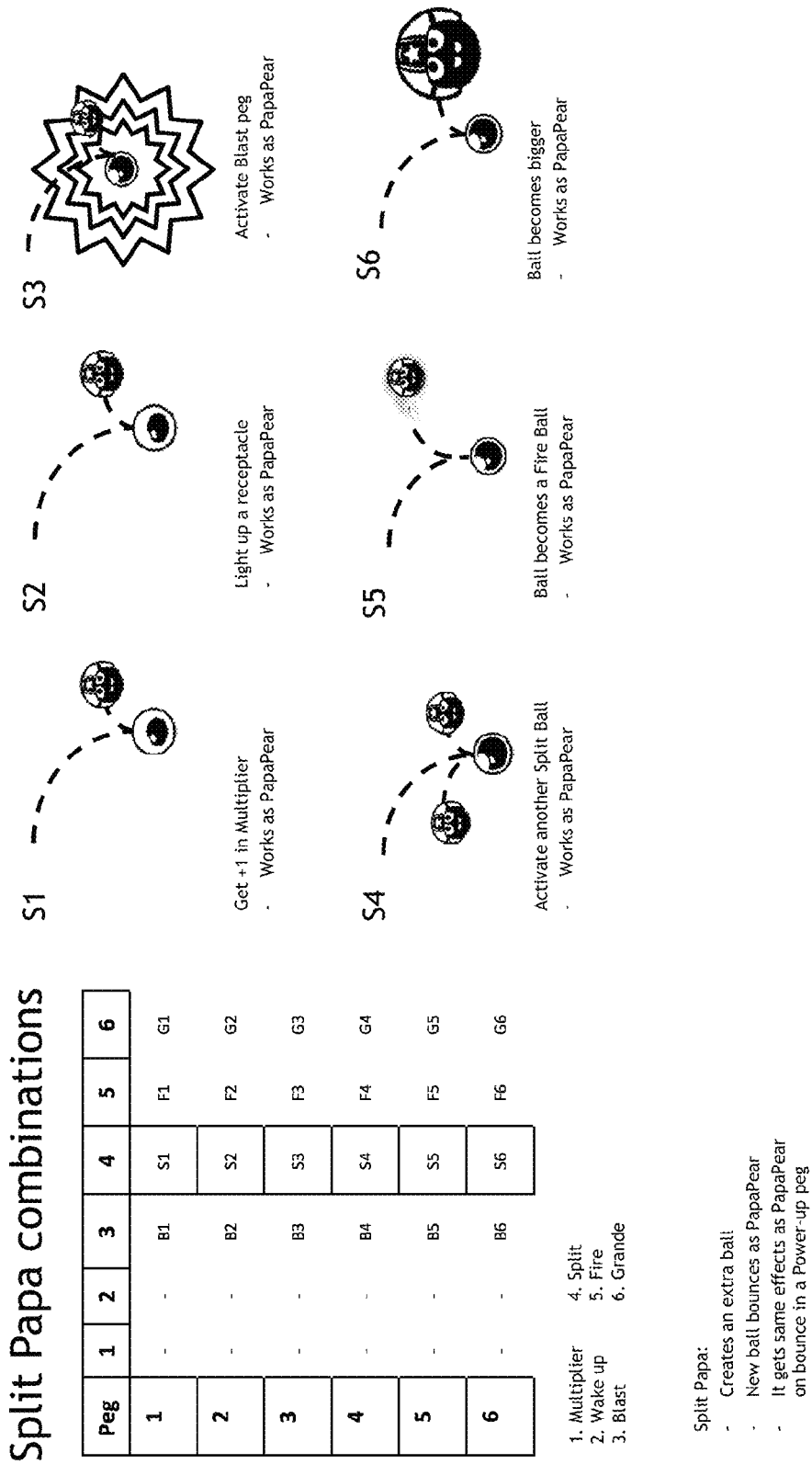
FIG. 21 shows exemplary special balls.
Figure 22:
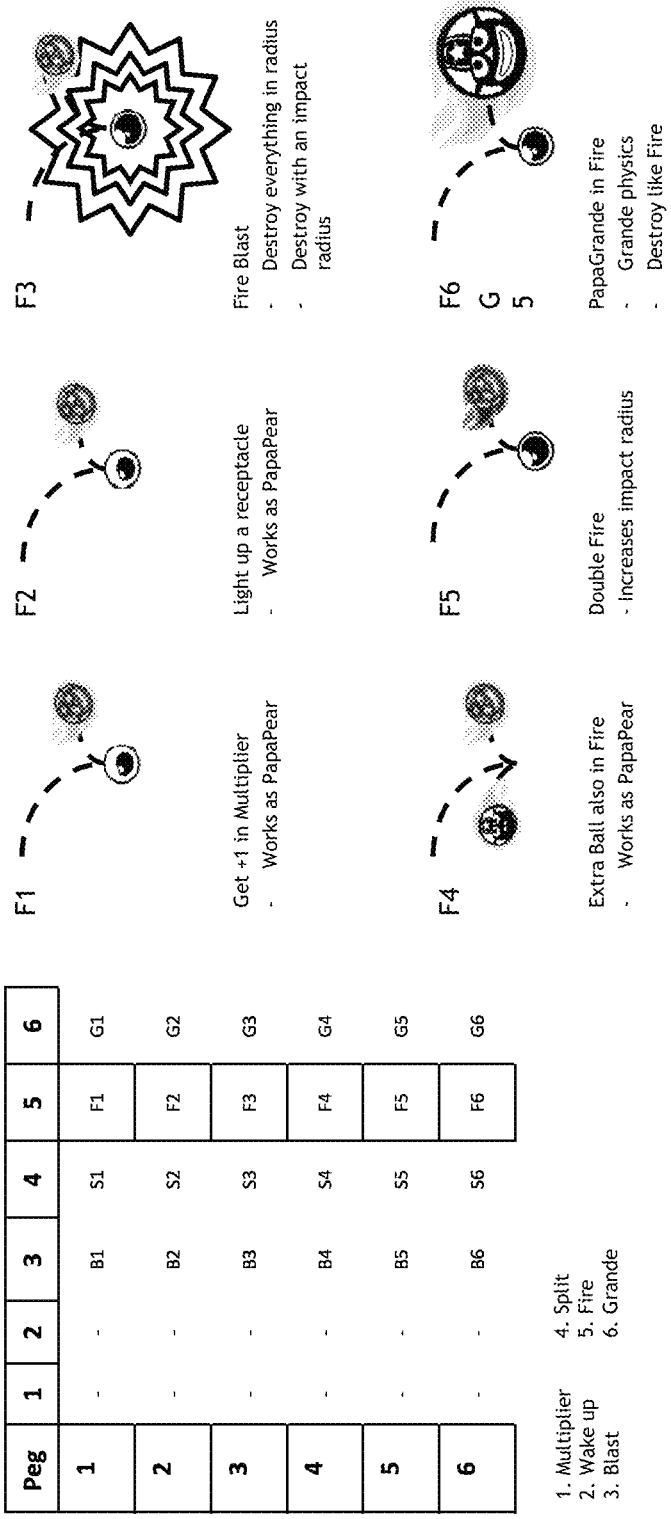
FIG. 22 shows exemplary special balls.
Figure 23:
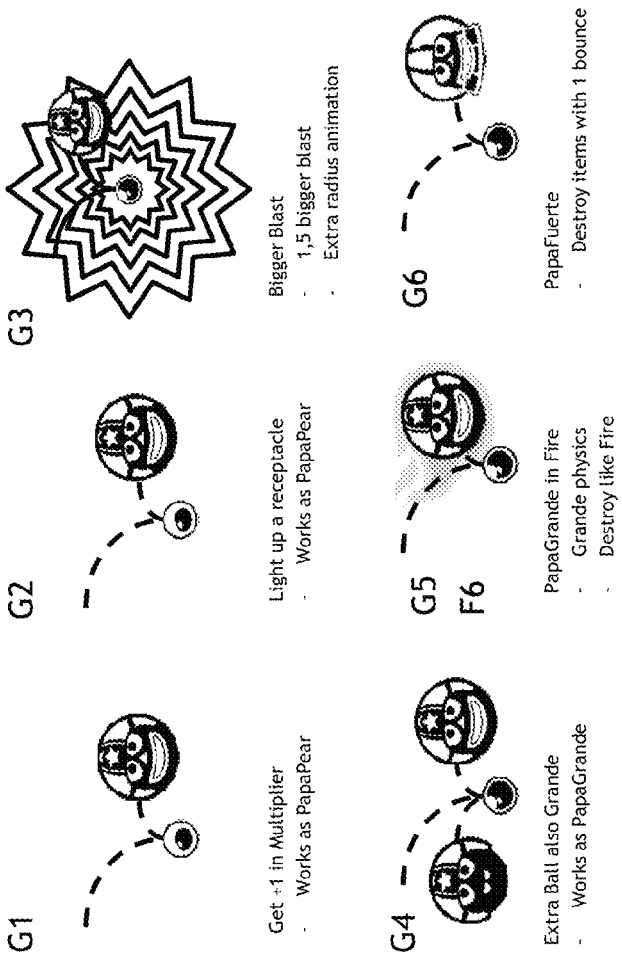
FIG. 23 shows exemplary special balls.
Figure 24:
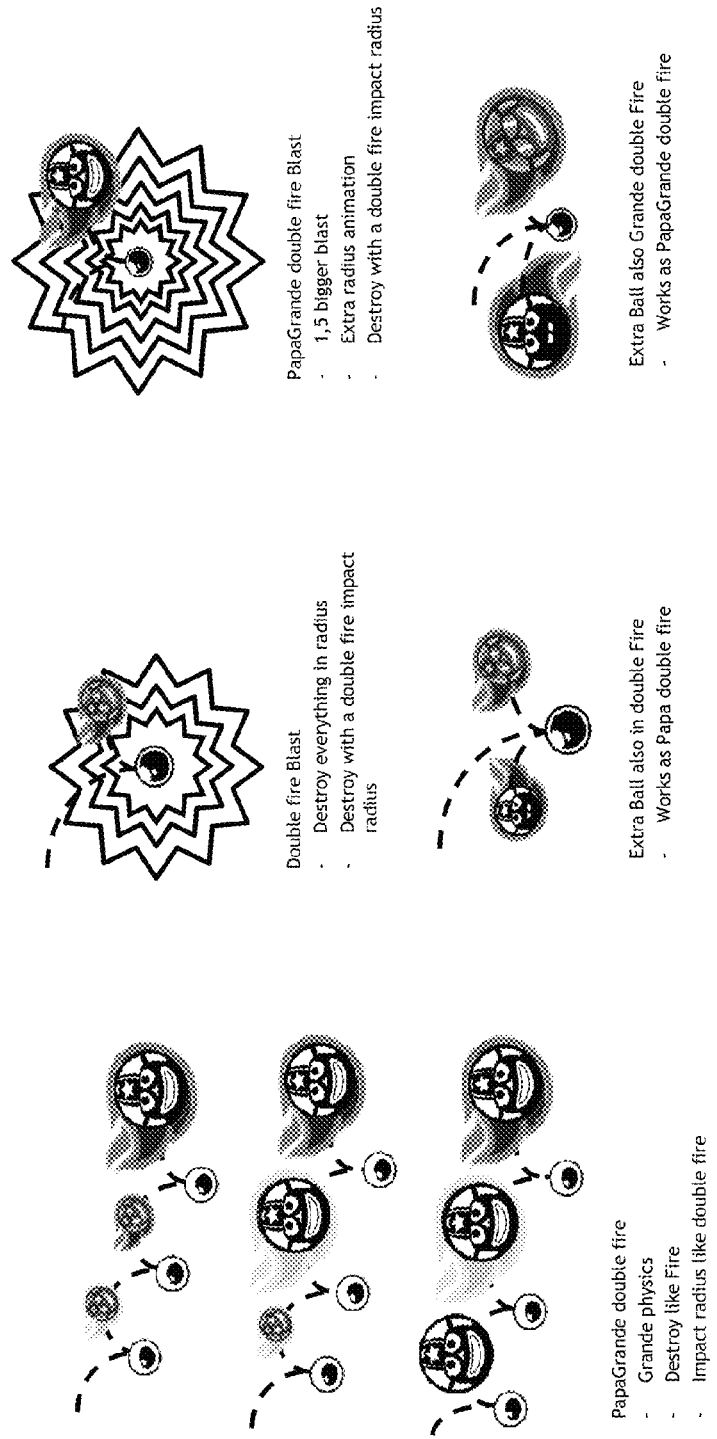
FIG. 24 shows exemplary special balls.
Figure 25:
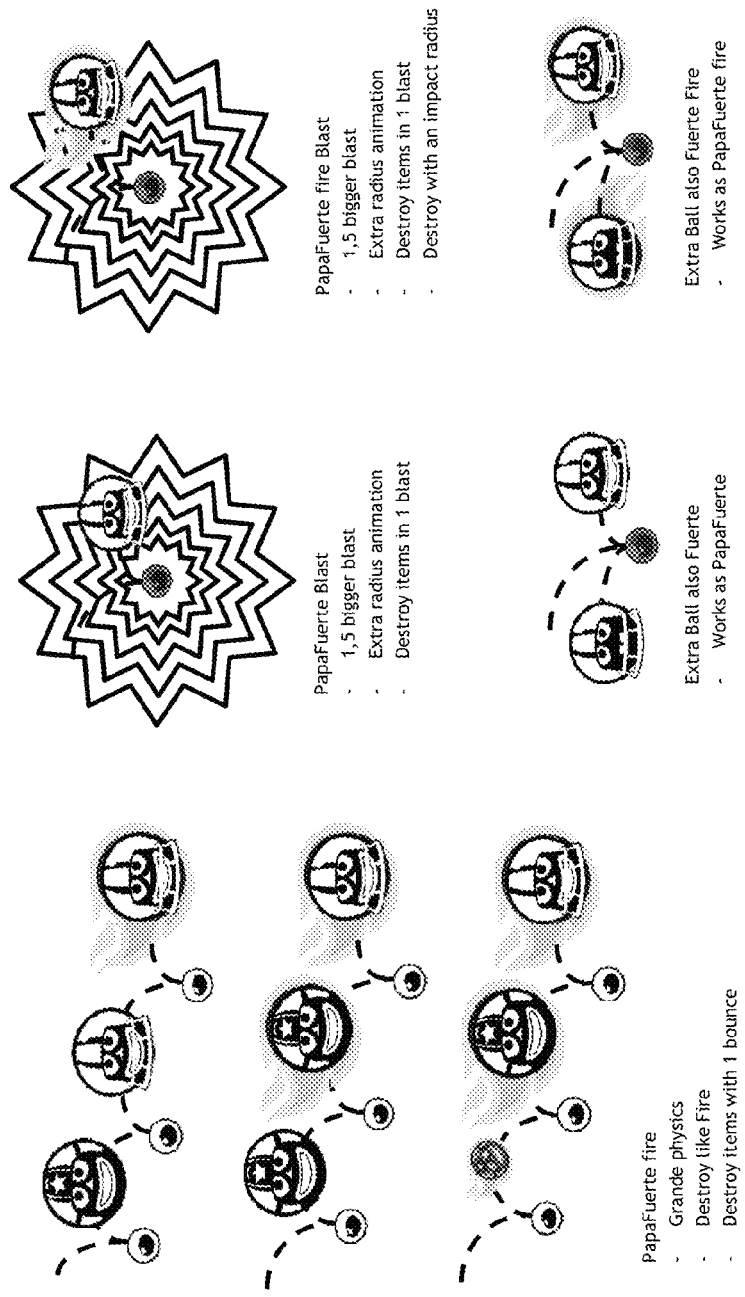
FIG. 25 shows exemplary special balls.
Figure 27:
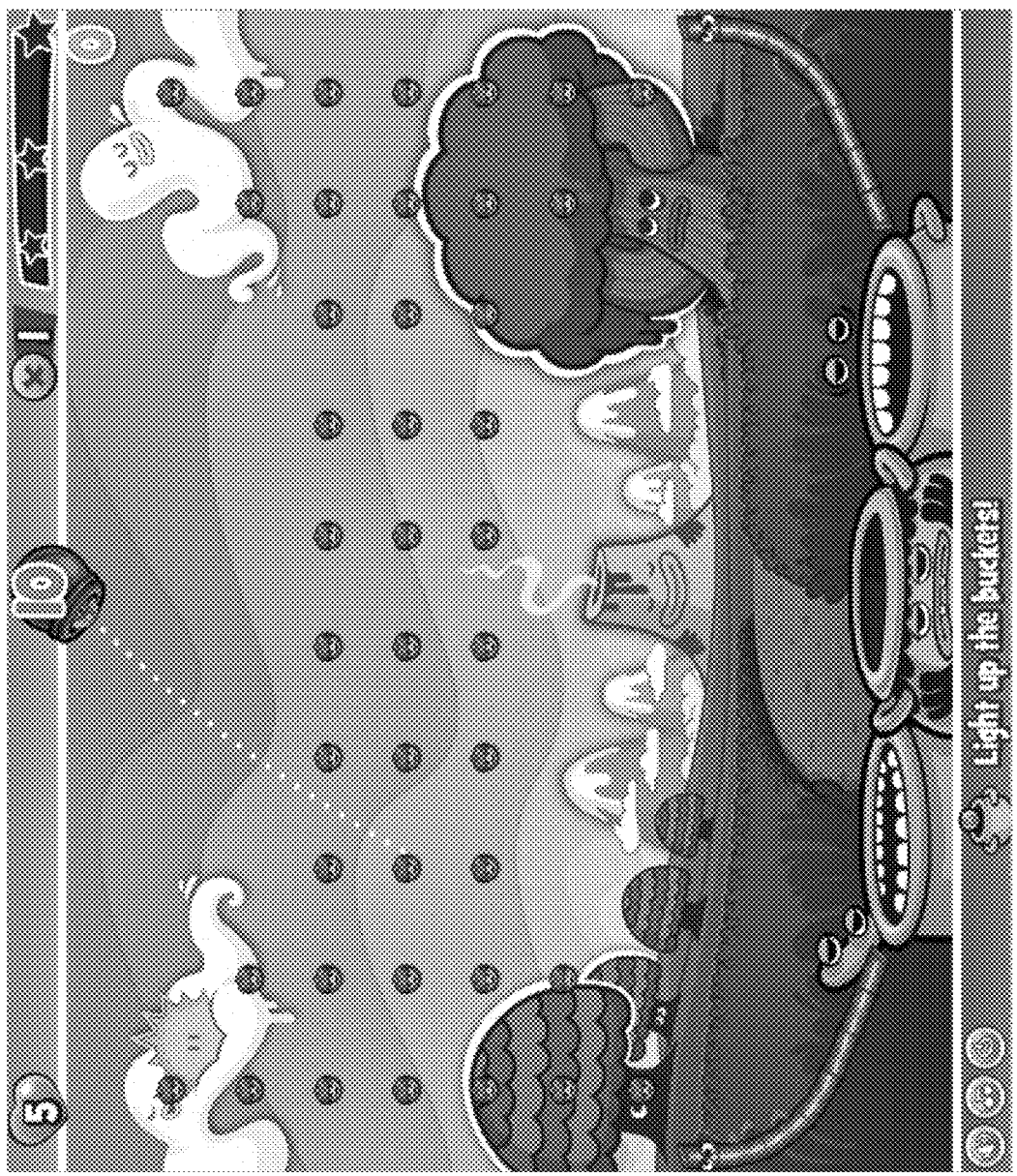
FIG. 27 shows an exemplary game board layout.
Figure 28:
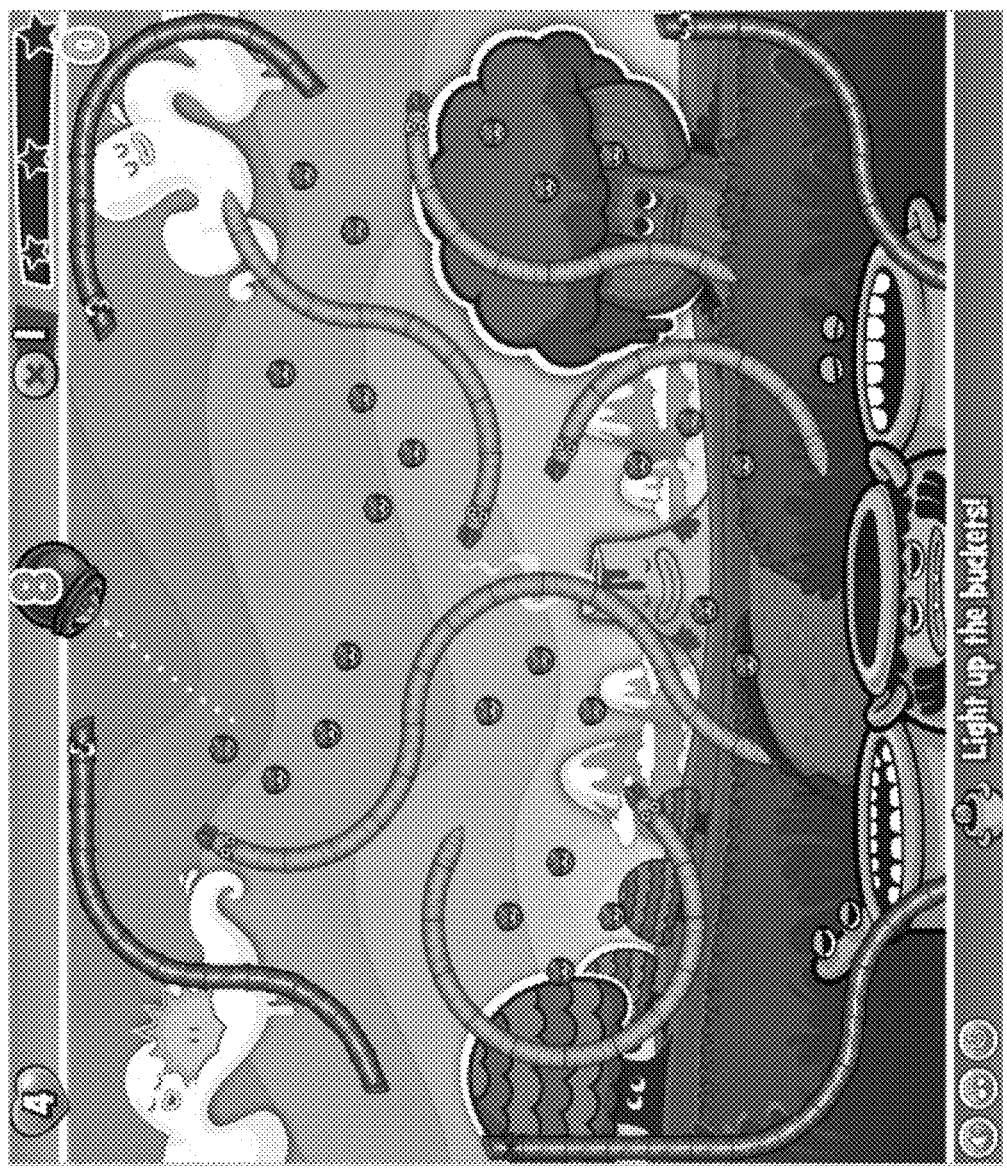
FIG. 28 shows an exemplary game board layout.
Figure 29:
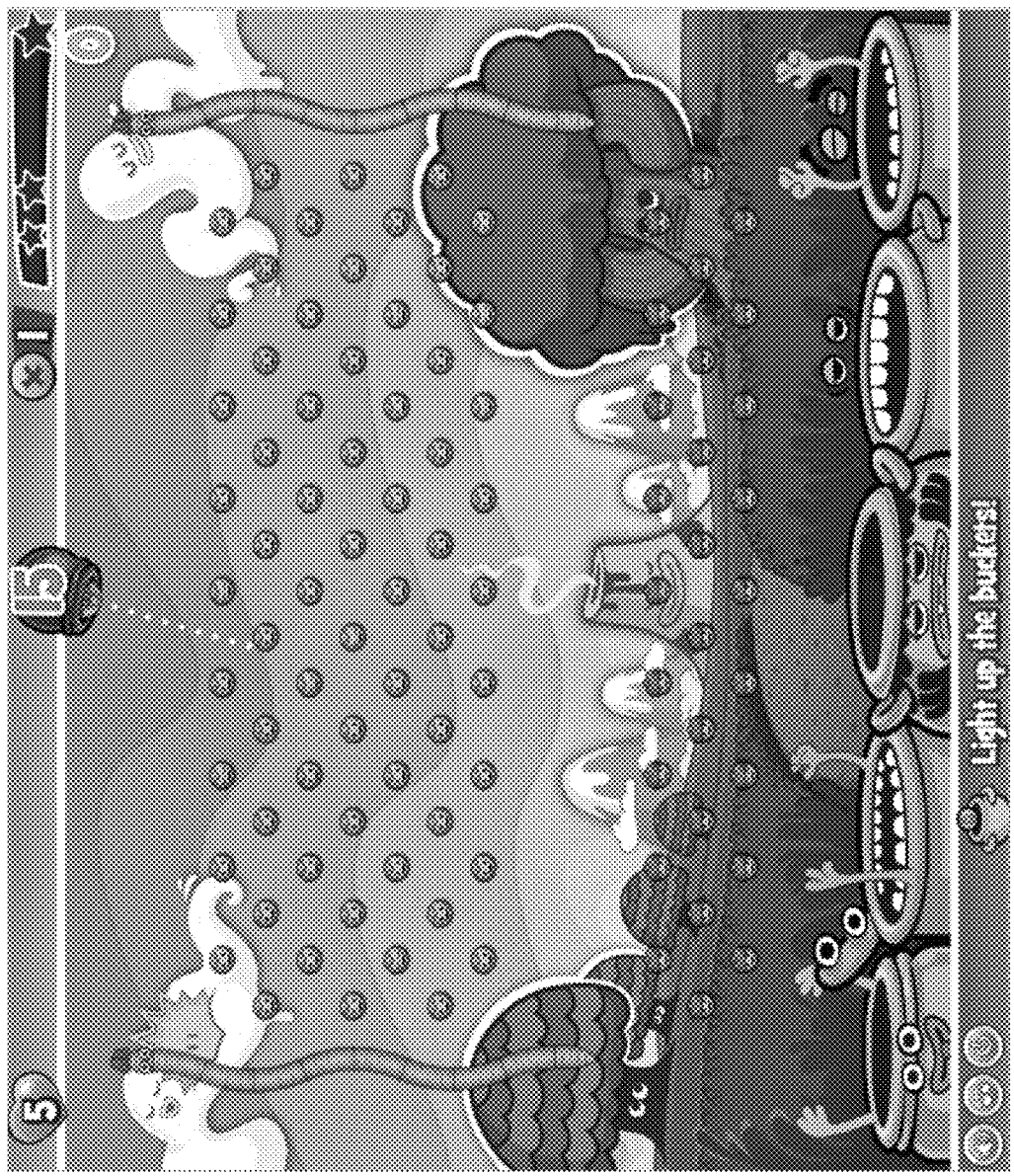
FIG. 29 shows an exemplary game board layout.
Figure 30:
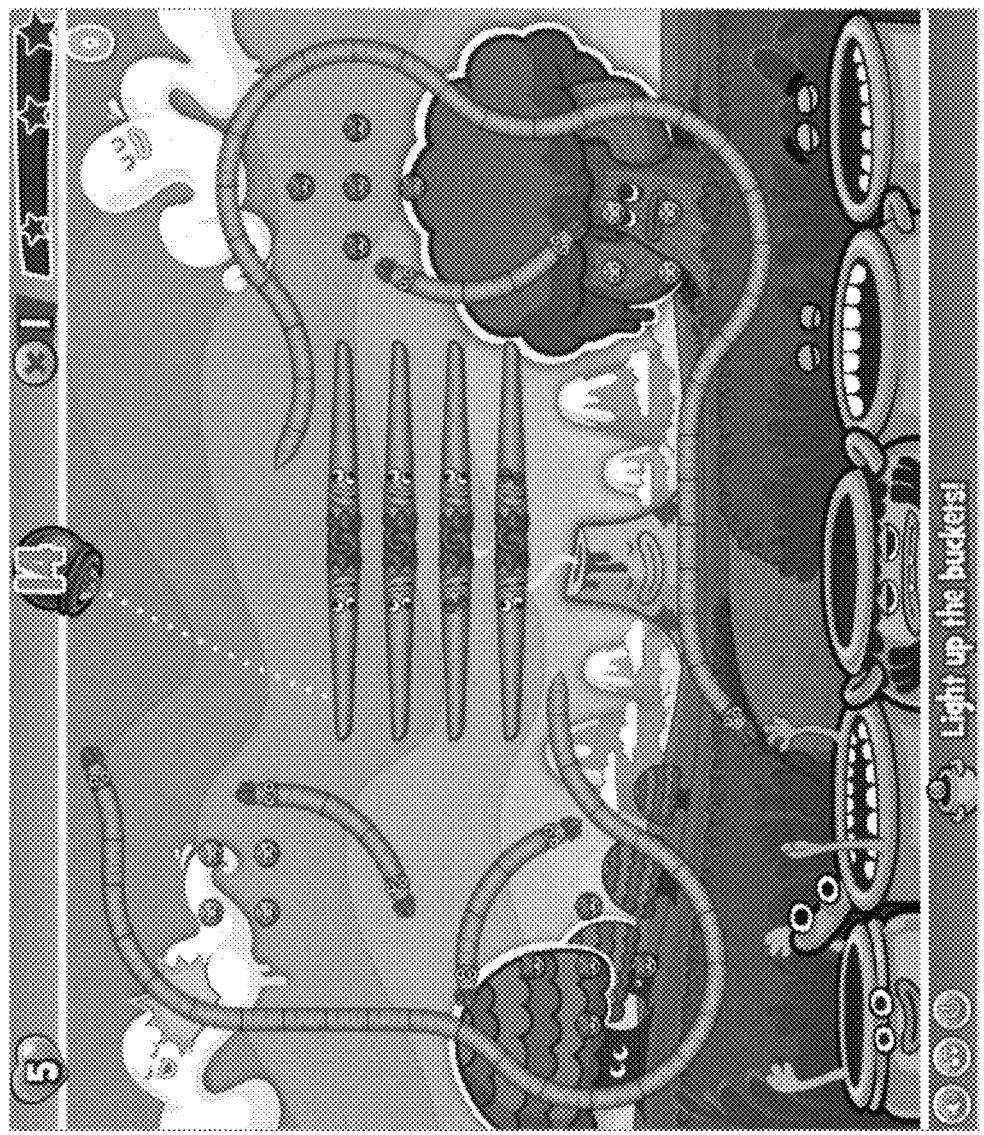
FIG. 30 shows an exemplary game board layout.
Figure 31:
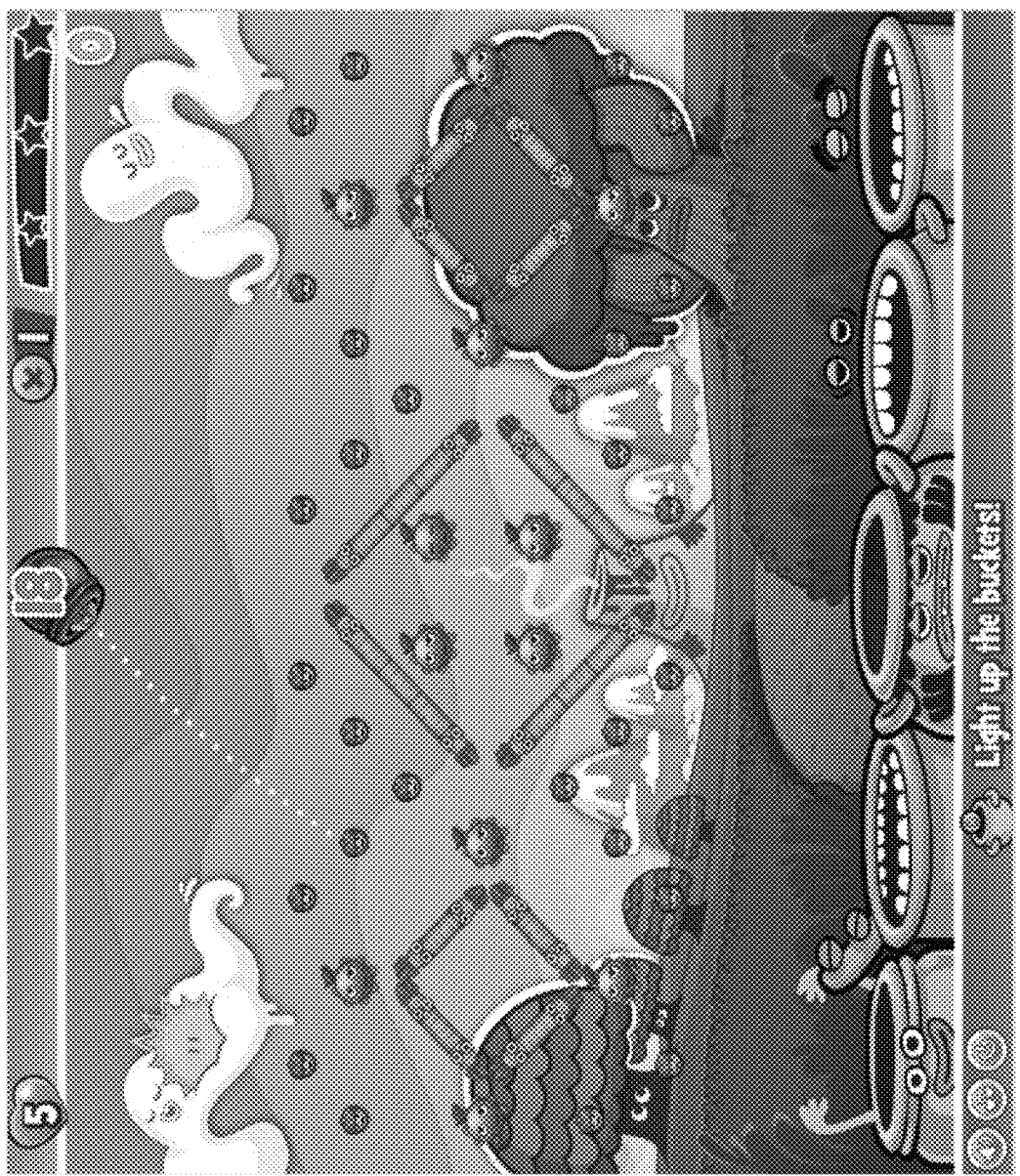
FIG. 31 shows an exemplary game board layout.
Figure 32:
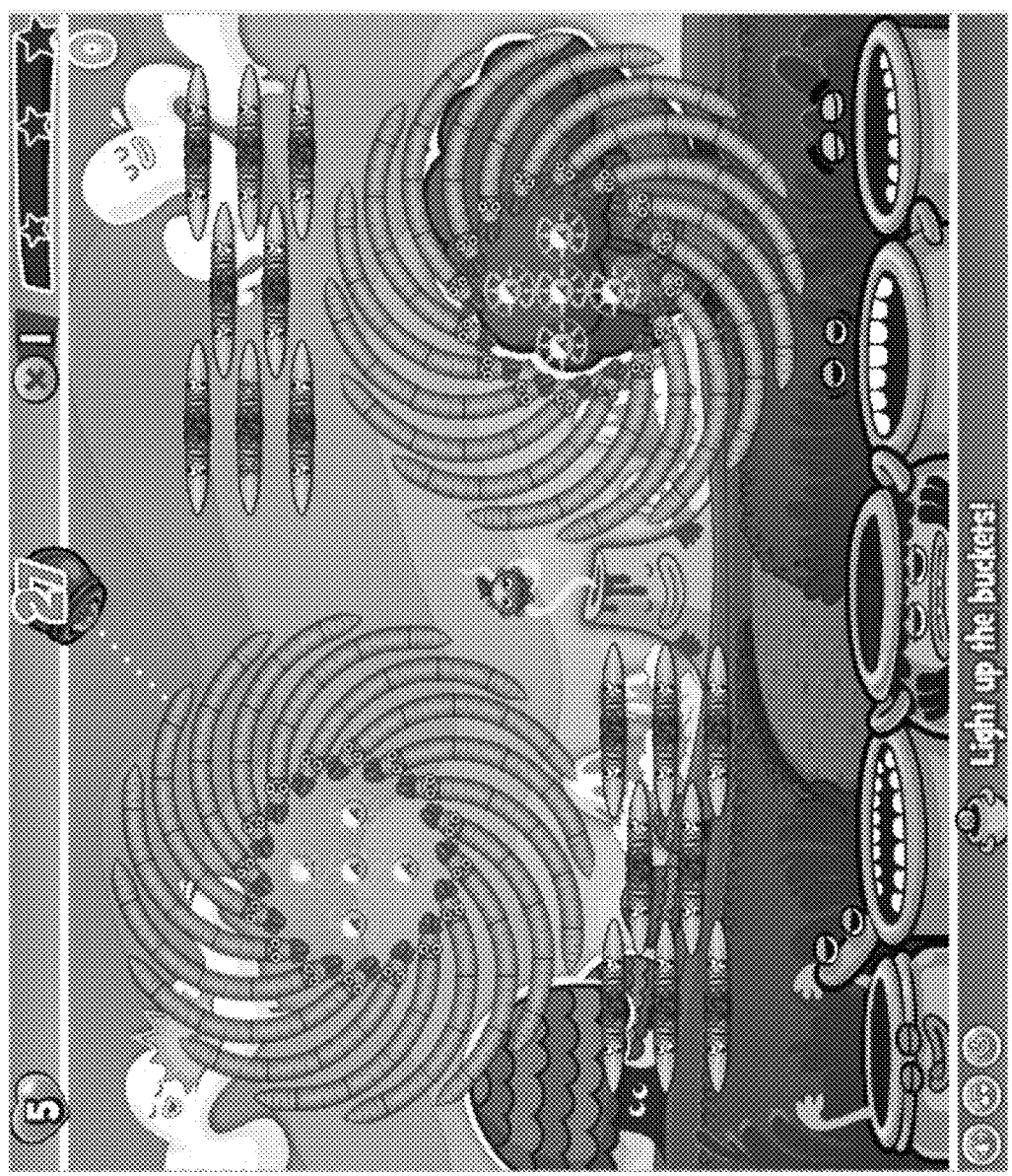
FIG. 32 shows an exemplary game board layout.
Figure 33:
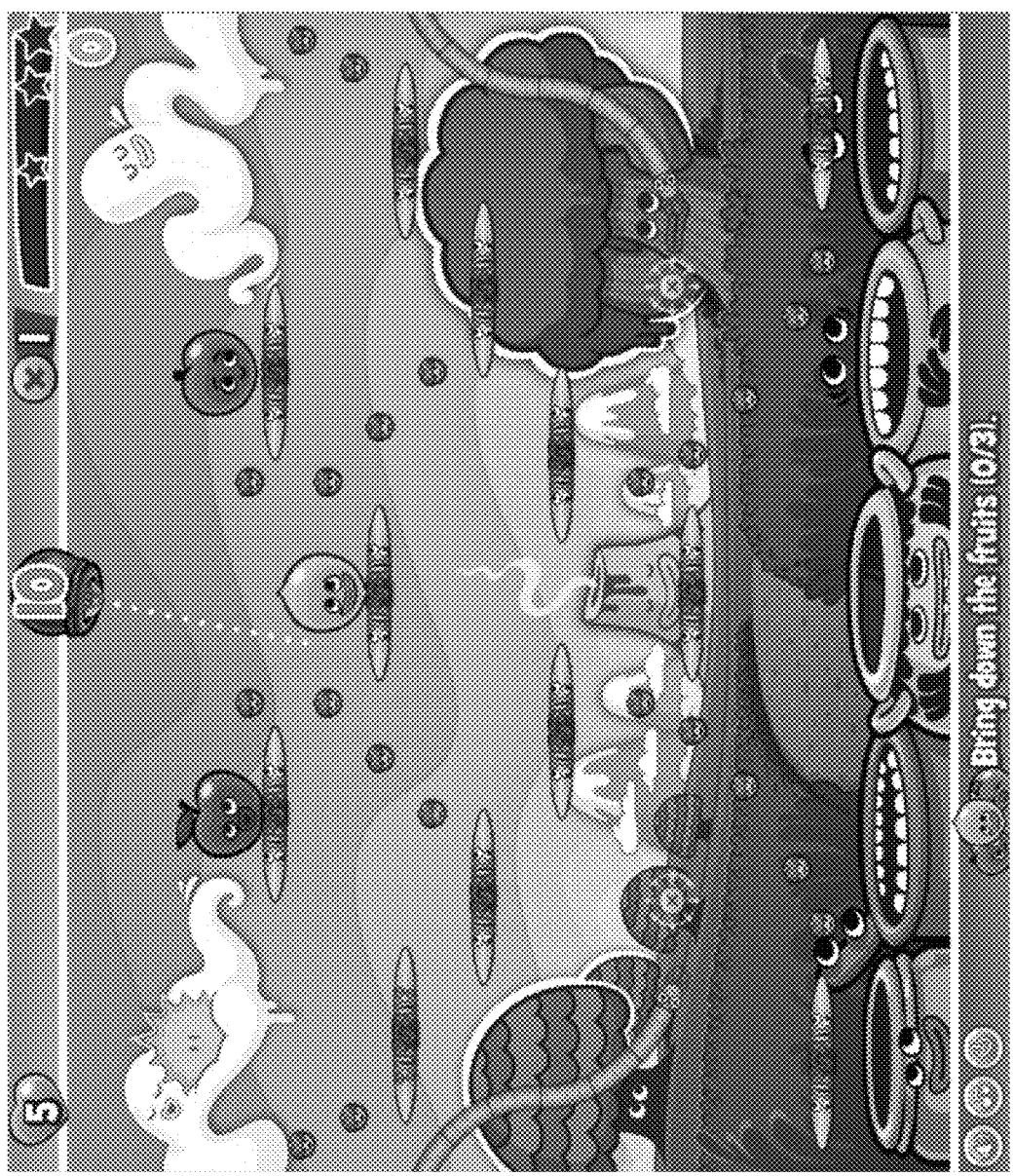
FIG. 33 shows an exemplary game board layout.
Figure 34:
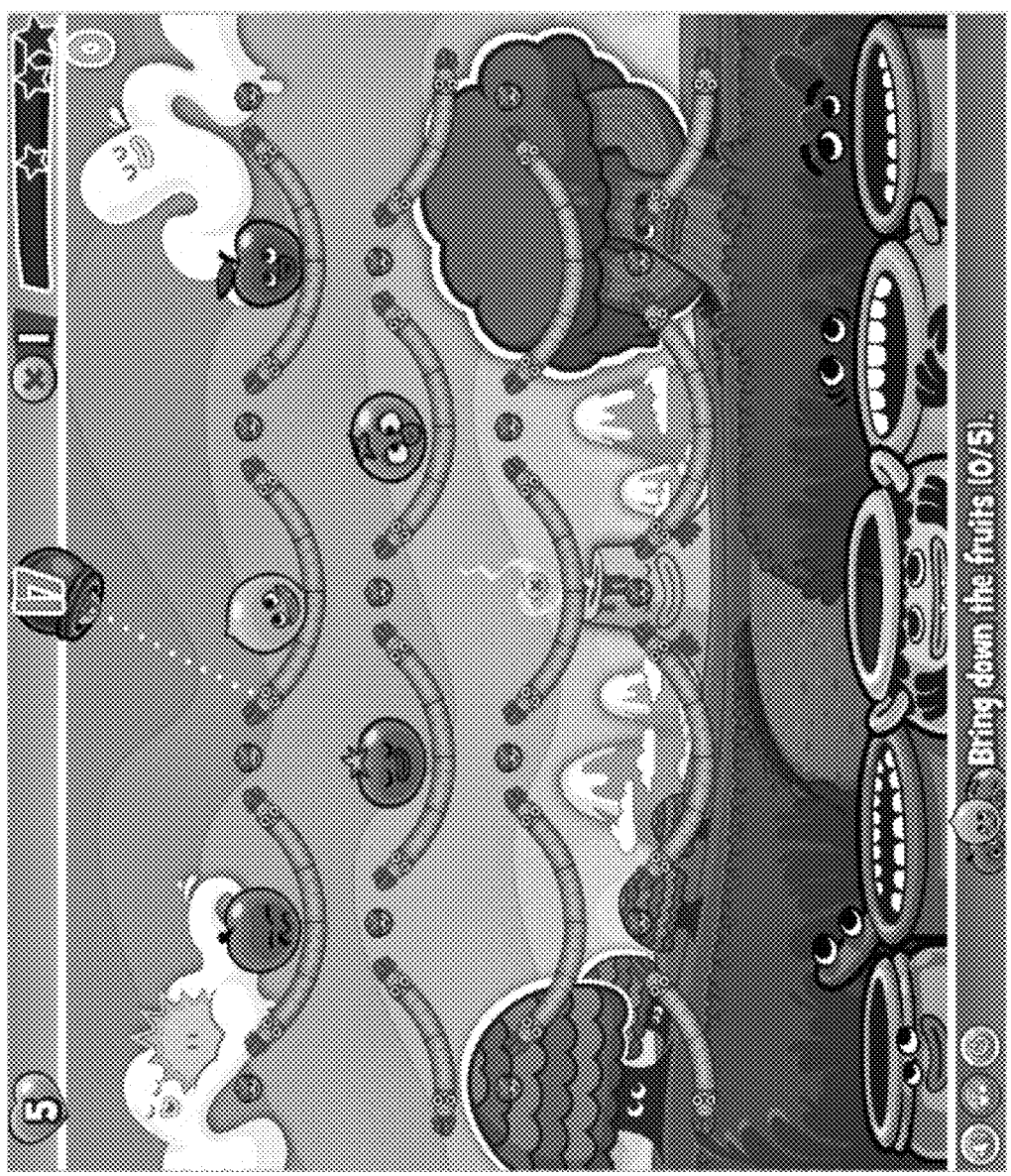
FIG. 34 shows an exemplary game board layout.
Figure 35:
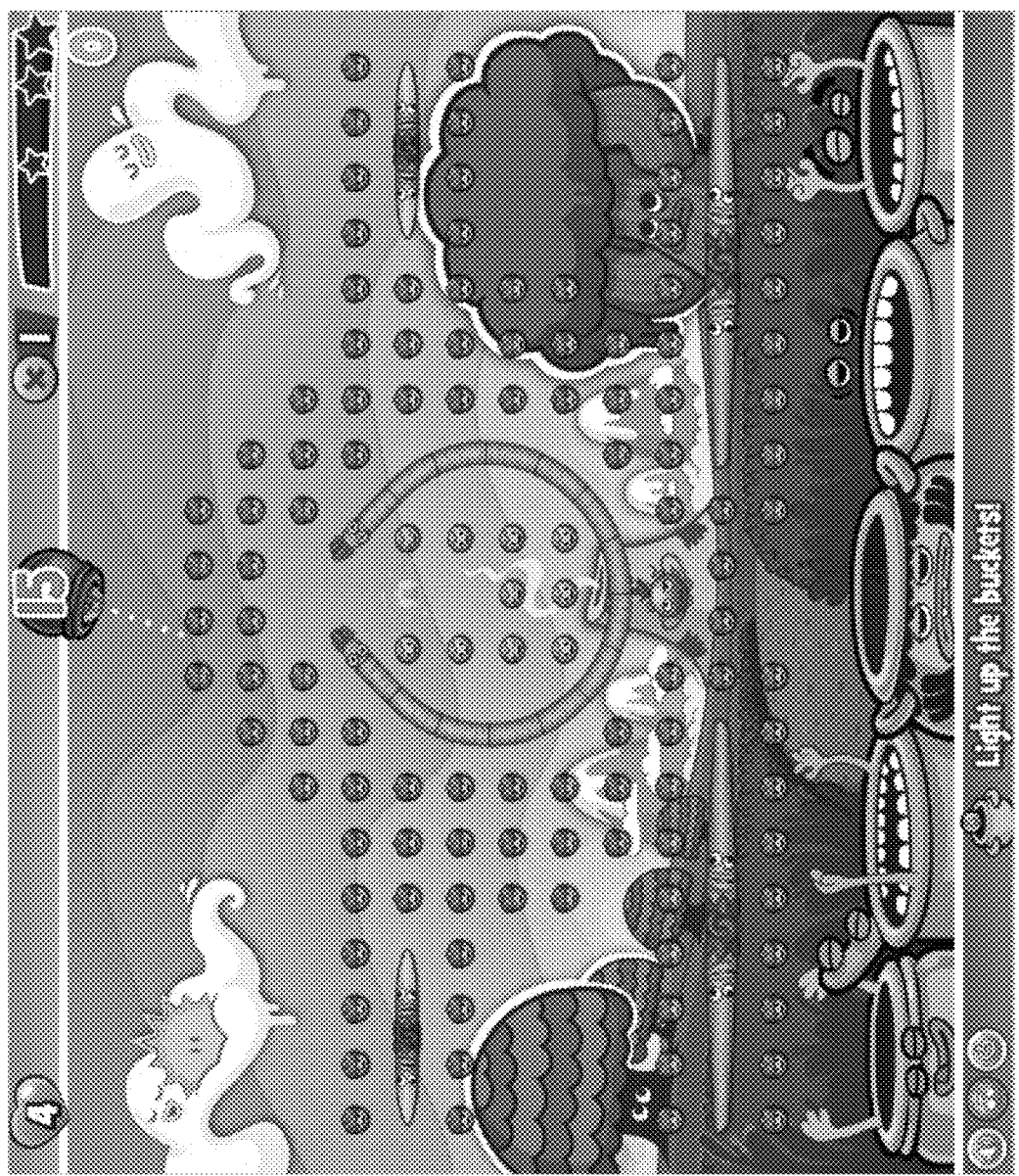
FIG. 35 shows an exemplary game board layout.
Figure 36:
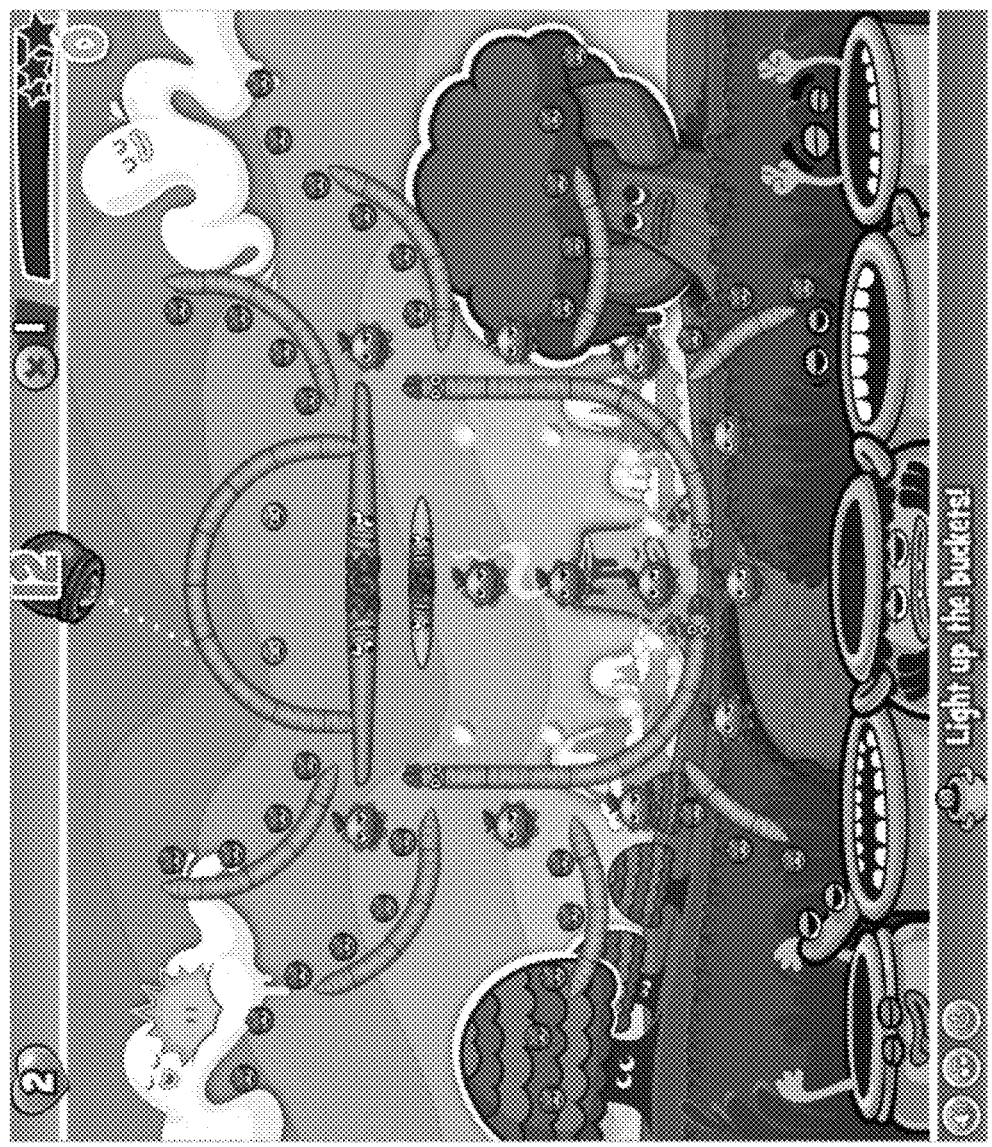
FIG. 36 shows an exemplary game board layout.

The ball can in some implementations take on a different shape that allows the ball to remove all removable game objects even though they require more than one bounce to be removed. This special property of the ball can for instance appear after ball has bounced on both sides of the screen as exemplified in FIG. 19. This behaviour may also appear after the ball has hit an object on the game board and then changed properties.

There are different actions that can award the player with an extra ball. One such action can be to bounce a ball for instance 5 times on the rims of the receptacles.

The special balls that may be implemented are exemplified in FIG. 20, FIG. 21, FIG. 22, FIG. 23, FIG. 24, FIG. 25 and FIG. 26.

Power-Ups

The game can be implemented with different types of 'power-ups' that the player can use to improve the gameplay, to overcome an obstacle such as a blocker game object or to make it easier for the player to reach a game goal. The power-ups can be added before a game or level is started and some can also be added when the game is played. A power-up can be for a one-time use or for several uses.

There are three general types of power-ups that can be implemented in the game for the player to use. Power-ups can affect the some of the game settings without creating a specific object that appears in the game. The power-ups can be of a type that is available for the player to trigger in the game, but is not part of the game area normally. This can for instance be a trigger to split the ball on activation of the power-up. Another type of power-ups adds special objects that get mixed into the game flow. These objects may replace an existing object.

The power-ups can be awarded to the player for good gameplay or they can be gifted to the player from another player of the game or connected to the player. The power-ups can in some implementations be bought for soft money in the game or real-world money. The pricing of the power-ups can differ depending on when the power-up is bought. The power-up can for example be more expensive if bought during the game than if it would be bought before the game has started.

Some power-ups can in some implementations be permanent after they have been added to the player's inventory. The player can then use the power-up for as many times as he whish. The use can in some implementations be limited to one time per gameplay or level.

Power-ups can be implemented so that they are activated when the level or game is launched or started or so that the player can activate the power-up during the gameplay.

A power-up that can be implemented will let the player remove a game object on the game board. Which game elements the power-up lets the player remove can vary in different implementations. In some implementations the power-up allows any game object to be removed, in some implementations only non-removable game objects and in some implementations only removable game objects. There can in some implementations be more than one different power-up of this type that can remove different elements.

A power-up that can be implemented is a stop motion power-up that can stop all or some movable objects on the game board. Allowing some or all of the movable objects to be frozen will make the level more predictable to the player. In some implementations this power-up will only freeze the motion for a limited time or number of balls that are launched.

A power-up that can be implemented is to let the player start the level with or activate the power-up during gameplay so that one of the receptacles is moved to the final state.

A power-up that can be implemented is that for the first shot after that it has been activated the ball will split in two at the first bounce on a game object.

A power-up that can be implemented can increase the score multiplier.

A power-up that can be implemented is to let the player start the level with an extra number of balls.

A power-up that can be implemented is to make one or several of the balls immune to blocker objects that will cause the ball to be taken out of play and lost.

Other power-ups that can be implemented can be to add extra special game elements to the game board such as a special game element that will split the ball.

In some implementations a power-up that will 'rewind' the last shot or shots can be offered to the player to use. This power-up can in some implementations be used as many times as the player would like in a game with the player paying for each use of the power-up.

Another power-up that can be implemented allows the player to stop all activity on the game board and to be able to move one or a plurality of the balls on the game board to a different location. The moved ball or balls will start moving when the power-up is deactivated and all other activity will continue from where the game was paused.

Levels

The game may be laid out on several different game board layouts which each of them can be a level in the game. The objects on the game board can be defined before the game in prebuilt levels. Some of the objects can be random and some of the objects may be specifically placed on the game board by the game designer. Exemplary game board layouts are shown in FIG. 27, FIG. 28, FIG. 29, FIG. 30, FIG. 31, FIG. 32, FIG. 33, FIG. 34, FIG. 35 and FIG. 36.

An Alternative Platform to Play the Game

The game can also be implemented to be played with a limited time or limited number of balls or both over a consecutive set of levels. The score can be collected over the several levels to give the player a score for all the levels completed.

The game can for instance be implemented so that the player should try to bounce on as many things as possible and then try to land in a receptacle that hasn't been brought to the final state yet. The player is rewarded with an extra shot for each new level that he advances to. There are a few multiplier game objects on each level. The multiplier game objects increase the player's score multiplier. If the player manages to remove all objects of one type, more multiplier game objects will appear.

Game Objects in Papa Pear™

Below are some examples of game objects that can be implemented in the game. All of these examples refer to a specific embodiment, namely King.com's game Papa Pear™ game and the Pap Pear Saga™ game. A person skilled in the art will however realize that this is simply one embodiment among many possible ones, and the list is not supposed to be exhaustive.

A 'hazelnut' game object disappears when a ball bounces on it. A 'multiplier coin' object appears when all hazelnut objects have been removed form the game board.

A 'baby-onion' game object changes colour when a ball bounces on it. The value for bouncing a ball on this game object increases with each new colour the game object takes. The game object disappears when it has been hit by a certain amount of bounces, for example three. A 'multiplier coin' object appears when all 'baby-onion' objects have been removed form the game board.

A 'chilli' game object will disappear after two balls have bounced on it. A multiplier coin appears when all chillies of a level are removed.

A 'mini-chilli' game object, characterized by being smaller than the 'chilli'-game object, will disappear after two balls have bounced on it. A multiplier coin appears when all chillies of a level are removed.

A 'carrot' game object disappears when a ball bounces on it. A 'multiplier coin' object appears when all hazelnut objects have been removed form the game board.

A 'chestnut' game object will not disappear from the game board when a ball bounces on it. In some embodiments this game object A 'BlueBerry' game object will not disappear from the game board when a ball bounces on it. The game object functions similarly to a pinball bumper. The game object will when hit push the ball away, giving the ball more speed than it had prior to hitting the bumper. The player receives points for each bounce a ball makes on the object.

Game Scoring

The game can be implemented so that different actions in the game give different score. The actions can for instance be to bounce a ball on a game object, to remove a game object from the game board, to bounce a ball to the wall of the game board or to bounce a ball on a game object more than one time.

Below are examples of how the points awarded in a game can be implemented.

Hazelnuts
  You get 100 p for each Hazelnut you bounce on.
  You get bonus points for hitting several Hazelnuts with the same ball.
  Bonus=+20 p for each consecutive Hazelnuts you bounce on with the same ball.

Golden Coin
  You get 100 p for Golden Coin you bounce on.
  You get bonus points for hitting several Golden Coin with the same ball.
  Bonus=+20 p for each consecutive Golden Coin you bounce on with the same ball.
  Increases the multiplier with +1 when hit.
  The multiplier affects all points for the remainder of the game.

Split Peg
  You get 100 p for any Split Peg you bounce on.
  You get bonus points for hitting several Split Pegs with the same ball.
  Bonus=+20 p for each consecutive Split Peg you bounce on with the same ball.

Wake-Up Peg
  You get 100 p for any Wake-Up Peg you bounce on.
  You get bonus points for hitting several Wake-Up Peg with the same ball.
  Bonus=+20 p for each consecutive Wake-Up Peg you bounce on with the same ball.

Carrot Piece
  You get 100 p for each Carrot piece you bounce on.
  You get bonus points for hitting several Carrot Pieces with the same ball.
  Bonus=+20 p for each consecutive carrot piece you bounce on with the same ball.

Chilli & Mini-Chilli
  You get 100 p for each Chilli you bounce on.
  500 p for each removed wing.

Baby-Onions
  You get 100 p for a bounce on a Baby-Onion.
  The value increases with 100 p/new colour.
  You get bonus points for hitting several Baby-Onions with same ball.

Bonus=+20 p for each consecutive bounced Baby-Onion with the same ball.

BlueBerry

You get 100 p for each BlueBerry you bump.

You get bonus points for bumping on a BlueBerry with same ball.

Bonus=+20 p for each consecutive bump with the same ball

Special Bonus Scores

Take a Golden Coin=1000 p

Remove all Hazelnuts=1500 p

Remove all Carrots=1250 p

Remove all Chillies=1750 p

Remove all Pegs=2000 p

Bounce 10 times on Blueberries with the same ball=1000 p

Bounce 5 times in a row on the receptacle edge with the same ball=5000 p

Land directly in a receptacle without hitting anything else=1000 p

Bounce on the top of the playing field=500 p

Bounce on both walls with the same ball=5000 p

Bounce 50 times with the same ball=1500 p

Make a ball stay alive more than 20 sec=2000 p

Balls

The player gets points for the balls when they land in a receptacle. The score is based on the accumulated value the ball collects when bouncing on game objects on the game board. In one embodiment the score received when a ball lands in a receptacle is 0.5 times the accumulated value of all bounces for that specific ball.

The balls the player has not used when reaching the game goal can in some implementations help the player to increase the score. The remaining balls can be shot out from the ball launcher and collect points as they bounce on the game objects on the game board. The remaining balls can also provide a larger score when they land in a receptacle.

Controls

When the game is played on a mobile device, it is possible for controls to be adapted to suit the specifications of that particular device. Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

In a typical implementation it is possible for the player to choose between different control modes, in other implementations the controls are pre-determined and cannot be changed. It is also possible for controls to be customizable by the player, for example the player could choose to assign a certain effect to happen after three clicks and a swipe to the left.

There can be multiple control modes available, but using a swipe to aim where the ball is to be shot out on the board is common for all control modes on a mobile device. There are three key areas that differ between different control modes:

Whether the player shoots by releasing a swipe or by tapping after making a swipe.

Whether the players swiping movement is gauged in both power and aim in all directions simultaneously or if power is gauged solely by movement in y-axis and the aim is decided solely by swipe movement along the x-axis.

A third area is related to when the player starts swiping from a new position than the current aim of the shooter.

It is possible for the 'aim line' to jump straight to the new position of the player's finger and start moving from there, or the aim does not jump and simply moves according to the players movements even though they are not at the same position as the actual aim.

These three different control mechanisms can be combined in any number of ways, following is a description of four different modes implemented in a typical version of the game.

Figure 37:
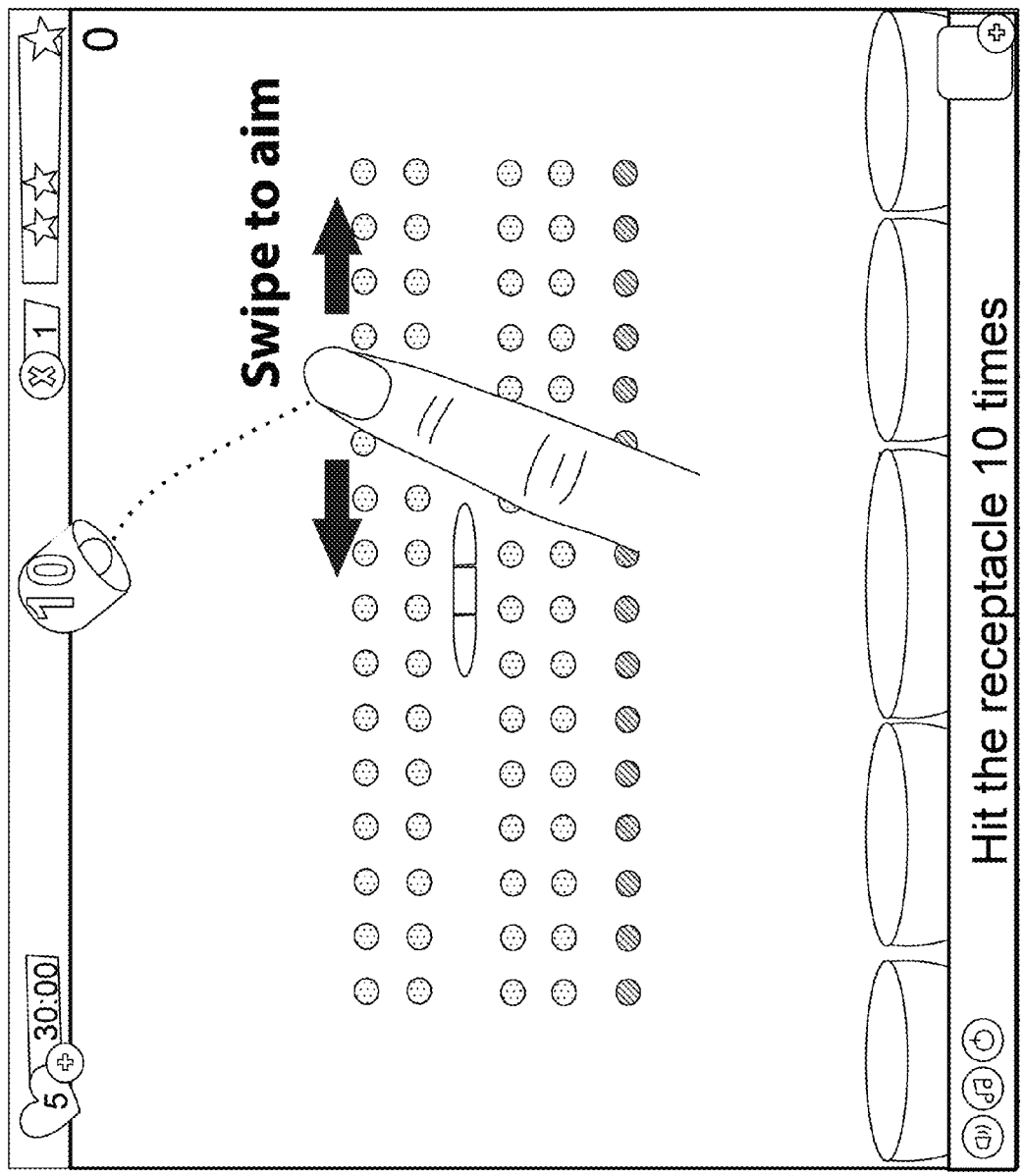
FIG. 37 shows aiming instructions.
Figure 38:
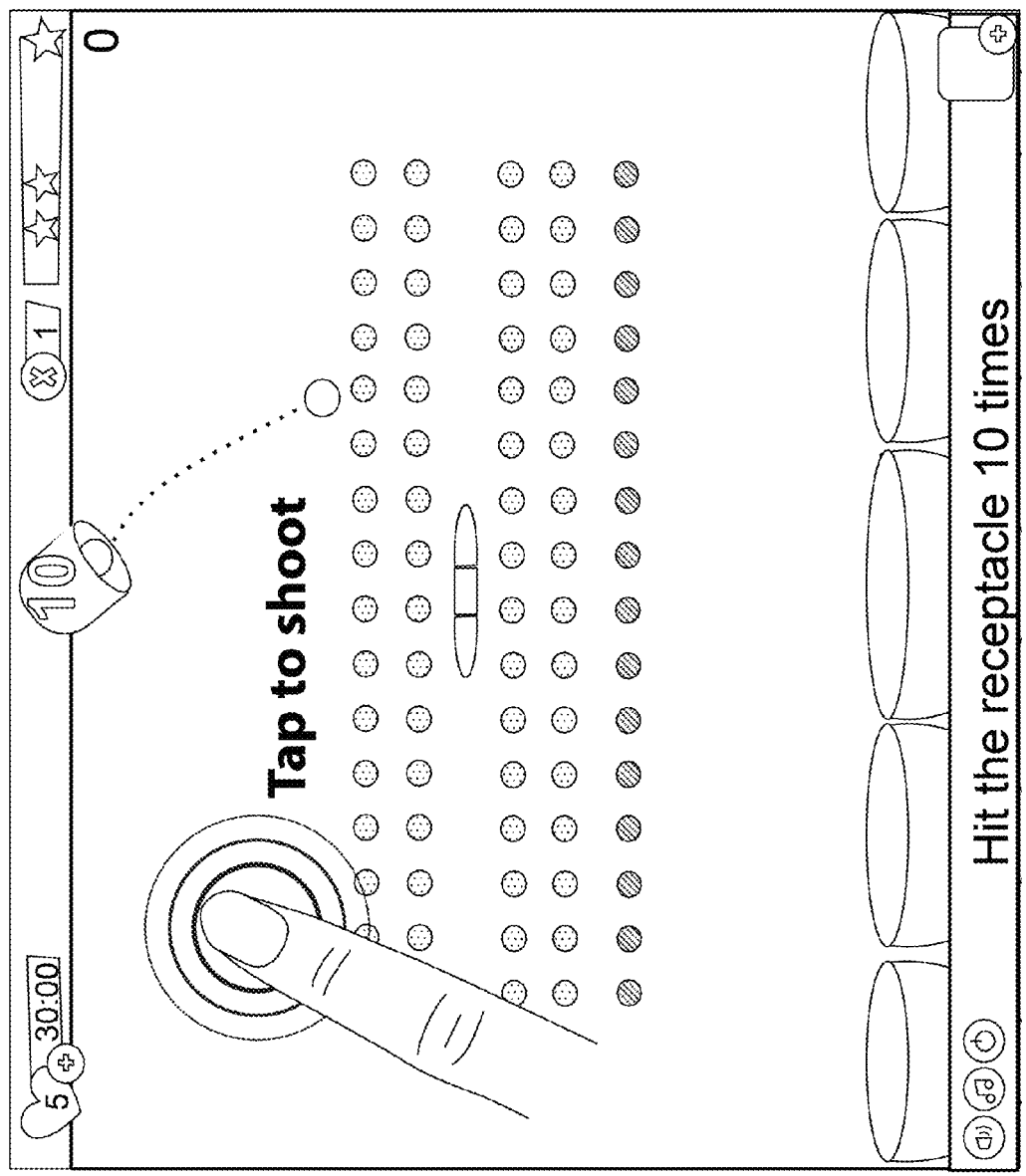
FIG. 38 shows shooting instructions.

The default controls on a mobile version will typically be that the player swipes to aim, shown in as shown in FIG. 37. After finishing a swipe, the shooter will have a certain aim and a certain power. The power is represented by the length and size of the dots that are shown as emanating from the shooter. The player then taps to make a shot, and the ball will be shot out according to the aim and power determined by the swipe. The aim and power of the shot is determined simultaneously and the position of the aim does not jump to the position where the player starts a new swipe, but instead moves from its current position relative to the player's movements. FIG. 38 shows the in-game instructions for shooting given in a typical implementation.

In a second control mode the player swipes to aim and taps to shoot. The position of the aim does not move to where the players finger is, but moves from its current position no matter where the player starts a swipe. Instead of simultaneously gauging power and aim, the power is only gauged by the swipe movement along the y-axis and aim is only determined by movement along the x-axis.

In a third control mode the player swipes to aim and taps to shoot. The position of the aim does move to where the players finger or touching device is positioned, and the gauging of power and aim will be done simultaneously in all directions.

In a fourth control mode the player swipes and holds in order to aim and determine the power of the shot, then releases the swipe in order to shoot the ball. The aim does move to where the player positions his finger or touching device and simultaneously gauges both aim and power.

It should be understood that the control modes can be varied in settings such as how much the aim moves in relation to the player's swipe.

In some implementations, there can be additional controls and functionalities, sometimes connected to more advanced interactions with the touch-sensing capabilities of a mobile device, such as two-finger clicks, three finger-clicks, rotation with two fingers and so on. It is possible for the player to assign special moves to such interactions, or the game can have it implemented in any of the previously mentioned control modes.

Although these control mechanisms relates to a game implementation on a mobile device, it is possible for a computer version to have some of the same characteristics such as multiple control modes or customizable controls. For instance, it can be possible for a player to change the sensitivity of the shooter and that a shot requires two clicks instead of one. It is also possible that these are two pre-determined control modes that the player can switch between by selecting them in the options menu.

Another version of controls, preferable on but not limited to implementations on a computer, makes use of hard keys to control the game. For instance, the player can aim to the right or left with two different keys and use another two keys for increasing or decreasing the power of a shot. It should be understood that this can be combined in any number of ways with other modes of control, such as swiping on a mobile device or using a mouse on a computer.

Generally games have a symbol more or less resembling an X which gives the player the option to close down the current game, menu or other function. In some implementations of the present game, no such X-symbols or icons are present. The player still has the same functionalities available, but instead of clicking on an X the player will have to select to which screen he wants to proceed, for instance going back to the map mode while in a level would require the player to click an icon with a map symbol instead of an X.

End Game Sequences

Figure 39:
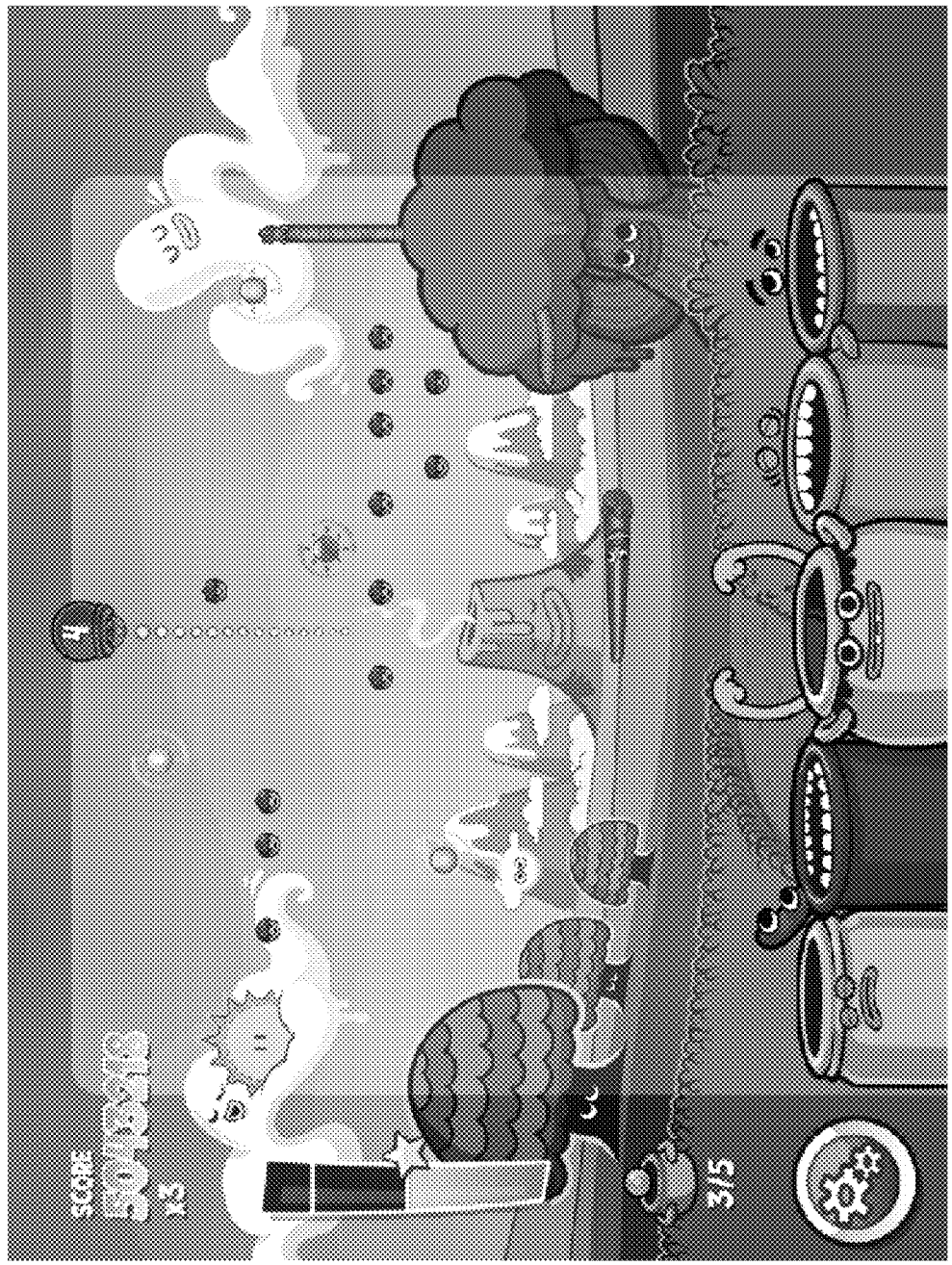
FIG. 39 shows completed level about to start an end level sequence.

At the end of a level, i.e. when the goals for a level have been fulfilled, the player is typically rewarded for any remaining balls and power-ups. FIG. 39 shows a level that has just been completed and in which an end level sequence is about to start.

Figure 40:
FIG. 40 shows the start of an end level sequence.

There are a lot of visual effects and animations that intend to give the feeling of happiness and accomplishment to the player. In a typical implementation, there will be rainbows and stars firing from the receptacles, which can be seen in FIG. 40. This is in some implementations accompanied by audio to signal that the player has accomplished something.

Figure 41:
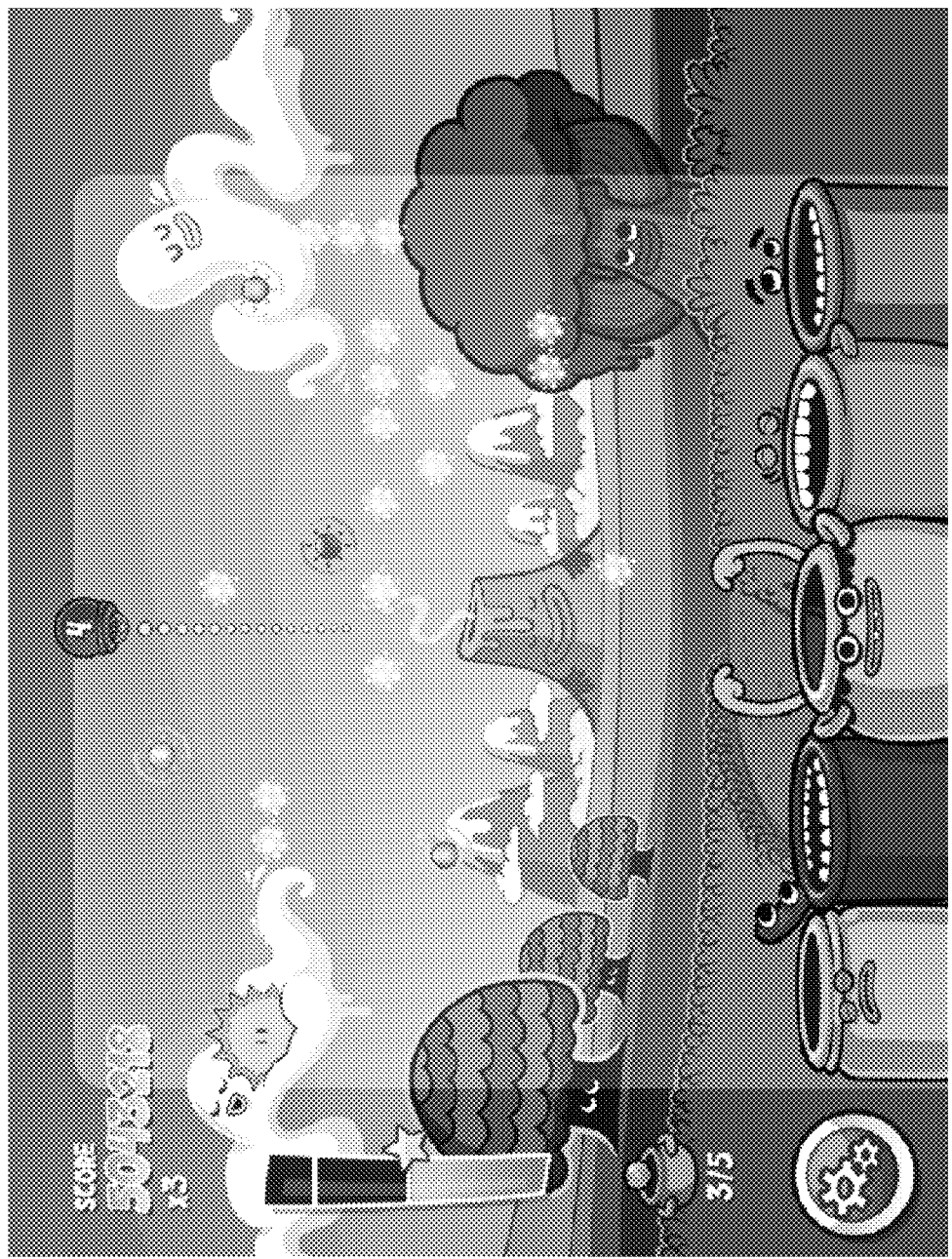
FIG. 41 shows the part of an end level sequence in which blockers disappear.

After the encouraging visuals, the remaining blockers on the level will disappear. Typically, this does not affect the player's score either negatively or positively. FIG. 41 shows the animation of all remaining blockers disappearing, which can easily be compared to FIG. 39 to see that the white globes correspond to where the blockers were previously placed.

Figure 42:
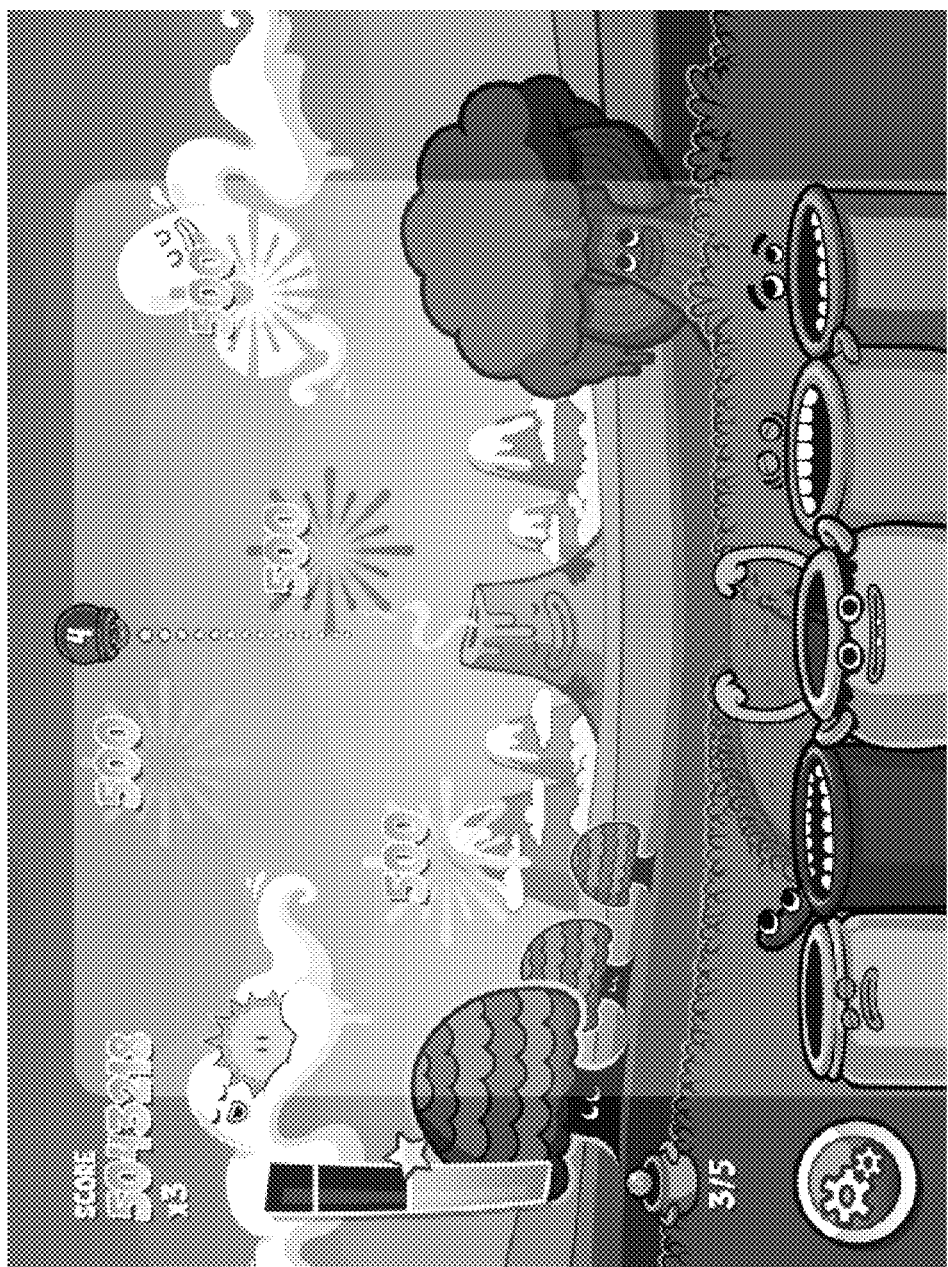
FIG. 42 shows the part of an end level sequence in which remaining boosters give bonus points.

After all blockers have been cleared from the board, the player will start receiving bonus points for remaining power-ups and balls. In a typical implementation, the bonus points will be 500 per remaining power-up, multiplied with the player's current multiplier. FIG. 42 shows the score being displayed and received for remaining power-ups.

Figure 43:
FIG. 43 shows the last part of an end level sequence in which remaining balls give bonus points.

The last part of a typical end game sequence is that the player receives bonus points for all remaining balls, if there are any. In a typical implementation the player will receive 2500 bonus points per remaining ball, but in some implementations this can vary. FIG. 43 shows the part of the end game sequence in which a player receives bonus points for remaining balls, and in the implementation displayed the player gets 150 bonus points for one ball.

It should be understood that what is described above is merely an example of one implementation of the end level sequence, there can be variations. For instance, the remaining blockers can give negative points, or the player can get to keep playing until there are no balls remaining, even if the goals of a level have already been fulfilled.

Social Aspect

Connection to a Social Network

Games created using the invention described herein can be connected to or linked with a social network such as Facebook™ or Google+™ or a games platform with different players who can interact and see each other's progress. It is common that the users on such networks have avatars with for instance a photo of the user and/or the user's name. Such avatars can for instance also be a sign or a figure.

The social network can be located on a server that is different from the server on which the game is located, the game and the social network can also be located on the same server. In some implementations there is a direct live connection between the social network and the game platform that continuously synchronise them, in other implementations the two platforms synchronise at certain intervals, such as when the player logs into the game. The players progress when having played in offline mode (for instance completed levels and score), for instance if the player is travelling in a tunnel, can be synchronized when the player is connected to the internet.

The user and his friends' avatars can be displayed in the game or in relation to different levels in the game to show the player's progress. The avatars can also be shown in relation to indicators of the player's skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

Ways of Playing the Game

Web-Based

One way of implementing a game using the techniques described herein is through a web site with a plurality of casual games. This platform can be used as a basis to test the performance of the game and how it is perceived by players. In some web-based implementations the game is implemented to be played in head-to-head tournaments, has a limited number of levels and no external social network connection. In some implementations the players can play the game against other players on the platform.

If a game proves to be successful in a web-based implementation, it can be further adapted to another type of implementation, based on a virtual terrain in which the player progresses. This implementation typically has a connection to an external social network, and can have multiple game modes such as asynchronous and synchronous tournaments and single player mode. The nodes on the map in the game are typically different levels that the player can play.

The two implementations described above can be part of a modularised approach to developing games, which help streamline and facilitate the process of producing as well as further developing new tides.

Virtual Map

Figure 44:
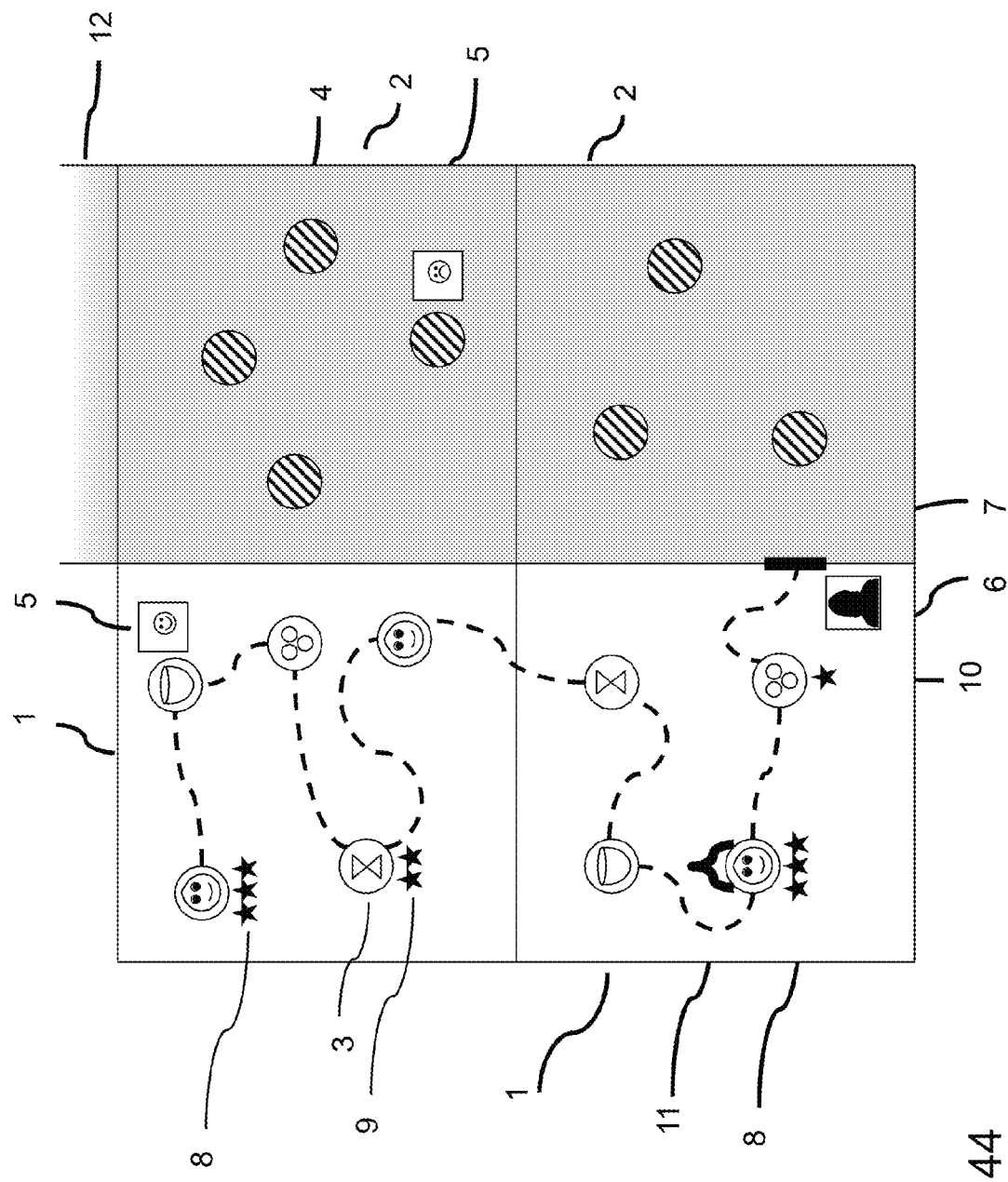
FIG. 44 shows a virtual map.

The game can be implemented so that a player progresses through multiple levels of changing and typically increasing difficulty. FIG. 44 shows an implementation of the game with a virtual map layout of a game environment, displayed on the screen of the computing device used by the game player. As the player progresses through the levels in the game, his progress is represented as a journey along a path on the virtual map. Representing progress in this manner provides an additional layer of engagement for players, and also opportunities for viralisation and monetisation.

The virtual map consists of stages 1, 2 with varying number of levels 3, 4 represented by nodes on the virtual map. The user travels between levels and completes the levels one by one along a path by playing the associated game. When the player reaches the goal of a level, the next level on the path is unlocked and the player can play that level in the game. The number of stages and levels can vary depending on the implementation.

In some implementations of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated to the first levels of the game, but they can also be used at later stages to explain newly introduced elements and objects.

The levels can be numbered consecutively throughout the game or they can be numbered within a stage, it is also understood that other ways of identifying the stages and levels can be implemented. New stages to the virtual map 12 can be added by the game designers at any time—so a game may be launched with say 20 levels, and after a number of weeks, there may be fifty or sixty levels present.

Stages in the game can be both locked or unlocked. In most implementations, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some implementations, certain levels and stages are locked based on other criteria than the player's linear progression in the game. Such levels can for instance be based on the total score the player has achieved on all levels, the average performance on levels or on the number of friends that the player has invited to play the game.

In one implementation, one challenge 7 to unlock a stage arises when traveling from one stage to another once all the levels have been completed in that stage. The levels in the stage to which the player is travelling is typically locked by default, and the player must unlock them. This requires the help of for instance three friends. The player can ask friends for help by sending an in-game message within the game environment or for instance through a social network that the game is connected to. The friends can already be playing the game and do not have to be 'new' players, but they can be friends not already on the same social network.

The player can also pay to get instant access to the locked stage. The currency used for paying can vary between different implementations, for instance it can be hard or soft currency, or it can be based on score achieved in the game. It is possible for the currency to be associated with a social network to which the game is connected, or it can be associated with another platform related to the game. The player can use a combination of help from friend and payment to unlock the new stage. The cost for unlocking can in some implementations be lowered as a fraction of the total number of friends needed when help from some but not all needed friends have been received.

There can be ways of getting past a collaboration block other than asking friends for help and paying for it, which are the most common ways of passing a collaboration block. This can be done through to use of 'Mystery Quests', which gives the player the option of completing one or several challenges to unlock the block. Such challenge can for instance be to play one or several past levels with modified goals in order to pass the collaboration block, for instance three levels—one for each of the locks.

These challenges are typically in the form of replaying a previously completed level but with a new goal to reach, for instance a target high score. In a typical implementation, the score requirement is higher than it is for playing the level regularly, and also no other goals need to be fulfilled. For example, if the player gets to replay a level with jelly with a new target high score, the player would not need to remove the amount of jellies specified as long as the target score was reached.

The request for help is sent to the friend who then has the option to accept to help. The request for help can in some implementations be sent using the social network to which the game is connected; an alternative implementation is to send the request to someone external to the game (via email, text message, instant message for instance) who has to join the game to respond to the help request. It can be understood that there can be variations between implementations in regards to how players respond to requests from other players. In a typical implementation, a link will be provided to the player who has been requested to help. This link can be related to a social network to the game is connected. This is one of the viralisation techniques implemented in this game.

In addition to the virtual map layout in FIG. 44, there can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout in FIG. 44 can be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The user's avatar is displayed on the map layout alongside the level where the user is 6. It is understood that there are different implementations of showing where the user currently is on the map. This can for instance be the latest level the user completed, the level where the player has achieved the highest score or the last completed level along the traversed path.

The user can in some embodiments be given the option to select which users should be shown on the virtual map. The users to choose from can be friends on a social network, or the user can get suggestions to show friends which meet a certain criteria, for instance friends which the player has interacted with the most in the past or friends living in the same geographic area as the player. The user can get the option to choose from other people not being friends on the social network, but that meet other certain criteria.

The user can play any of the unlocked levels on the map, so the user can go back and replay already completed levels to get a better score or beat friends' high scores.

The player is in some implementations of the game rewarded for good gameplay of a level, for instance reaching a target score or completing the level in a short time. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score. In some implementations the indicators representing the players' performance can be related to other goals, such as completing levels within a certain amount of tries.

The player's total number of stars collected in the game can in some embodiments unlock features. The unlocked features can for instance be power-ups, in-game currency or bonus levels. After being unlocked, such features can typically be accessed by the player in the game. Some unlockables might be given to the player while others require a purchase to be accessed.

The symbol representing how well the user has played on each level can be displayed alongside the level on the map 8, 9, 10.

In the map view, the player can hover over an unlocked level to display a thumbnail version of it. This makes it easier to find specific already completed levels, and can also give the player an idea of what to expect before actually starting a level. In a typical implementation, thumbnails cannot be displayed for levels that have not yet been unlocked. If trying to view one of these a symbol of a padlock will be in the place the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

If the game is connected to a social network or the user has connected with other players in the game, the levels can present a leaderboard showing who among the user's connections, or among a subset of the user's connections, that has the highest score. There can in some embodiments be a notification 11 shown on the map if the user that has the highest score among the friends connected to the game. Such a notification can be in the form of a message sent through for instance through the social network or an in-game message.

The type of game mode or game goals for a level can be displayed on the map as a symbol, for instance it can be a symbol for the level itself, or it can be shown in proximity to another symbol for the level. Such a symbol 3 can for instance be in the form of an object related to the game goal, such as an hourglass representing a level with a time constraint.

Figure 45:
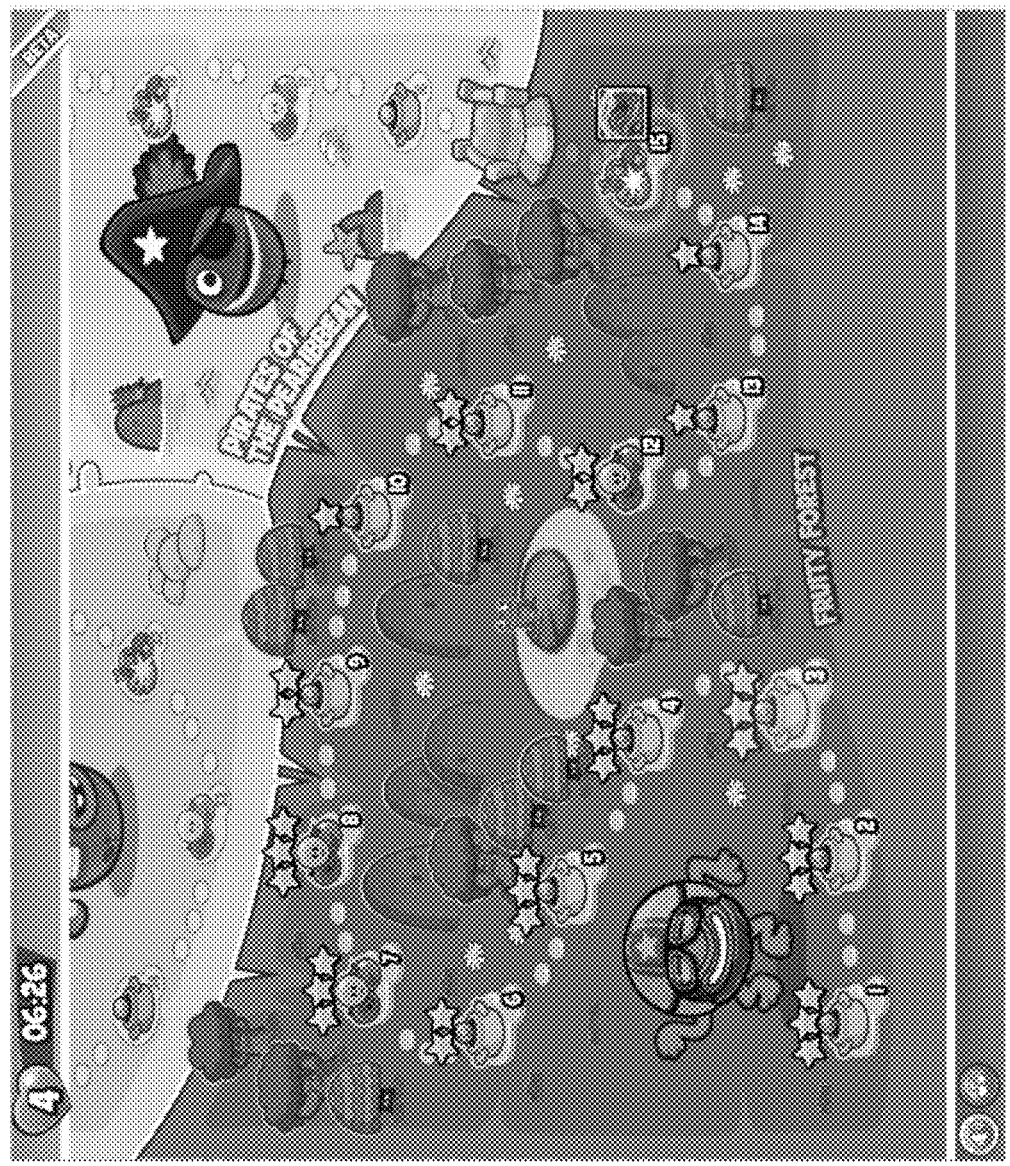
FIG. 45 shows an exemplary implementation of a virtual map.

An exemplary implementation of a virtual map can be seen in FIG. 45.

Animations and Interactions on the Virtual Map

The landscape of the virtual map will typically have animated sequences which give a feeling of the map being alive and dynamic. For example, trees on the map can sway in the wind, animals can move around and the player progressing from one level to another can be accompanied by an animation of a player-associated character moving on the map.

In some implementations, it is possible for the player to interact with objects on the map in such a way that animations are triggered. For instance, clicking on a bird can make it fly into the air and hovering over water can make waves appear.

It is also possible to have any combination of a map that is static but reacts to player input, a static map that does not react to player input, a dynamic map that reacts to player input and a dynamic map that does not react to player input.

Figure 46:
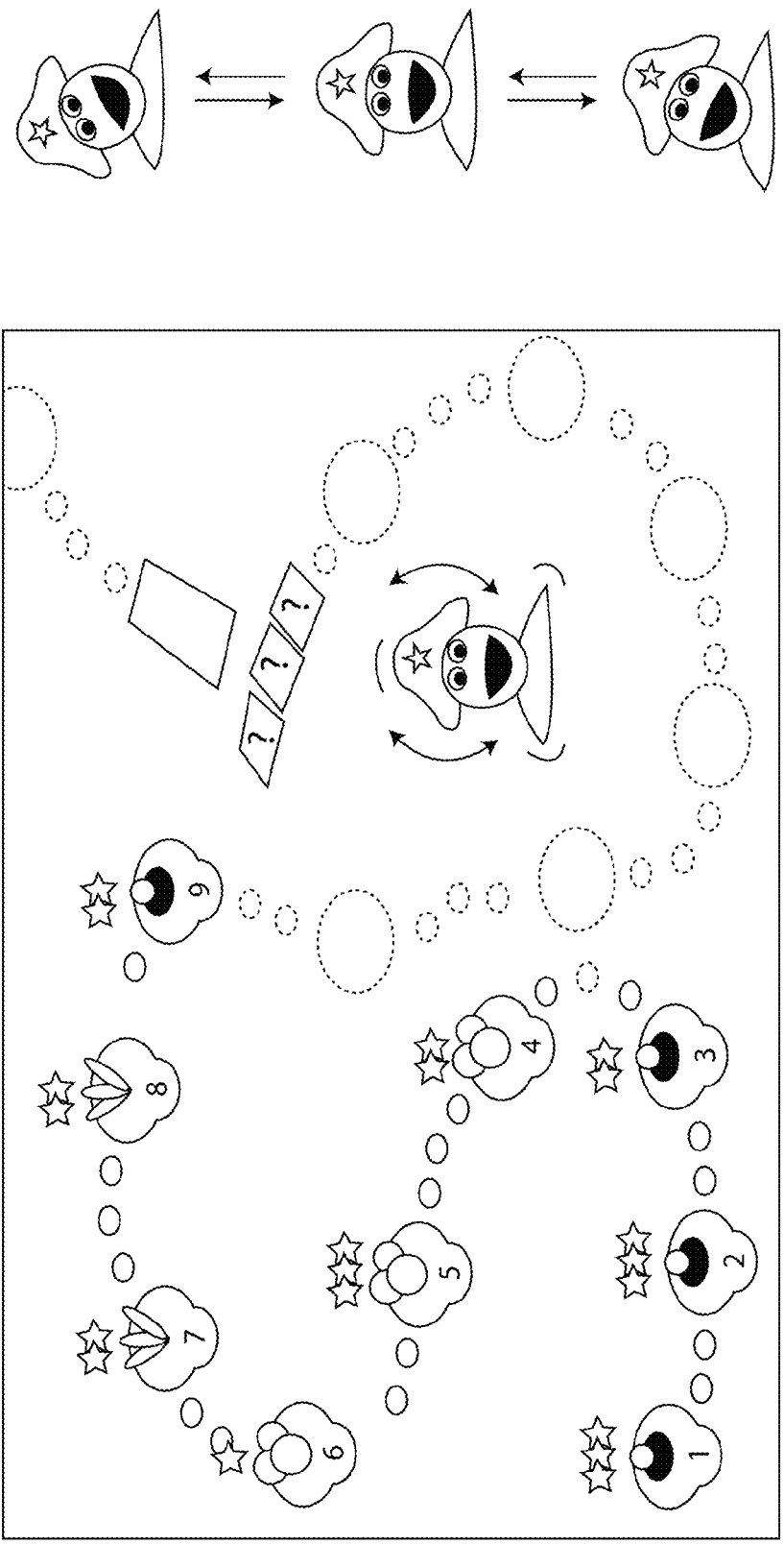
FIG. 46 shows an animation on a virtual map.

One example of how the virtual map can be dynamic and moving is shown in FIG. 46 where as an example, a coconut character moves slightly from side to side. A collection of subtle as well as less subtle animations throughout the map will together make the map appear moving and alive.

Pre- and Post-Level Screens

Before starting a level, players have to select which level to play from the map view. When selecting a level, the player is shown information about the level, such as the amount of points needed, the available boosters that can be used, the goal of the level and also the highscores of friends who have previously played that level.

Figure 47:
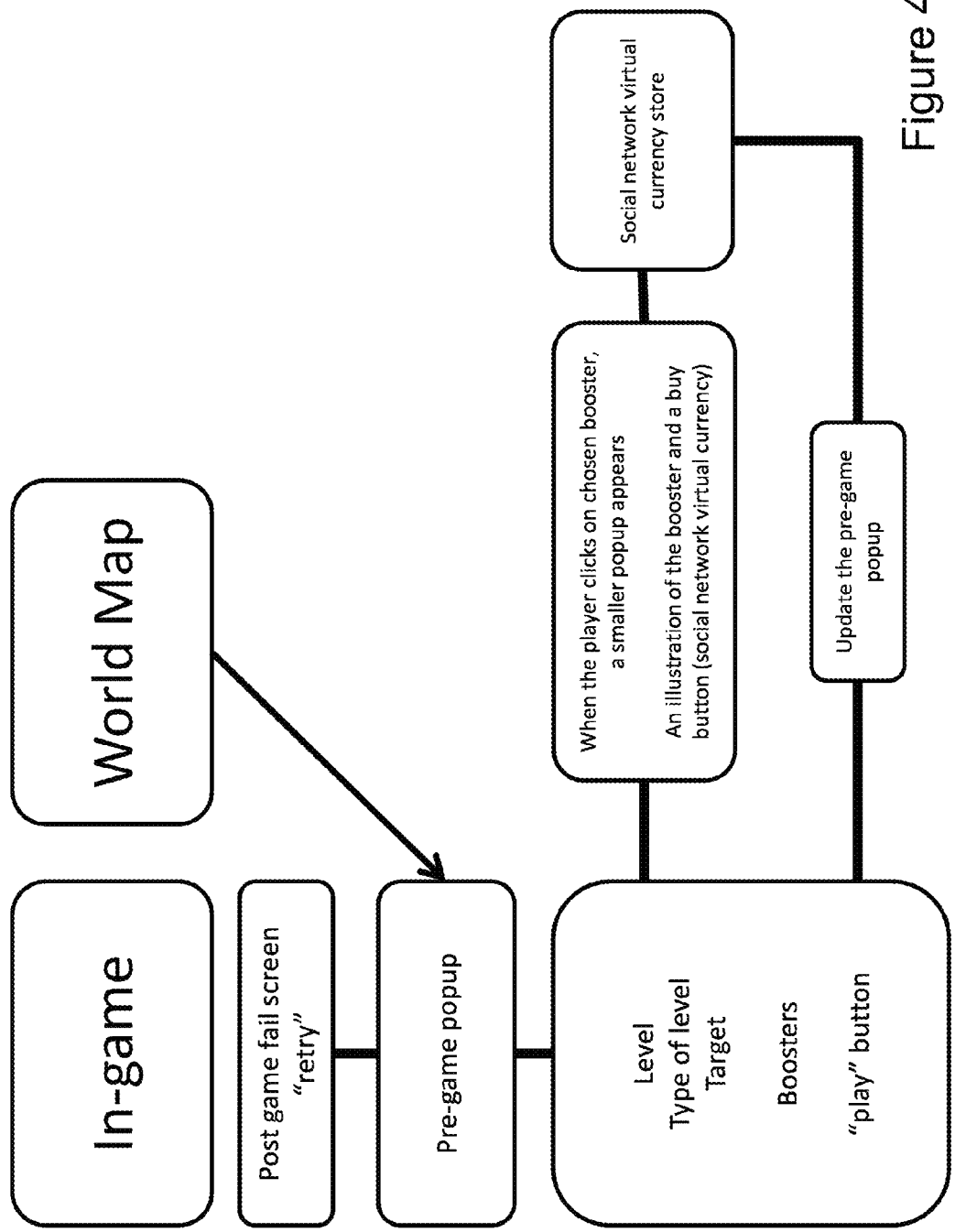
FIG. 47 shows a pre-level game progression.

FIG. 47 shows one implementation of the game flow before starting a level, including which screens are shown to the player. When choosing to play a level, either after having previously failed it or after having selected it from the map mode, the player is shown a pre-level screen. Through this screen the player can choose to purchase boosters. By doing so, the player can be transferred to another screen representing the in-game shop, or the purchase can be performed while still in the pre-level screen. If the player has no currency available, it is also possible for a screen related to acquiring currency to be shown.

Figure 48:
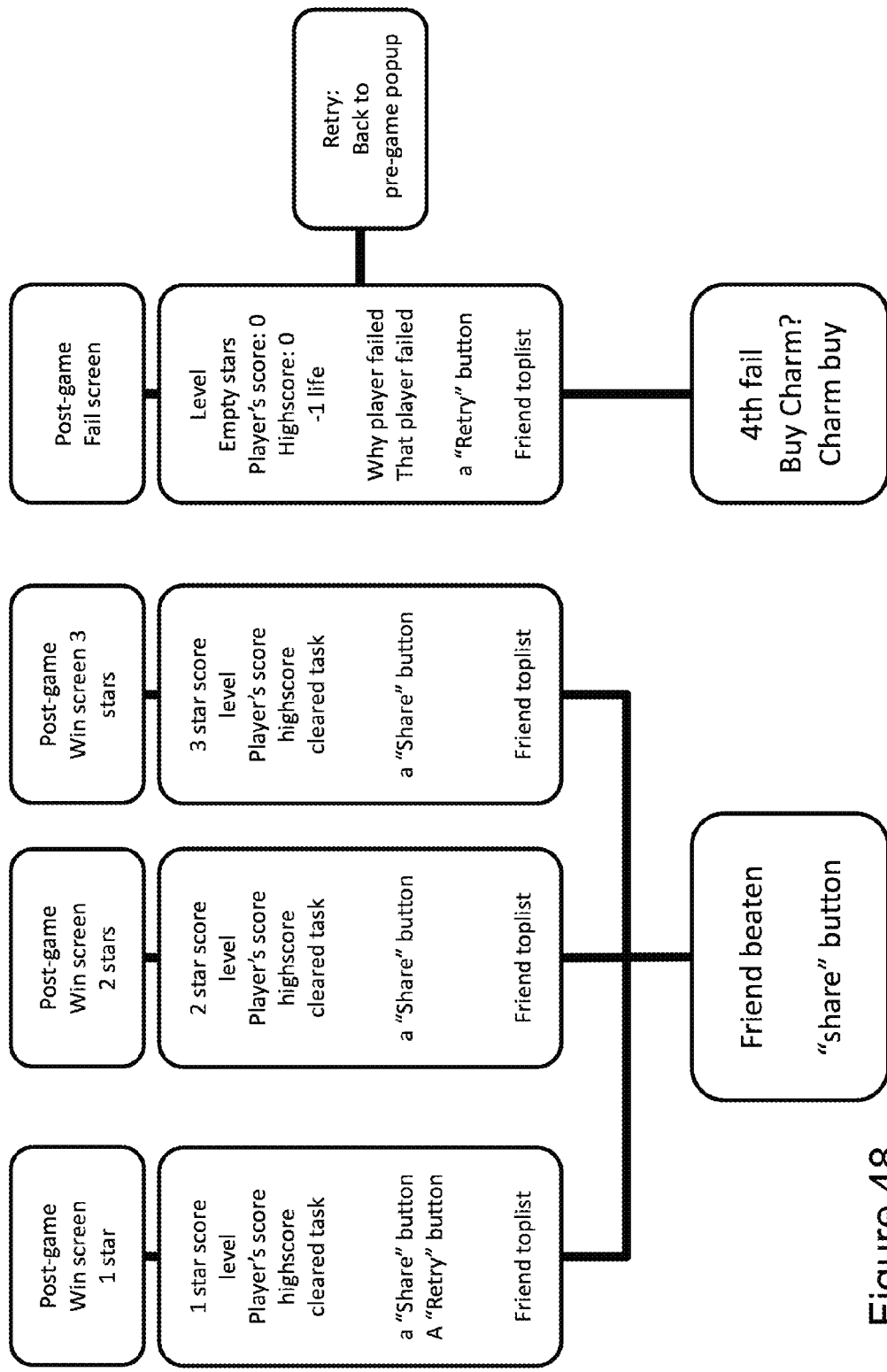
FIG. 48 shows a post-level game progression.

After completing a level, the player is presented with a screen that shows the amount of points gained, the amount of stars achieved and also the previous highscores of friends. One implementation of the game flow related to the post-level screen is shown in FIG. 48.

Both of the post-level screens discussed present the player with an option to share this information. The sharing part is done on a social network to which the game is connected. By sharing information such as which friends the player has beaten, competition is encouraged and the viralisation of the game is increased, due to people not playing the game also being able to see such messages.

The player can also be presented with another screen related to the performance on the freshly completed level. This screen shows how good the player scored in relation to friends' highscores, together with a message about which friend(s) that have been beaten.

High Score List

When showing the pre-level screen, players are presented with the highscores of friends. This gives an opportunity to know beforehand what to aim for, and is something that increases the competitive element in the game. The information about friends' scores can be derived from a social network to which the game is connected, it can also be retrieved from a database related to the game. It is important for further increasing the engagement and of players and to some extent viralisation, since players are constantly being reminded about the performance of others, which can incentivise players to try harder and subsequently play more.

In some implementations, each area in the game or certain groups of friends or players can have a 'Champion', 'King' or similar, meaning the player within a network of players that has the best performance on the levels in that area.

Friends' Highscores on Score Meter

In some implementations, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

Figure 49:
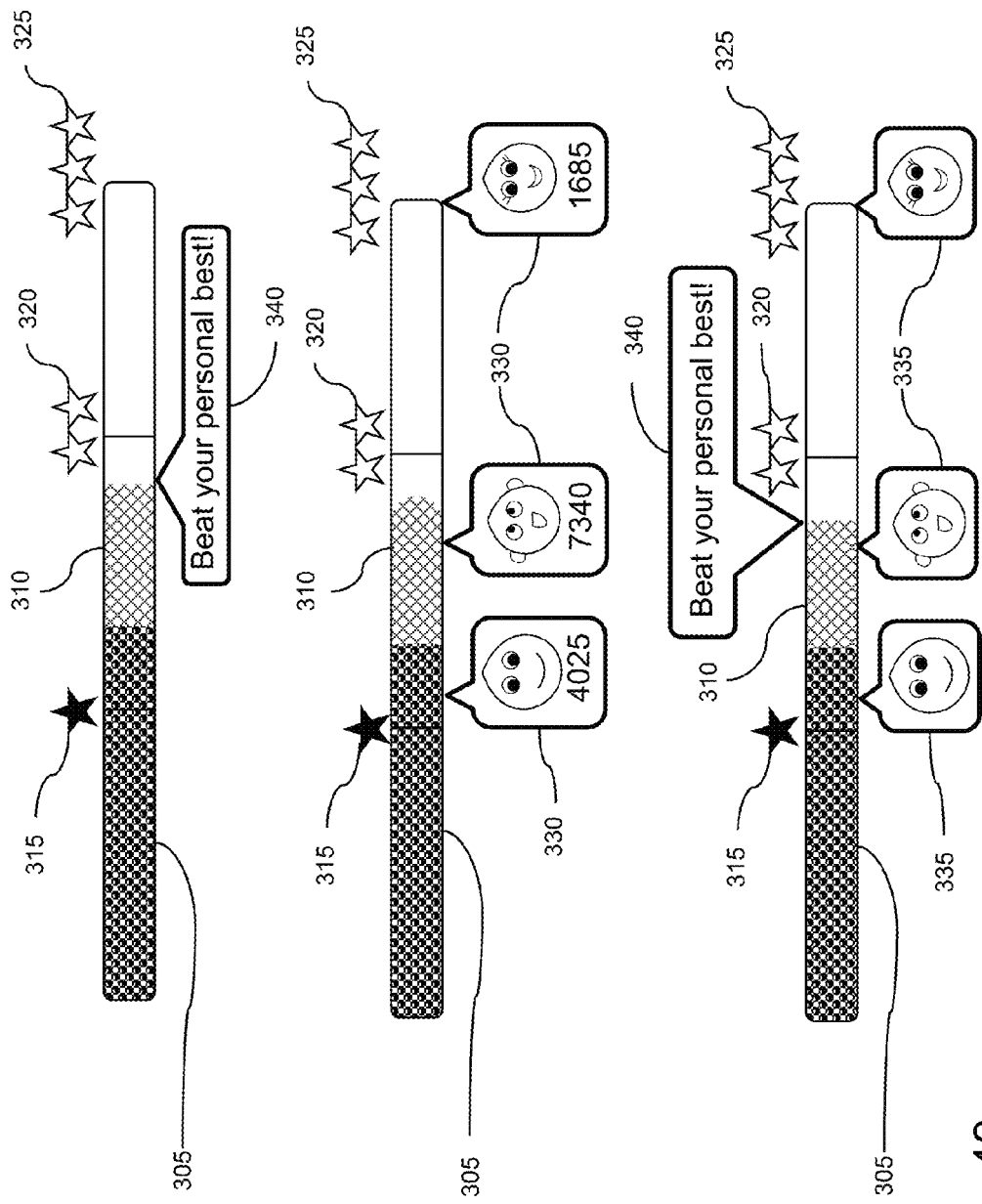
FIG. 49 shows different ways of implementing a score meter and the results of other players.

In some implementations, the player can see indications of the previous high score achieved on a level while playing it, shown by 310 in FIG. 49. It is also possible that no indication of the player's own previous score is shown.

In some implementations, the indications of the performance of other players are shown in relation to the score meter. It can be both absolute and relative indications. The indications can be in the form of pictures associated with the players, as shown by 330 and 335 in FIG. 49. When the player passes the score of another player or the previous best score the player has achieved, a message can be shown to encourage the player and denote the accomplishment. One example of such a message is illustrated by 340 in FIG. 49.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

Friends' and Player's Progress Showing on Virtual Path

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at.

It is also possible to invite new players to play the game. These can be invited through the game platform or through a social network to which the game is connected. In some implementations, the game suggests which players to invite. This suggestion can for instance be based on if the players have played other games from the same developer, if they are active on a social network or if they seem to like other games in the same genre. It is also possible for the suggestions to be based from data related to a social network, such as how often they interact with other players or how often they log in to the social network.

One aspect that increases the competitive element of the game is that messages can be sent to friends, for instance related to beating their scores or passing them in terms of overall level progression. In some implementations, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

Lives

In a typical implementation, a player of the game has a certain amount of lives that are used as the player attempts to complete levels. If the player starts a level but does not complete it, a life is lost. When having no lives left, the player cannot play the game anymore.

Regeneration of lives can be done automatically or manually. In some implementations, the player will regenerate lives over time, for instance by replenishing one life every 30 minutes. In other implementations, the player can only regenerate lives by performing certain actions, such as playing other games from the same developer or by making a purchase related to the game.

Sending Gifts

One aspect of the game that increases the viralisation and engagement of players is the ability to send gifts to other players, which help them in the game. It is possible to give certain gifts for free, such as extra lives.

The option to send free lives is available for instance through the pre-level screen and the post-level screen. Which players and/or friends that are displayed as suggested recipients of gifts can be dependent on variables such as how many times they have been attempting a level without succeeding or how long they have played the game in total. It can also be related to data from a social network to which the game is connected, such as how many interactions the player has had with different other players.

Figure 50:
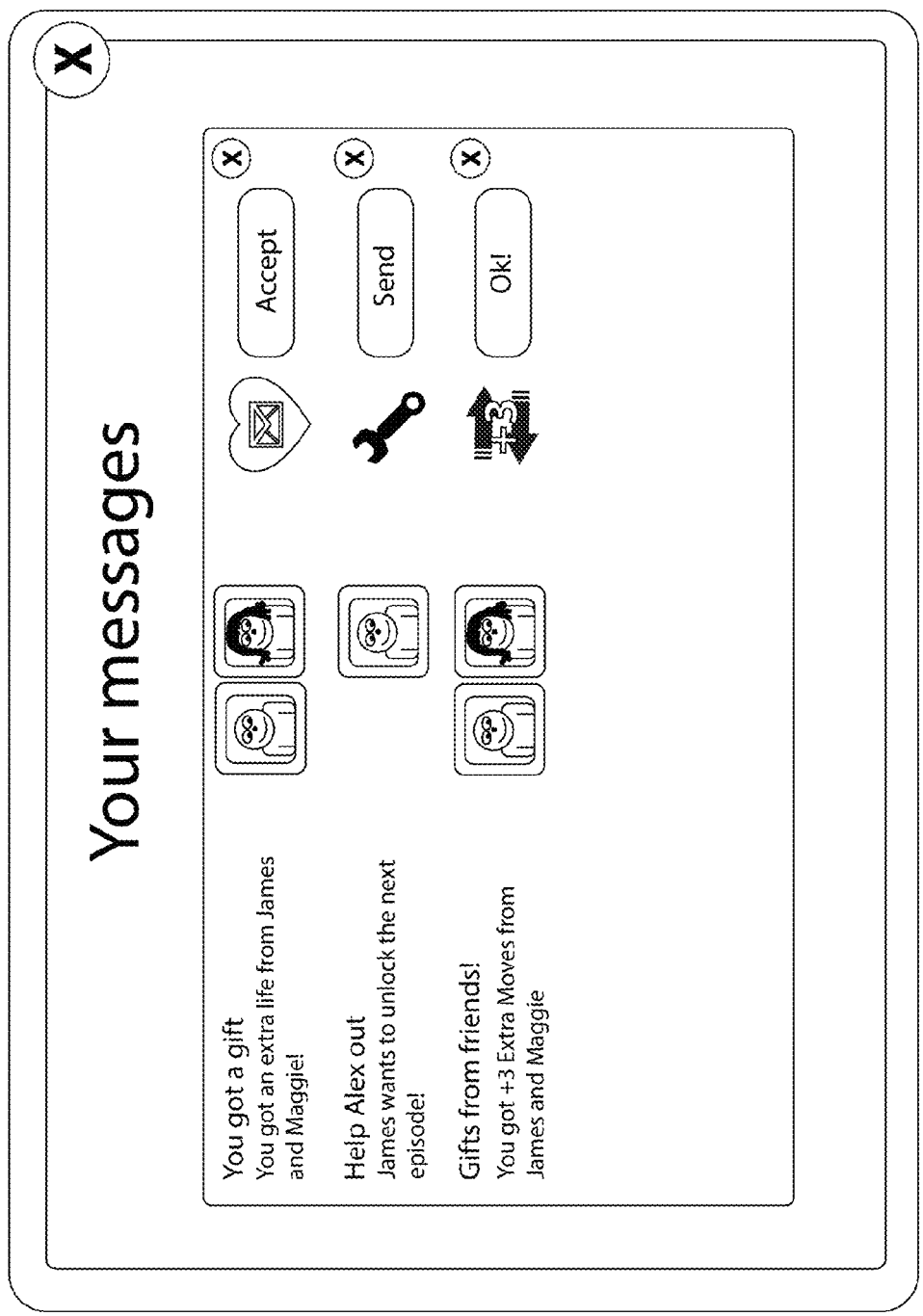
FIG. 50 shows one implementation of how lives and other gifts can be sent and received.

When starting the game, the player can be presented with a list of friends to send lives to. Another screen that can be presented when starting the game is one showing new messages. Gifts sent from other players can be displayed under messages, and certain free gifts such as lives can easily be reciprocated for free. Other gifts that cost money to send cannot always be freely reciprocated. In some implementations, the player can send a life back by just clicking a single button. The life can for instance be sent via the game platform or via a social network to which the game is connected. FIG. 50 shows one example of an implementation in which the player is prompted by the game to send lives to friends.

In some implementations the game prompts players to send lives to other players that have run out of lives. When a player completes a level after receiving help from a friend, a 'thank you'-message can be sent to that friend, either automatically or manually. This message can contain an item of value. In some implementations the player helping another player can get other benefits, such as special symbols or marks being displayed next to their names. Recognition is another benefit that can be awarded to players who help others.

In some implementations, lives that are received in the form of gifts have slightly different characteristics than lives that are gained by other means, such as time-based replenishment. For instance, lives in the form of gifts can make it possible for a player to have more than the otherwise maximum amount of lives. As an example, if the maximum amount of lives is five and the player gets sent an extra life, the player can have access to six lives. However, once the lives are reduced below the standard maximum threshold they will not automatically replenish above that, unless another gift is received.

Figure 51:
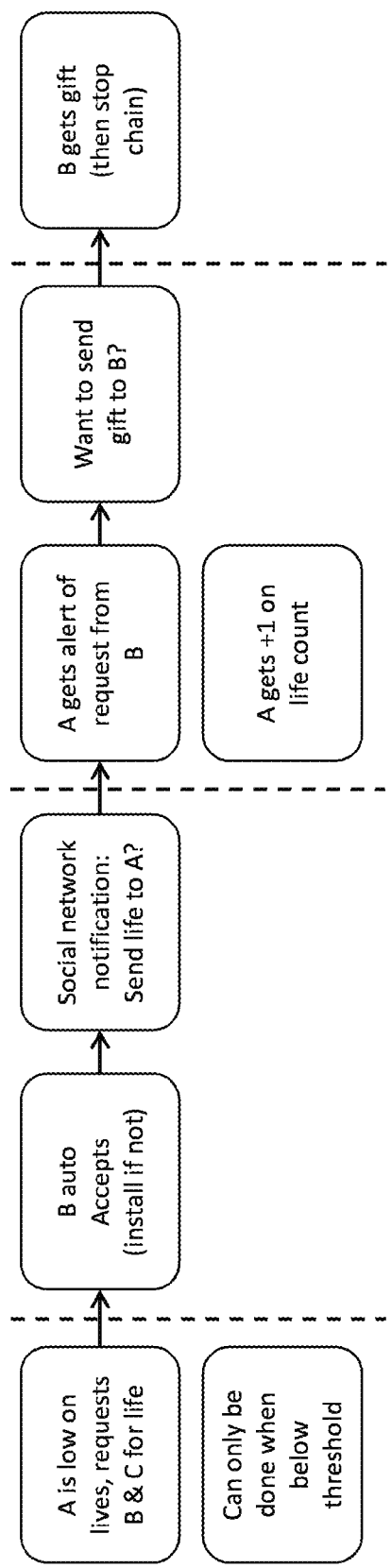
FIG. 51 shows one implementation of the chain of events when requesting and sending lives.

In the mobile version of the game, the player is presented with messages when logging in. Messages that are presented can be related to the player receiving lives and friends requesting lives. This is shown in the figure below. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response or thanking the sending player in other ways, such as a thank-you message or by sending in-game currency. If a player starts with requesting a life, the chain of events has three steps; step 1 is requesting a life, step 2 is receiving a life, step 3 is sending a life or a thank-you message back in response. One implementation of this chain of events is illustrated in FIG. 51.

It is also possible to buy gifts in the in-game shop and send these to friends. Such gifts are in the form of boosters that can be used either during a level or before a level.

Sending help to other players in the form of for instance extra moves and extra time Another way of helping friends is to send items that provide in-game benefits, such as extra moves or extra time depending on the level requirements in the game. In some implementations, certain criteria must be fulfilled in order to send such help. The criteria can be related to how long a player has been stuck on the same level.

A list of friends playing the game can be presented, with suggestions of which ones to help. Some of these friends might have been stuck on a level for an extended period of time, and the player then has an option to help these players by sending extra moves or extra time, free of charge. This can be different from boosters that give extra moves or time, for instance by only being usable and available on a specific level. This can be a way of facilitating the harder levels of the game by receiving help from friends, increasing player engagement and viralisation.

It is also possible for the game to prompt the player to send help to friends that have been stuck on the same level for an extended period of time. In some implementations, this period of time is two days. In other implementations, the criteria for a player being stuck is related to the amount of times they have tried and failed a level.

Figure 52:
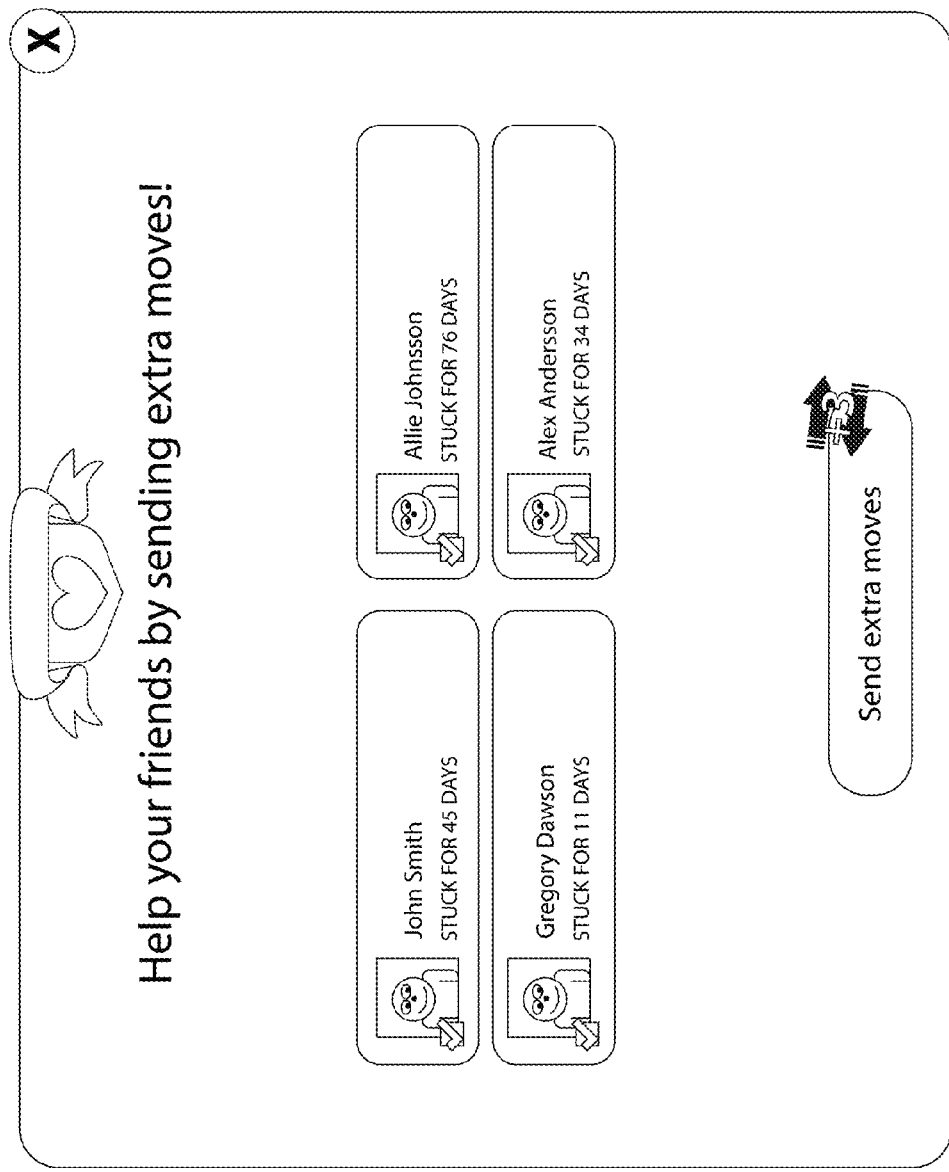
FIG. 52 shows the game prompting the player to help friends that have been stuck for an extended period of time.

The prompting from the game can happen at different points in the game, for instance when a player logs onto the game. Such prompting is illustrated in FIG. 52. The prompting increases engagement by increasing the likelihood of someone providing help to players when the game is particularly difficult, and also adds a sense of collaboration and community among players. When a player has received extra moves, it can be indicated by a symbol next to the level in which the moves can be used.

In some implementations, the player can receive help from multiple friends. Help from multiple friends can be used at the same time or distributed over multiple occasions. When a player completes a level after receiving help from a friend, a 'thank you'-message can be sent to that friend. This message can have different implementations, such as the ones described in the passage above about a thank-you message related to sending lives.

Head to Head Tournaments

The game can also be implemented to be played in a tournament mode with a limited time or limited number of moves or both over a consecutive set of levels. The score can be collected over the several levels to give the player a score for all the levels completed. The tournament mode can in some implementations be played with a virtual map, in other implementations the game has a special interface for head to head competition. One such implementation can be a split-screen mode where each player can see what the other player does in real-time.

The player can in some implementations play the game in head to head tournaments against one or several other players. The player with the highest collective score over the number of levels will be the winner in the tournament. In some implementations the tournaments are played with real time comparisons of players' scores, in other implementations the scores of players are compared after finishing a level.

The game can also be played in tournaments with jackpots where the player plays the same level where the same types of game elements are used. Jackpots can be absolute or they can be given as a multiplier of a stake that the player can input.

The game can also be played in an elimination competition against other players.

Rewards and Bonuses

The game can have schemes for giving rewards and bonuses to players. One reason for giving out rewards is to increase player engagement, and to some extent to help with monetisation. Players can for instance be rewarded for playing. Criteria can include playing for multiple days in a row, playing a certain amount of games within a certain time frame, playing a certain amount of games per day, achieving a certain score per day, etc. This is something that awards persistence and dedication. In other implementations, there is a daily bonus available that is gained by every player playing the game online during that day, or to players passing a certain secret location during that day.

By giving players samples of existing boosters, they are given a free preview of purchasable items that potentially can lead to sales in the long run, which helps monetise the game. Some implementations contain boosters that regenerate over time, for example a booster that can be used once every two days.

Purchasing and In-Game Shop

It is possible for players to make purchases in the game or through a social network connected to the game. One way of making such purchases is through the in-game shop. The shop is accessible for instance through the virtual map screen, but depending on the implementation it can be available from any screen in the game. From the shop it is possible to buy permanent as well as non-permanent boosters. These boosters can be used to gain benefits in the game, or they can be sent to friends as gifts.

The player does not always have to enter the shop in order to purchase boosters. The pre-level screen is one example of where the player is presented with the option to buy boosters without first entering the shop. A person skilled in the art will understand that this is just one example, it is possible to have purchasing options available from any screen in the game. The purchases can be made through a game platform or through a social network to which the game is connected.

In one implementation, the game platform communicates with the social network platform to indicate that a player is interested in buying an item in the game. The player is then directed to a purchasing window associated with the social network to which the game is connected. This window can be within the social network interface or it can be related to a third party service that provides payment options. In the purchasing window the player can choose to pay with a currency associated with the social network, or with a corresponding amount of hard currency if the player does not have any stored currency associated with the social network.

In some implementations, the player is given the option to purchase certain boosters when failing a level. Specific boosters that are particularly effective on a certain level can be suggested. This is done to increase monetisation and help players overcome difficult levels.

It is also possible to have offers directed at specific groups of players, such as the ones who have not previously purchased anything. In some implementations, players who have not purchased anything will get an initial offer that is discounted from the standard price, in order to incentivise them to start making purchases in-game.

The currency used for purchases can be hard currency, soft currency or it can be based on in-game score. The currency can be associated with a social network to which the game is connected.

Cross-Device and Cross-Game Functionalities

Three platforms in particular are changing the way people expect games to be played. These three platforms are growing at the same time, and provide new input possibilities. To date, games have not absorbed all the new input possibilities.

The first platform is Facebook. The skilled person will understand that where Facebook is referred to in this document, other social network platforms may be used. A Facebook game may be a social game, a game you play with your friends. It is rare or unthinkable to launch a game (i.e. to play for the first time) on Facebook that is a paid game, because people playing games on Facebook expect not to pay to access a game. A Facebook game may be played on the internet, after logging in to Facebook (whether automatically or manually), such as from a personal computer.

The second platform is smartphones. Use of smartphones is not always continuous. You may use a smartphone for 5 minutes on a bus, and then for 20 minutes on a connecting train, for example. The use can have many starts and stops. Not like someone working at an office desk or at a home desk in a conventional way. A smartphone can be on an iOS platform, or on an Android platform, for example.

The third platform is tablets. What is a tablet? It can function as a mobile device and as a non-mobile device. The tablet can be a substitute for a personal computer. A user may want a seamless experience between using the game on a personal computer and on a tablet and on another mobile device. A tablet can be on an iOS platform, or on an Android platform, for example.

A game which works on a plurality of such as all three of the above platforms (or more), may provide a connected fully-synchronized seamless experience. Hence multi-platform games are important. Key criteria for multi-platform games are: they are free, they are social, stop-start use is possible, and seamless experience is provided. Such games may be "played anywhere" e.g. in a mobile environment or in a non-mobile environment. Such games may also be played online or offline.

The game must be fun when used in a stop-start way, and when used for even just short intervals. In an example, a game consists of parts or levels, each of which runs for about 3 minutes, eg. between 1 and 5 minutes. In an example, a game is structured in levels, so that if successful in a game level, such as by scoring a minimum score, a user can progress from that level to the next level. In an example, a game has about 200 levels.

A game can be optimized post-launch. For example, if it is clear that too many users are failing to progress past a particular level, the minimum score to pass the level can be lowered. An optimized game may be provided as an application update from an application store. In an alternative, a game may be optimized by a server sending a revised data file of scores required to pass each game level to a mobile device, when a game state of a user is being synchronized with the server, wherein the application running on the device replaces the previous file of scores stored on the device required to pass each level with the revised file of scores required to pass each level.

Some implementations of the game allows for the game state and for instance results of past levels and score to be synchronised between different devices or platforms. The synchronisation can happen while playing the game, if the player is connected, or it can be synced at certain times when the player chooses to connect to the game server. It is also possible for the player to play the game entirely in offline mode, but in that case there won't be real-time data available that relates to for instance the performance of other players. In a typical implementation, synchronisation of game progression between platforms can only happen when the player is connected to the game server.

The game can for instance be played in an offline mode on a handheld device using locally stored information on the handheld device. The device can store all or some of the levels that are available for the player to play in the game. Some of the features in the game can be locally run on the device and dependent on the local machine. Other features, such as data related to other players, will not be available in real time when playing offline, but rather gathered a certain points in time. One example of a locally run feature can for instance be that if the game is implemented to regenerate lives after a certain period of time, then the time can be locally decided based on the clock on the device. In some implementations, the central game server clock can override the local clock when the local device is or has been synchronised with the server.

A game can be implemented so that the player knows if it has synchronised the available data with the central server or servers. This can for instance be through a coloured symbol or a check mark that indicates that the information is up to date. The servers with which the game can synchronise include but are not limited to; a server running the game, servers hosting a social network to which the game is connected and a server hosting other games the player is active on.

The game can also indicate if it has been able to establish a connection with the central server for synchronisation or if for instance the network connection is down. That the device is offline can for instance be illustrated with a greyed out icon.

In some implementations, players can be rewarded for playing the game on multiple platforms. For instance, players that active on a computer-based platform could get a bonus for also installing the game on a handheld device. Such bonus may for instance be in the form of in-game currency, a booster to be used in the game or other in-game valuable object.

Players can also be rewarded for playing multiple games that are related, for instance games from the same developer. When choosing to play a new game, the player can receive bonuses in another game. This can be triggered by using a link from one game to the other, or by games sharing information between one other so that it automatically detects a player that is playing more than one game and subsequently rewards them. One way of rewarding players that play multiple games and/or play games on multiple platforms can be to give access to certain missions that are only available after fulfilling certain such criteria.

It is also possible that games may have elements in common that enables certain objects, for instance boosters, to be usable in multiple games. These games can be located on the same or on different servers. In some implementations, a booster bought in one game can be used in another game that shares certain features with it.

One example of an implementation with synchronisation across platforms is as follows:

A first server, for instance one hosting a social network, with a first data store storing data relating to the state of a game. The first server is configured to communicate with a first plurality of devices, such as mobile phones or personal computers, through a first application programming interface, where the first plurality of devices is related to a first computing platform.

A second server, for instance one hosting a game platform, with a second data store storing data relating to the state of the game. The second server is configured to communicate with a second plurality of devices, such as mobile phones or personal computers, through a second application programming interface, where the second plurality of devices is related to a second computing platform.

A third server with a third data store, configured to communicate with the first and the second server. The three servers are configured to synchronise the three data stores in such a way that when synchronized, the first, second and third data store all relate to a synchronised game state.

Localisation and Updates

It is possible for implementations of the game to vary depending on the location of the player. For instance, the language can be adapted and translated into different languages. It can also be so that updates of the game are incorporated at different times in different locations, in order to not interfere with for instance the times of the day that players are as most active.

If trying to access the game online, as opposed to starting a local version that is saved on the device, while updates are being made, the player can be met by a message saying that the game cannot be accessed right at that moment.

The invention claimed is:

1. A computing device comprising one or more processors, a display configured to display computer game graphics comprising a game board for a level of a game and game elements, and an input device comprising a touch screen or a cursor based input device, wherein the processor is configured to execute computer code to perform the steps of:
determining a trajectory of said game elements and, in response to user input detected by the input device, controlling the display to show the movement of the game elements across the game board in accordance with the trajectory;
controlling the display to show a plurality of receptacles for receiving the game elements, wherein each receptacle has an associated state;
for each receptacle, controlling the display to show the receptacle represented by a first visual representation when in a first state and the receptacle represented by a second visual representation when in a second state;
in response to determining that a game element has contacted a receptacle in the first state, determining whether or not the receptacle has been contacted by a predetermined number of game elements; and
if it is determined that the receptacle has been contacted by the predetermined number of game elements, controlling the display to show the receptacle in the second state,
wherein the predefined number of game elements is two or more.

2. The computing device of claim 1 in which at least one receptacle includes animated arms which are animated under the control of the processor.

3. The computing device of claim 1 in which at least one container alters colour under the control of the processor when an element falls into it.

4. The computing device of claim 1 in which all receptacles have to alter colour for a player to pass a level.

5. The computing device of claim 1 in which at least one receptacle is drawn by the processor with a blocking lid that only disappears once one or more elements land in that lid.

6. The computing device of claim 1 in which the processor is programmed such that special items must land on a lid for that lid to disappear.

7. The computing device of claim 1 in which the processor shows all elements remaining after the player has completed a level as being automatically shot out over a short time interval and in random directions, providing a bonus sequence.

8. The computing device of claim 1 in which the processor creates a sound effect when an element falls into a receptacle.

9. The computing device of claim 1 in which the processor creates a sound effect when an element bounces against an object, and one or more, or each, object is associated with a unique sound effect.

10. The computing device of claim 1 in which the processor shows objects the elements bounce against as pins with animated faces.

11. The computing device of claim 1 in which the processor shows stars earned on a level with animated with faces.

12. The computing device of claim 1 in which the processor controls the display to show progress of the player through the levels of the game on a path that winds through a virtual landscape.

13. The computing device of claim 1 in which the processor controls the display to show the virtual landscape including fruits that are animated to appear as though dancing to music.

14. The computing device of claim 1 in which the processor controls the display to show some levels as having goals to bring down specific types of game elements.

15. The computing device of claim 1 in which the processor controls the display to show these specific game elements as being placed in various positions amongst the pins in the game area, and by removing pins these game elements will change their position and eventually fall down.

16. The computing device of claim 1 in which the processor controls the display to show another goal to complete a level is being to remove X amount of pins of a certain type of pin, where the type of pin and number may vary between levels.

17. The computing device of claim 1 in which some or all game levels have no time limit.

18. The computing device of claim 1 in which the game is a casual, social game and some or all levels have a true fail, to enable monetization through purchasing extra moves.

19. The computing device of claim 1 in which there is a continuous musical soundtrack that plays during gameplay.

20. The computing device of claim 1 in which the game generates and displays congratulatory messages when the player scores more than a predefined amount, or matches more than a predefined number of game elements, in a single move.

21. The computing device of claim 1 in which there is an algorithm for automatically detecting when there are no possible moves left.

22. The computing device of claim 1 in which there is an algorithm for re-shuffling the elements on the game board.

23. The computing device of claim 1 in which a processor generates, if no move has been made for a while, help or hints by brightening and enlarging game elements used in a possible move on the board with a flashing animation.

24. The computing device of claim 1 in which a processor is programmed to require a player to reach a target score before running out of moves in order to complete a level successfully, but completing the level is not timed.

25. The computing device of claim 1 in which a processor is programmed to automatically replenish a life for a player in 30 minutes.

26. The computing device of claim 1 in which a processor is programmed so that, if a player finishes a level in under the target number of moves, then random game elements on the game board are triggered and give the player bonus points.

27. The computing device of claim 1 in which a processor is programmed so that, if a level is finished with moves left, those moves are converted to special game elements that trigger for extra bonus points.

28. The computing device of claim 1 in which a processor is programmed so that the game generates and displays congratulatory messages when the player scores more than a predefined amount, or matches more than a predefined number of game elements, in a single move.

29. The computing device of claim 1 in which a processor is programmed so that the player can ask his friends for lives.

30. The computing device of claim 1 in which a processor is programmed so that the player can ask his friends for help.

31. The computing device of claim 1 in which social network friends are prompted to assist another player if that other player has played, but not completed, a level meeting a certain criteria.

32. The computing device of claim 1 in which a processor is programmed so that the player can send gifts to friends.

33. The computing device of claim 1 in which a processor is programmed so that the game can be synchronized between different devices.

34. The computing device of claim 1 in which a processor is programmed so that a player can seamlessly stop and re-start playing the game at any time since game state information is stored.

35. The computing device of claim 1 in which every change in the game state and every consequential change in every game piece on the game board, is accompanied by sound and visual feedback.

36. The computing device method of claim 1 in which game state information is preserved, enabling a remote server system to identify a player and all aspects of the state of the game they are playing, so that the player can end game play on one device and resume from a different device at a later time at exactly the same state.

37. The computing device of claim 1 in which the different device can be a different type of device, so that the player can move seamlessly between playing the game on a smartphone and on a tablet.

38. The computing device of claim 1 in which a remote server system can identify a player because that player has accessed the game through a social network.

39. The computing device of claim 1 in which the game is a casual, social game, namely a game that can be downloaded as an app to a smartphone and/or tablet computer and which can be accessed or played using a social network application or environment.

40. The computing device of claim 1 in which the processor is programmed to control the display to show a virtual path or other virtual world that indicates the level reached by the player and that player's social network friends.

41. A computing device as claimed in claim 1, wherein an object of the game is to transition a predetermined number of receptacles from the first state to the second state, the processor being further configured to execute computer code to perform the steps of:
   determining whether or not a predefined number of receptacles are in the second state; and
   if it is determined that a predefined number of receptacles are in the second state ending the level of the game.

42. A computer implemented method for displaying, on a display, computer game graphics comprising a game board for a level of a game and game elements, comprising executing on one or more processors the steps of:
   determining a trajectory of said game elements and, in response to user input detected by the input device, controlling the display to show the movement of the game elements across the game board in accordance with the trajectory;
   controlling the display to show a plurality of receptacles for receiving the game elements, wherein each receptacle has an associated state;
   for each receptacle, controlling the display to show the receptacle represented by a first visual representation when in a first state and the receptacle represented by a second visual representation when in a second state;
   in response to determining that a game element has contacted a receptacle in the first state, determining whether or not the receptacle has been contacted by a predetermined number of game elements; and
   if it is determined that the receptacle has been contacted by the predetermined number of game elements, controlling the display to show the receptacle in the second state,
   wherein the predefined number of game elements is two or more.

43. A non-transitory computer readable medium encoded with instructions for controlling a computer system to enable display of computer game graphics on a display, said computer game graphics comprising a game board for a level of a game and game elements, in which the instructions when executed on a processor enable the processor to:
   determine a trajectory of said game elements and, in response to user input detected by the input device, controlling the display to show the movement of the game elements across the game board in accordance with the trajectory;
   control the display to show a plurality of receptacles for receiving the game elements, wherein each receptacle has an associated state;

for each receptacle, control the display to show the receptacle represented by a first visual representation when in a first state and the receptacle represented by a second visual representation when in a second state;

in response to determining that a game element has contacted a receptacle in the first state, determining whether or not the receptacle has been contacted by a predetermined number of game elements; and if it is determined that the receptacle has been contacted by the predetermined number of game elements, control the display to show the receptacle in the second state, wherein the predefined number of game elements is two or more.

\* \* \* \* \*